(12) United States Patent
Kobayashi et al.

(10) Patent No.: US 7,858,716 B2
(45) Date of Patent: Dec. 28, 2010

(54) PROPYLENE-BASED POLYMER AND PRODUCTION METHOD THEREFOR, PROPYLENE-BASED POLYMER COMPOSITION AND MOLDED BODY MADE THEREOF

(75) Inventors: Yoshitaka Kobayashi, Ichihara (JP); Takanori Nakashima, Ichihara (JP); Yuusuke Yamada, Ichihara (JP); Iku Kouzai, Yokkaichi (JP); Youichi Maeda, Yokkaichi (JP); Kouji Nakayama, Yokkaichi (JP); Keiji Fukuda, Yokkaichi (JP)

(73) Assignee: Japan Polypropylene Corporation, Tokyo (JP)

( * ) Notice: Subject to any disclaimer, the term of this patent is extended or adjusted under 35 U.S.C. 154(b) by 0 days.

(21) Appl. No.: 12/162,995

(22) PCT Filed: Jan. 31, 2007

(86) PCT No.: PCT/JP2007/051592

§ 371 (c)(1),
(2), (4) Date: Oct. 23, 2008

(87) PCT Pub. No.: WO2007/088887

PCT Pub. Date: Aug. 9, 2007

(65) Prior Publication Data

US 2009/0259006 A1    Oct. 15, 2009

(30) Foreign Application Priority Data

Feb. 3, 2006   (JP) ............................. 2006-026513
Mar. 24, 2006  (JP) ............................. 2006-083332

(51) Int. Cl.
*C08F 4/44* (2006.01)

(52) U.S. Cl. .................................................. 526/125.3

(58) Field of Classification Search ............... 526/125.3
See application file for complete search history.

(56) References Cited

U.S. PATENT DOCUMENTS 5,385,993 A * 1/1995 Fujita ......................... 526/119

FOREIGN PATENT DOCUMENTS

| JP | 59 230010   | 12/1984 |
|----|-------------|---------|
| JP | 62 227431   | 10/1987 |
| JP | 63 23721    | 2/1988  |
| JP | 63 199203   | 8/1988  |
| JP | 2 77413     | 3/1990  |
| JP | 3 234707    | 10/1991 |
| JP | 3 294304    | 12/1991 |
| JP | 5 117317    | 5/1993  |
| JP | 6 122724    | 5/1994  |
| JP | 6 145269    | 5/1994  |
| JP | 7 25927     | 1/1995  |
| JP | 7 133329    | 5/1995  |
| JP | 7 504708    | 5/1995  |
| JP | 8 3215      | 1/1996  |
| JP | 8 67710     | 3/1996  |
| JP | 8 100019    | 4/1996  |
| JP | 8 127615    | 5/1996  |
| JP | 8 157519    | 6/1996  |
| JP | 11 80235    | 3/1999  |
| JP | 2000 7725   | 1/2000  |
| JP | 2001 122921 | 5/2001  |
| JP | 2004 315742 | 11/2004 |
| JP | 2005 48045  | 2/2005  |

* cited by examiner

*Primary Examiner*—Ling-Siu Choi
*Assistant Examiner*—Sonya Wright
(74) *Attorney, Agent, or Firm*—Oblon, Spivak, McClelland, Maier & Neustadt, L.L.P.

(57) ABSTRACT

Disclosed is a production method of polypropylene having high MFR value and excellent product qualities with high productivity. The method enables to produce a propylene polymer by a gas phase process where the reaction heat is removed mainly by the heat of vaporization of liquefied propylene. The method is characterized by using a solid catalyst component (A) which is prepared by contacting components (A1), (A2) and (A3) shown below. Further disclosed are: a propylene polymer produced by the method; a propylene polymer composition; and a molded body of the composition. Component (A1): a solid component containing titanium, magnesium and a halogen as essential components. Component (A2): a vinyl silane compound. Component (A3): an organosilicon compound having an alkoxy group (A3a) and/or a compound having at least two ether bonds (A3b).

19 Claims, 4 Drawing Sheets

PROPYLENE-BASED POLYMER AND PRODUCTION METHOD THEREFOR, PROPYLENE-BASED POLYMER COMPOSITION AND MOLDED BODY MADE THEREOF

BACKGROUND OF THE INVENTION

1. Field of the Invention

The present invention relates to a propylene-based polymer and a production method therefor, a propylene-based polymer composition and a molded body made thereof, in detail, the present invention relates to a method for producing polypropylene stably in high productivity, in particular, a propylene-based polymer having reduced amount of fine or lump, high bulk density and good fluidity, by using a specific gas-phase process in combination with a specific solid catalyst component, and a production method for a propylene-based block copolymer having reduced gel and excellent appearance characteristics, a propylene-based polymer produced thereby, a propylene-based polymer composition made thereof and a molded body made thereof.

2. Description of the Prior Art

Polypropylene is used for various applications because it has good physical properties such as rigidity and heat resistance, and can be produced in relatively low cost.

On the other hand, a production process of polypropylene has been technically improved for simplification of the production steps, reduction of production cost and enhancement of productivity. When industrial production of polypropylene had just begun, catalyst performance was low, and the steps for removing a catalyst residue and an atactic polymer from the obtained polypropylene was necessary, and such a process using a solvent as a slurry was dominant. By the following significant progress of catalyst performance, nowadays, a gas-phase process is dominant. Among the various gas-phase processes, a method for removing the heat of polymerization by utilizing the heat of vaporization of liquefied propylene is superior in heat removing capability with small facilities (refer to Patent Document 3 and the like).

As a gas-phase olefin polymerization reactor with the heat removal system by utilizing the heat of vaporization of liquefied propylene, there is known a horizontal reactor equipped with an agitator, which rotates around a horizontal axis thereof.

In general, catalyst particles gradually grow to polymer particles by a polymerization reaction. When polymerization is carried out in the horizontal reactor, these particles are gradually growing and moving along the shaft direction of the reactor by two forces of polypropylene generation by polymerization and mechanical agitation. Therefore, particles having the same growth degree, that is, having the same residence time, align with the residence time, from the upstream toward the downstream of the reactor. Therefore, in the horizontal reactor, the flow pattern is a piston-flow-type, making residence time distribution narrow to the same degree as in the case with several continuous stirring tank reactors in series. This is the excellent feature not observed in other types of polymerization reactors, and is economically advantageous in achieving the same mixing degree of solid particles easily with a single reactor as with 2, 3 or more reactors.

For polypropylene production, a method with the heat removal system for polymerization by utilizing the heat of vaporization of liquefied propylene, and with a horizontal reactor equipped with an agitator, which rotates around a horizontal axis thereof, has excellent characteristics as described above.

In this way, a gas-phase process utilizing the heat of vaporization of liquefied propylene has excellent characteristics, however, it has a problem to be solved such as modification for a highly active catalyst, which has been developed by progress of catalyst technology in recent years, improvement of power characteristics associated with it, and reduction of the amount of fines, which are easily blown up and fixed on to a pipeline. For example, vaporized gas passes through a gas exhaust line located at the upper part tank wall of a reactor, and is condensed by a condenser and used again as liquid coolant for heat removal. In the process using the heat of vaporization of liquefied propylene, a large amount of vaporized gas increases gas flow rate in a gas exhaust line system, which inevitably makes fines of polymer particles or the like accompanied with the vaporized gas (entrainment phenomenon), and causes adhering to the inside of a pipe or a filter of the gas exhaust line system, or clogging thereof. In the worst case, the process should be stopped for cleaning. Therefore, such a method has been proposed that a separation chamber is installed where un-reacted gas and cooled vapor exhausted from the upper part of the horizontal reactor pass through and where a liquid coolant is sprayed to reduce the amount of fines, or the like (for example, refer to Patent Document 3 or the like).

However, in the case of the high production pace, the amount of vaporized gas increases, in the worst case, such a problem appears that fines cannot be separated unless the diameter of the separation chamber is quite similar to that of the reactor, or additional facilities are required further.

In addition, in gas-phase polymerization achieving high polymerization activity, destruction of solid catalyst components during polymerization raises such problems as deterioration of the shape, generation of fines and deterioration of powder characteristics.

Furthermore, in order to achieve uniform residence time of the polymer particles in the tank, there are known various technologies and methods such as an agitating method of a horizontal-mono-axial type with many rectangular-shape flat paddles on the horizontal rotating shaft (for example, refer to Patent Document 4 or the like); an agitator able to continuously operate with one or more rotating baffles fixed on the rotating shaft (for example, refer to Patent Document 5 or the like); or an agitator having tanks partitioned by baffles fixed vertically to the rotating shaft on the inner wall of the tank (for example, refer to Patent Document 5 or the like); and the like. By these known technologies, uniform residence time in the horizontally agitated bed reactor system, and reduction of short-pass particles and the amount of fines in the agitator have been pursued.

Therefore, it has been desired to develop a technology to reduce the amount of fines, which could cause troubles, in "a gas-phase process where the heat of reaction is removed mainly by using the heat of vaporization of liquefied propylene", having high production capability with compact facilities and advantage that high catalyst activity can be achieved.

In addition, in the case of producing polypropylene having high MFR value recently desired, there is a problem to be solved in view of productivity. In the case of utilizing the heat of vaporization of liquefied propylene, it is a general method to exhaust a gas from a polymerization reactor, to be liquefied by cooling with a heat exchanger, and to return again into the polymerization reactor. Because the temperature at which the gas is liquefied (due point) depends on the pressure and the gas composition, by adding such a gas component having low due point as hydrogen or ethylene into propylene, due point decreases in comparison with that of pure propylene. Cooling capability of the heat exchanger is determined by a facility, therefore, when the same facility is used, lower due point of the gas component lowers the capability to liquefy the gas, that is, lowers the heat removal capability. On the other hand, for polypropylene production, it is general to use hydrogen, which can induce a chain transfer reaction, as an agent to control the molecular weight. In order to produce polypropylene having higher MFR value, that is, lower molecular weight, hydrogen must be used in higher concentration. Therefore, in the gas-phase process utilizing the heat of vaporization of liquefied propylene, when polypropylene having high MFR value is produced, a problem of reduced productivity appears by the heat removal limitation.

There have been several proposals on methods for solving these problems by catalyst improvement. First, for the problem of fines, for example, a method for spraying a molten mixture of a magnesium compound and an alcohol to obtain a mixture and then supporting a halogen-containing component on a solid catalyst (for example, refer to Patent Document 6); and also a method characterized by using a specific silane compound having an Si—O—C bond, have been proposed. In addition, a method for prepolymerizing a catalyst is also known, and a method for using a specific catalyst component prepolymerized with ethylene has been proposed (for example, refer to Patent Document 7). Furthermore, a method for conducting prepolymerization under the higher pressure than that in a gas-phase polymerization reactor was also proposed (for example, refer to Patent Document 8).

On the other hand, in order to produce polypropylene having high MFR value, it is effective to employ a catalyst system having high hydrogen response, and for example, there have been proposed a method for using an organoaluminum component in combination with an aluminoxane as co-catalysts (for example, refer to Patent Document 9); a method for using an organoaluminum component in combination with an organozinc component as co-catalysts (for example, refer to Patent Document 10); a method for supporting a halogen-containing component on a solid catalyst (for example, refer to Patent Document 11); a method for using an organosilicon compound having an amino group (for example, refer to Patent Documents 12, 13 and 14); a method for using a specific organosilicon compound having both a branched or aliphatic cyclic hydrocarbon group and an amino group (for example, refer to Patent Documents 15 and 16) and the like.

In addition, in view of enhancing productivity, a method for using a highly active catalyst is considered. The present applicants have found that a highly stereospecific and highly active catalyst can be obtained by using a specific vinylsilane compound as a polymerization catalyst for propylene, and have filed patent application (refer to Patent Document 1 and 2 and the like). This method highly improves stereospecificity and activity, however, did not improve the productivity of a propylene-based polymer having high MFR value, especially in a slurry polymerization process or the like.

Therefore, as far as the present inventors know, there has not yet been proposed a method with sufficient performance in view of the productivity of polypropylene having high MFR value, and furthermore, it has been desired to develop an improved technology reducing the amount of fines, and having good powder characteristics and high polymerization activity at the same time. In particular, in a gas-phase process having the heat removal system for polymerization utilizing the heat of vaporization of liquefied propylene, which is advantageous in productivity, it has been desired to apply the most effective catalyst system.

Patent Document 1: JP-A-59-230010
Patent Document 2: JP-A-3-234707
Patent Document 3: JP-A-63-199203
Patent Document 4: JP-A-63-23721
Patent Document 5: JP-A-62-227431
Patent Document 6: JP-A-8-127615
Patent Document 7: JP-A-5-117317
Patent Document 8: JP-A-6-122724
Patent Document 9: JP-A-7-25927
Patent Document 10: JP-A-8-67710
Patent Document 11: JP-A-2000-7725
Patent Document 12: JP-A-8-3215
Patent Document 13: JP-A-2004-315742
Patent Document 14: JP-A-2005-48045
Patent Document 15: JP-A-8-100019
Patent Document 16: JP-A-8-157519

SUMMARY OF THE INVENTION

The objective of the present invention is to achieve reduction of the amount of fines, which is a problem in the conventional technologies, in a gas-phase polymerization process for producing a polypropylene-based polymer having the excellent product quality in high yield and in well-established stability.

In addition, the other objective of the present invention is to achieve high productivity of polypropylene having the excellent product quality and high MFR value.

In detail, the objectives of the present invention are to provide a method for producing polypropylene in high productivity by using a specific gas-phase process in combination with specific solid catalyst components, in particular, for a propylene-based polymer containing reduced amount of fine or lump and having high bulk density and good fluidity in high productivity and in well-established stability, and furthermore a production method for a propylene-based block copolymer having reduced gel and excellent appearance characteristics, a propylene-based polymer produced thereby, a propylene-based polymer composition made thereof and a molded body made thereof.

The present inventors have intensively studied to solve the above-described problems, and found that in the case of using, as a polymerization catalyst for propylene, a solid catalyst component (A) prepared by contacting the following specific components (A1), (A2) and (A3), and combining it with a gas-phase process where heat is removed mainly by the heat of vaporization of liquefied propylene, catalyst activity was uniform, and polymer chains were produced relatively uniformly, resulting in polypropylene tough enough for fracture and less amount of fines. Furthermore, we found that productivity of a propylene-based polymer having high MFR value can be enhanced significantly, not observed in a conventional slurry polymerization process, and have completed the present invention:

a component (A1): a solid component containing titanium, magnesium and a halogen as essential components;
a component (A2): a vinylsilane compound; and
a component (A3): an organosilicon compound having an alkoxy group (A3a) and/or a compound having at least two ether bonds (A3b).

That is, according to the first aspect of the present invention, a method for producing a propylene-based polymer is provided by a gas-phase process where reaction heat is removed mainly by heat of vaporization of liquefied propylene, characterized by using a solid catalyst component (A) prepared by contacting the following components (A1), (A2) and (A3):

a component (A1): a solid component containing titanium, magnesium and a halogen as essential components;
a component (A2): a vinylsilane compound; and a component (A3): an organosilicon compound having an alkoxy group (A3a) and/or a compound having at least two ether bonds (A3b).

In addition, according to the second aspect of the present invention, the method for producing a propylene-based polymer is provided, in the first aspect, characterized in that the solid catalyst component (A) is prepared by further contacting the following component (A4):

a component (A4): an organoaluminum compound).

In addition, according to the third aspect of the present invention, the method for producing a propylene-based polymer is provided, in the first aspect or the second aspect, characterized in that the solid catalyst component (A) is prepared by further contacting the following component (A5):

a component (A5): a halogen-containing silicon compound represented by the following general formula (5):

(wherein $R^{11}$ is a hydrogen atom, a saturated aliphatic hydrocarbon group or an aromatic hydrocarbon group; X is a halogen atom; and "a" is an integer of 0, 1, 2 or 3).

In addition, according to the fourth aspect of the present invention, the method for producing a propylene-based polymer is provided, in any one of the first to the third aspects, characterized in that the solid catalyst component (A) is prepared by contacting the components (A1) to (A3), the components (A1) to (A4) or the components (A1) to (A5) under inert gas atmosphere at the temperature range of −50° C. to 200° C. for 30 minutes or longer.

In addition, according to the fifth aspect of the present invention, the method for producing polypropylene is provided, in the first aspect, characterized in that the gas-phase process has a reactor equipped with an agitator.

In addition, according to the sixth aspect of the present invention, the method for producing polypropylene is provided, in the fifth aspect, characterized in that the reactor equipped with an agitator is a horizontal reactor equipped with an agitator inside, which rotates around a horizontal axis thereof.

In addition, according to the seventh aspect of the present invention, the method for producing a propylene-based copolymer is provided, in any one of the first to the sixth aspects, characterized in that the gas-phase process has two stages of polymerization as follows: at the first stage, propylene is homo-polymerization or co-polymerized with one or more kinds of comonomers selected from the group consisting of ethylene and $C_4$ to $C_8$ α-olefins and at the second stage, propylene is co-polymerized with one or more kinds of comonomers selected from the group consisting of ethylene and $C_4$ to $C_8$ α-olefins in the higher ratio of the said comonomer than that at the first stage.

In addition, according to the eighth aspect of the present invention, the method for producing a propylene-based copolymer is provided, in the seventh aspect, characterized in that the following component (F) is added as a killing agent, at the first stage and/or the second stage:

a component (F): an electron donating compound.

In addition, according to the ninth aspect of the present invention, the method for producing a propylene-based copolymer is provided, in the eighth aspect, characterized in that the component (F) is added at any position from the downstream end to the ⅓ length upstream end of the reactor for the first stage, or from the upstream end to the ⅓ length downstream of the reactor for the second stage, or at both thereof.

In addition, according to the tenth aspect of the present invention, the method for producing a propylene-based polymer is provided, in the first aspect, characterized in that the vinylsilane compound (A2) is a compound represented by the following general formula (2):

(wherein X represents a halogen; $R^1$ represents hydrogen or a hydrocarbon group; $R^2$ represents hydrogen or a hydrocarbon group or an organosilicon group; provided that m≧1, 0≦n≦3, 0≦j≦3, 0≦k≦2 and m+n+j+k=4).

In addition, according to the eleventh aspect of the present invention, the method for producing a propylene-based polymer is provided, in the first aspect, characterized in that the organosilicon compound having an alkoxy group (A3a) is a compound represented by the following general formula (3a):

(wherein $R^3$ represents a hydrocarbon group or a hetero atom-containing hydrocarbon group; $R^4$ represents an arbitrary substituent selected from hydrogen, a halogen, a hydrocarbon group and a hetero atom-containing hydrocarbon group; $R^5$ represents a hydrocarbon group; provided that 0≦a≦2, 1≦b≦3 and a+b=3).

In addition, according to the twelfth aspect of the present invention, the method for producing a propylene-based polymer is provided, in the first aspect, characterized in that the compound having at least two ether bonds (A3b) is a compound represented by the following general formula (3b):

$$R^8O—C(R^7)_2—C(R^6)_2—C(R^7)_2—OR^8 \quad (3b)$$

(wherein $R^6$ and $R^7$ represent any substituent selected from the group consisting of hydrogen, a hydrocarbon group and a hetero atom-containing hydrocarbon group; and $R^8$ represents a hydrocarbon group or a hetero atom-containing hydrocarbon group).

In addition, according to the thirteenth aspect of the present invention, the method for producing a propylene-based polymer is provided, in the second aspect, characterized in that the organoaluminum compound (A4) is a compound represented by the following general formula (4):

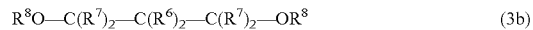

(in the general formula (4), $R^9$ represents a hydrocarbon group; X represents a halogen or hydrogen; $R^{10}$ represents a hydrocarbon group or a cross-linking group bridged by Al; provided that c≧1, 0≦d≦2, 0≦e≦2 and c+d+e=3).

In addition, according to the fourteenth aspect of the present invention, the method for producing a propylene-based polymer is provided, in the first aspect, characterized in that the solid catalyst component (A) is pre-polymerized.

In addition, according to the fifteenth aspect of the present invention, the method for producing a propylene-based polymer is provided, in the first aspect, characterized in that use amount of the component (A2) is used in the range of 1.0 to 10, in molar ratio relative to a titanium component of the component (A1).

In addition, according to the sixteenth aspect of the present invention, the method for producing a propylene-based polymer is provided, in the first aspect, characterized in that the uniformity degree of particles of the solid catalyst component (A) is in the range of 1.1 to 2.0.

In addition, according to the seventeenth aspect of the present invention, the method for producing a propylene-based polymer is provided, in the first aspect, characterized by no peroxide used.

In addition, according to the eighteenth aspect of the present invention, the method for producing polypropylene is provided, in the first aspect, characterized in that the relative amount of fines with respect to the production, whose size is equal to or smaller than 100 μm in the diameter, is no more than 0.10 g/kg.

In addition, according to the nineteenth aspect of the present invention, a propylene-based polymer obtained by the method for production is provided, in any one of the first to the eighteenth aspects.

In addition, according to the twentieth aspect of the present invention, the propylene-based polymer is provided, in the nineteenth aspect, characterized by being a propylene homopolymer whose MFR value is of equal to or higher than 50 g/10 minutes at 230° C. and 21.18N.

In addition, according to the twenty-first aspect of the present invention, the propylene-based polymer is provided, in the nineteenth aspect, characterized by being a propylene-based random copolymer whose MFR value is in the range of 10 g/10 minutes to 1000 g/10 minutes at 230° C. and 21.18N.

In addition, according to the twenty-second aspect of the present invention, the propylene-based polymer is provided, in the nineteenth aspect, characterized by being a propylene-based block copolymer containing the following polymer components (a) and (b) in the weight ratio of 10:90 to 84:16;
a polymer component (a): a propylene homopolymer, or a random copolymer of propylene and one or more kinds of comonomers selected from the group consisting of ethylene and $C_4$ to $C_8$ α-olefins, whose comonomer content is no more than 5% by weight, and whose MFR value is equal to or higher than 50 g/10 minutes at 230° C. and 21.18N; and
a polymer component (b): a random copolymer of propylene and one or more kinds of comonomers selected from the group consisting of ethylene and $C_4$ to $C_8$ α-olefins whose propylene content is in the range of 20% by weight to 80% by weight.

In addition, according to the twenty-third aspect of the present invention, a propylene-based polymer composition made by compounding a nucleating additive to the propylene-based polymer is provided according to any one of the nineteenth to twenty-second aspects.

In addition, according to the twenty-fourth aspect of the present invention, an injection-molded body of the propylene-based polymer composition is provided according to the twenty-third aspect.

A method for producing polypropylene of the present invention is conducted by a gas-phase process where the reaction heat is removed mainly by the heat of vaporization of liquefied propylene, and the catalyst previously contacted with the specific components reduced the amount of fines, therefore, in a gas-phase process where a large amount of vaporized gas is generated and fines are easily accompanied with it, polypropylene can be industrially produced in high productivity. In addition, in a gas-phase process which has an agitator, the amount of fines tends to increase by physical contact of a polymer with the agitator, however, the catalyst previously contacted with the specific components of the present invention can reduce the amount of fines even in the process.

In addition, morphology of the obtained polymer powders is good, and reduction of the amount of fines decreases a load in the gas exhaust line system, and enhances the operation stability of the reactors and the downstream system, and furthermore, the economical process is achieved due to high catalytic activity and suppressed production cost.

Furthermore, use of a method for producing polypropylene of the present invention is capable of producing a propylene-based polymer having high MFR value, for example, a polypropylene homopolymer, a propylene-based random copolymer and a propylene-based block copolymer, in high productivity.

In addition, because of high stereoregularity of the obtained polypropylene, a high quality product with high rigidity and less stickiness can be obtained. In addition, because the comonomer content in a random copolymer component can be increased, a high quality product, with the excellent balance of rigidity and impact strength, not only at room temperature but also at low temperature, can be obtained. Polypropylene obtained in this way can be used suitably, in particular, for injection molding applications represented by automotive parts or home appliances parts.

Figure 1:
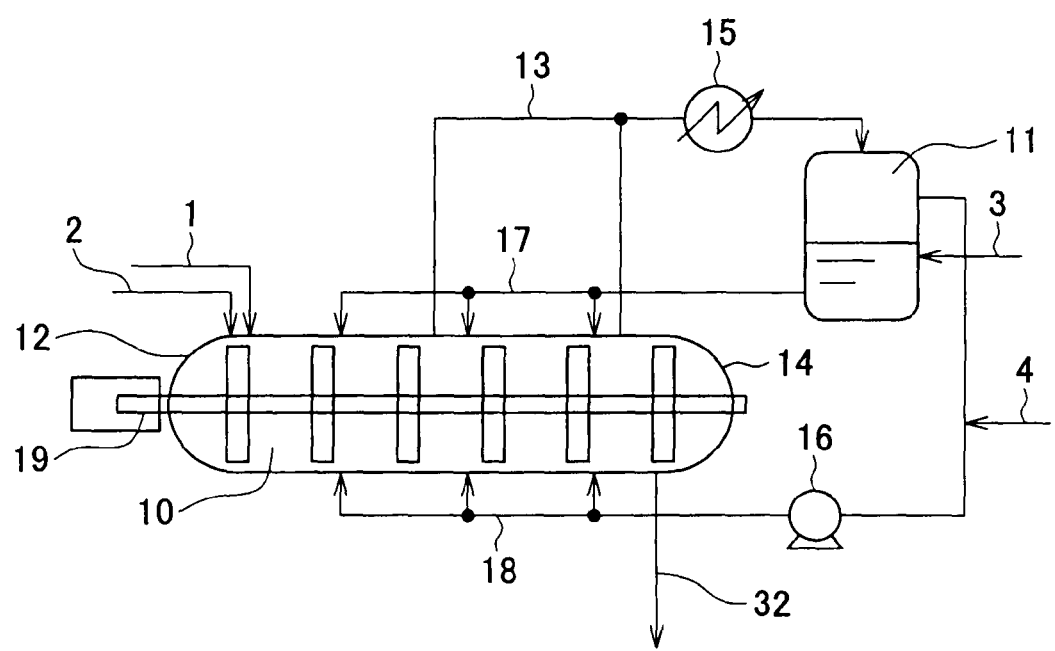
FIG. 1 is a schematic drawing of a process using a horizontal reactor, as a preferable embodiment of a gas-phase process of the present invention.

NOTATION 1, 2: Pipelines for supplying a catalyst component
3, 5: Pipelines for replenishing raw material propylene
4, 6: Pipelines for replenishing raw materials (hydrogen and the like)
7, 408: Pipelines for adding a (polymerization) activity inhibitor
8, 9a, 9b, 9c: Pipelines for supplying a component (F)
10: Polymerization reactor (the first polymerization step)
11, 21: Vapor-liquid separation tanks
12, 22: The upstream ends of reactors
13, 23, 404, 407: Pipelines for exhausting unreacted gas
14, 24: The downstream ends of reactors
15, 25, 312, 322: Condensers
16, 26: Compressors
17, 27, 403, 406: Pipelines for replenishing raw material liquefied propylene
18, 28, 402, 405; Pipelines for supplying raw material mixed gases
19, 29, 315, 325: Rotation shafts
20: Polymerization reactor (the second polymerization step)
30: Degassing tank
32, 39, 411, 413: Pipelines for discharging a polymer
35, 412: Pipelines for supplying a polymer
40: Gas recovery apparatus
50: Bag filter
311, 321: Pipelines for exhausting recycling gas
313, 323: Condenser of recycling gas
314, 324: Pipelines for supplying a recycling mixed raw material
316: Variable-type pipeline

DETAILED DESCRIPTION OF THE INVENTION

Explanation will be given below on the present invention specifically and in detail, for a catalyst, production process and conditions, a propylene-based polymer, and applications of a propylene-based polymer.

[I] Catalyst

The present invention is characterized by using a solid catalyst component (A), which is made by contacting a solid component (A1) containing titanium, magnesium and a halogen as essential components; a vinylsilane compound (A2); organosilicon compound having an alkoxy group (A3a) and/or a compound having at least two ether bonds (A3b), to contact treatment, as a catalyst for polypropylene.

It is preferable that an organoaluminum compound (A4) or a halogen-containing silicon compound (A5) is contacted in addition to them, in the solid catalyst preparation.

In addition, optional components such as an organoaluminum compound (B), an organosilicon compound (C) and a compound having at least two ether bonds (D) and the like may be used, within a range not to impair the effects of the present invention, in polymerization.

1. Solid Catalyst Component (A)

The solid catalyst component (A) used in the present invention is prepared by contacting the following (A1) to (A3). In the preparation, other optional components such as an organoaluminum compound (A4) may be contacted by an arbitrary method, within a range not to impair the effects of the present invention. Explanation will be given in detail on each of the components.

(1) A Solid Component (A1)

In the present invention, as the solid component (A1), titanium (A1a), magnesium (A1b) and a halogen (A1c) are contained as essential components, and an electron donor (A1d) may be used as an optional component. Here, "are contained as essential components" means that optional components, other than the exemplified three components, may be contained in arbitrary forms within a range not to impair the effects of the present invention. A solid component, containing titanium, magnesium and a halogen as essential components itself is known, and will be explained below in detail.

(A1a) Titanium

As a titanium source, an arbitrary titanium compound can be used. As a typical example thereof, a compound disclosed in JP-A-3-234707 may be included. As for valence of titanium, a titanium compound having arbitrary valence of tetra-, tri-, di- or zero-valence may be used, however, it is desirable that a titanium compound having preferably tetra- and tri-valence, more preferably a titanium compound having tetra-valence is used.

As a specific example of a tetra-valent titanium compound, we can exemplify halogenated titanium compounds as represented by titanium tetrachloride; alkoxy titanium compounds as represented by tetrabutoxy titanium; condensation compounds of an alkoxy titanium compound having a Ti—O—Ti bond as represented by tetrabutoxy titanium dimer, $(BuO)_3Ti-O-Ti(OBu)_3$; organometallic titanium compounds as represented by dicyclopentadienyltitanium dichloride; or the like. Among them, titanium tetrachloride and tetrabutoxy titanium are particularly preferable.

As a specific example of a three-valent titanium compound, titanium halide compounds represented by titanium trichloride may be included. As titanium trichloride, compounds produced by a known arbitrary method may be used, such as a hydrogen reduced-type, a metal aluminum reduced-type, a metal titanium reduced-type, an organoaluminum reduced-type or the like.

The above titanium compounds may be used singly or in combination of them. In addition, it is possible to use a mixture of the above titanium compounds, or a compound having an average composition equal to a mixed equation thereof (for example, a compound such as $Ti(OBu)_mCl_{4-m}$; $0 \leq m \leq 4$), or a complex with any other compound such as a phthalate ester (for example, a compound such as $Ph(CO_2Bu)_2 \cdot TiCl_4$) or the like.

(A1b) Magnesium

As a magnesium source, an arbitrary magnesium compound may be used. As a typical example thereof, a compound disclosed in JP-A-3-234707 may be included. In general, there may be used magnesium halide compounds as represented by magnesium chloride; alkoxy magnesium compounds as represented by diethoxy magnesium; oxymagnesium compounds as represented by metal magnesium, magnesium oxide; hydroxy magnesium compounds as represented by magnesium hydroxide; Grignard compounds as represented by butyl magnesium chloride; organometallic magnesium compounds as represented by butyl ethyl magnesium; magnesium salts of an inorganic acid and an organic acid as represented by magnesium carbonate or magnesium stearate; and a mixture thereof, or a compound having an average composition equal to a mixed equation thereof (for example, a compound such as $Mg(OEt)_mCl_{2-m}$; $0 \leq m \leq 2$) and the like. Among them, particularly preferable ones are magnesium chloride, diethoxy magnesium, metal magnesium and butyl magnesium chloride.

In particular, if large particles are produced, it is preferable to use a dialkoxymagnesium compound, by which a catalyst particle diameter is easily controlled. As a dialkoxymagnesium compound, we can use not only one produced in advance but also one obtained by the reaction between metal magnesium and alcohol in the presence of a halogen or a halogen-containing metal compound, in the catalyst preparation.

Furthermore, in the present invention, dialkoxymagnesium suitable for the component (A1b) is in the form of a granule or a powder, and irregular or spherical shape may be applicable. For example, a spherical dialkoxymagnesium is used, polymer powders having a better particle shape and narrow particle size distribution can be obtained, and handling operability of generated polymer powders in the polymerization operation is enhanced, and such a problem can be solved as clogging caused by fines contained in the generated polymer powders.

The above spherical dialkoxymagnesium is not necessarily a true sphere, and one having an ellipse shape or a potato shape may also be used. Specifically, as the shape of the particle, ratio of a longer shaft diameter l to a shorter shaft diameter W, (l/W), is equal to or smaller than 3, preferably from 1 to 2, and more preferably from 1 to 1.5.

In addition, as the dialkoxymagnesium, one having an average particle diameter of 1 to 200 μm, preferably from 5 to 150 μm may be used. In the case of the spherical dialkoxymagnesium, the average particle diameter thereof is from 1 to 100 μm, preferably from 5 to 500 μm, and more preferably from 10 to 40 μm. In addition, as for the particle size distribution thereof, it is desirable to use one having less fine and large powders, and narrow particle size distribution. Specifically, the amount of particles whose diameter is no more than 5 μm is no more than 20%, preferably than 10%. On the other hand, the amount of particles whose diameter is no less than 100 μm is no more than 10%, preferably than 5%. Furthermore, when the particle size distribution thereof is represented by ln(D90/D10) (wherein D90 is a particle diameter at 90% in the integral distribution curve; and D10 is a particle diameter at 10%), it is equal to or smaller than 3, and preferably equal to or smaller than 2.

A method for producing the spherical dialkoxymagnesium as above is exemplified in, for example, JP-A-58-41832, JP-A-62-51633, JP-A-3-74341, JP-A-4-368391, JP-A-8-73388 or the like.

(A1c) A Halogen

As the halogen, fluorine, chlorine, bromine, iodine and a mixture thereof may be used. Among them, chlorine is particularly preferable. It is general that the halogen is supplied from the above titanium compounds and/or the magnesium compound, however, it may be supplied from other compounds. A group of typical examples may include silicon halide compounds as represented by silicon tetrachloride; aluminum halide compounds as represented as aluminum chloride; organohalide compounds as represented by 1,2-dichloroethane or benzyl chloride;

borane halide compounds as represented by trichloroborane; phosphorus halide compounds as represented by phosphorus pentachloride; tungsten halide compounds as represented by tungsten hexachloride; molybdenum halide compounds as represented by molybdenum pentachloride; or the like. These compounds may be used not only singly but also in combination. Among them, silicon tetrachloride is particularly preferable.

(A1d) An Electron Donor

The solid component (A1) may contain the electron donor as an optional component. As a typical example of the electron donor (A1d), a compound disclosed in JP-A-2004-124090 is included. In general, it is desirable to use an organic acid or an inorganic acid, and their derivative (ester, acid anhydride, acid halide, or amide) compounds thereof, ether compounds, ketone compounds, aldehyde compounds, alcohol compounds, amine compounds or the like.

As the organic acid compound that may be used as the electron donor, we can exemplify aromatic polyvalent carboxylic acid compounds as represented by phthalic acid; aromatic carboxylic acid compounds as represented by benzoic acid; aliphatic polyvalent carboxylic acid compounds as represented by malonic acid having one or two substituents at the 2-position, such as 2-n-butyl-malonic acid, or succinic acid having one or two substituents at the 2-position or one or more substituents at each of the 2- and the 3-position, such as 2-n-butyl succinic acid; aliphatic carboxylic acid compounds as represented by propionic acid; aromatic and aliphatic sulfonic acid compounds as represented by benzene sulfonic acid or methane sulfonic acid; and the like. These carboxylic acid compounds and sulfonic acid compounds may have arbitrary number of unsaturated bonds at arbitrary positions in a molecule, like maleic acid, regardless of an aromatic or an aliphatic compound.

As the derivative compounds of the organic acid that may be used as the electron donor, ester, acid anhydride, acid halide, amide and the like of the above organic acid may be exemplified.

As a component of the esters, aliphatic and aromatic alcohols may be used. Among these alcohols, alcohols composed of a $C_1$ to $C_{20}$ aliphatic substituent, such as an ethyl group, a butyl group, an isobutyl group, a heptyl group, an octyl group, a dodecyl group is preferable. Still more, alcohols composed of a $C_2$ to $C_{12}$ aliphatic free radical are desirable. In addition, alcohols composed of an alicyclic substituent such as a cyclopentyl group, a cyclohexyl group, a cycloheptyl group may be used as well.

As a component of the acid halides, fluorine, chlorine, bromine, iodine and the like may be used. Among them, chlorine is most preferable. In the case of a polyhalide of a polyvalent organic acid, halogens may be the same or different.

As a component of the amides, aliphatic and aromatic amines may be used. Among these amines, ammonia, aliphatic amines represented by ethylamine or dibutylamine, amines having an aromatic substituent in a molecule as represented by aniline or benzylamine, and the like may be exemplified as preferable compounds.

In addition, as compounds that may be used as the carboxylic acid derivatives, compounds containing some functional groups in the same molecule may be also used. An example of such compounds includes ester compounds having alkoxy groups in the molecule as represented by 2-ethoxyethyl acetate, ethyl 3-ethoxy-2-t-butylpropionate; ketoester compounds as represented by ethyl 2-benzoyl-benzoate; and the like.

These carboxylic acid derivatives may be used not only singly but also in combination of them. Among them, preferable ones include phthalic acid ester compounds as represented by diethyl phthalate, dibutyl phthalate, diisobutyl phthalate and diheptyl phthalate; phthalic acid halide compounds as represented by phthaloyl dichloride; phthalic anhydride derivatives as represented by phthalic anhydride; benzoic acid ester compounds as represented by ethyl benzoate; malonic acid ester compounds having one or two substituents at the 2-position, such as diethyl 2-n-butylmalonate; succinic acid ester compounds having one or two substituents at the 2-position or one or more substituents at each of the 2- and the 3-position, such as diethyl 2-n-butylsuccinate; and the like.

As inorganic acid compounds that may be used as electron donors, carbonic acid, phosphoric acid, silicic acid, sulfuric acid, nitric acid and the like may be exemplified. As derivative compounds of these inorganic acids, it is desirable to use esters, including as specific examples, tetraethoxysilane (ethyl silicate), tetrabutoxysilane (butyl silicate) and the like.

As ether compounds that may be used as electron donors, aliphatic ether compounds as represented by dibutyl ether; aromatic ether compounds as represented by diphenyl ether; aliphatic polyvalent ether compounds as represented by 1,3-dimethoxy propane having one or two substituents at the 2-position, such as 2-isopropyl-2-isobutyl-1,3-dimethoxypropane, or 2-isopropyl-2-isopentyl-1,3-dimethoxypropane; polyvalent ether compounds having an aromatic substituent in a molecule as represented by 9,9-bis(methoxymethyl) fluorene; and the like may be exemplified. Preferable examples of the polyvalent ether compounds may be selected from exemplifications of the compound having at least 2 ether bonds (A3b) in the present description.

As ketone compounds that may be used as electron donors, aliphatic ketone compounds as represented by methyl ethyl ketone; aromatic ketone compounds as represented by acetophenone; polyvalent ketone compounds as represented by 2,2,4,6,6-pentamethyl-3,5-heptanedione; and the like may be exemplified.

As aldehyde compounds that may be used as electron donors, aliphatic aldehyde compounds as represented by propionaldehyde; aromatic aldehyde compounds as represented by benzaldehyde; and the like may be exemplified.

As alcohol compounds that may be used as electron donors, aliphatic alcohol compounds as represented by butanol or 2-ethylhexanol; phenol derivative compounds as represented by phenol, cresol; aliphatic or aromatic polyvalent alcohol compounds as represented by glycerin or 1,1'-bi-2-naphthol; and the like may be exemplified.

As amine compounds that may be used as electron donors, aliphatic amine compounds as represented by diethylamine; nitrogen-containing alicyclic compounds as represented by 2,2,6,6-tetramethyl-piperidine; aromatic amine compounds as represented by aniline; nitrogen atom-containing aromatic compounds as represented by pyridine; polyvalent amine compounds as represented by 1,3-bis(dimethylamino)-2,2-dimethylpropane; and the like may be exemplified.

In addition, as compounds that may be used as electron donors, compounds containing some of the above functional groups in the same molecule may be used as well. As an example of such compounds, ester compounds having alkoxy groups in a molecule as represented by 2-ethoxyethyl acetate or ethyl 3-ethoxy-2-t-butylpropionate; ketoester compounds as represented by ethyl 2-benzoyl-benzoate; ketoether compounds as represented by (1-t-butyl-2-methoxyethyl)methyl ketone; aminoether compounds as represented by N,N-dimethyl-2,2-dimethyl-3-methoxypropyl amine; halogenoether compounds as represented by epoxychloropropane; and the like may be exemplified.

These electron donors may be used not only singly but also in combination of them. Among them, preferable ones include phthalic acid ester compounds as represented by dibutyl phthalate, diisobutyl phthalate, diheptyl phthalate; phthalic acid halide compounds as represented by phthaloyl dichloride; malonic acid ester compounds having one or two substituents at the 2-position such as diethyl 2-n-butylmalonate; succinic acid ester compounds having one or two substituents at the 2-position or one or more substituents at each of the 2- and the 3-position, such as diethyl 2-n-butyl-succinate; aliphatic polyvalent ether compounds as represented by 1,3-dimethoxy propane such as 2-isopropyl-2-isobutyl-1,3-dimethoxypropane or 2-isopropyl-2-isopentyl-1,3-dimethoxypropane; polyvalent ether compounds having an aromatic substituent in a molecule as represented by 9,9-bis(methoxymethyl) fluorene; and the like.

Ratio of the amounts of each components used, which composes the solid component (A1) in the present invention, may be arbitrary within the range not to impair the effects of the present invention, however, in general, the following range is preferable.

It is desirable to use the titanium compounds preferably within the range of 0.0001 to 1,000, particularly preferably within the range of 0.01 to 10, in molar ratio with respect to the amount of the magnesium compounds used (moles of the titanium compounds/moles of the magnesium compounds).

When any compound is used as the source of halogen except for magnesium compounds and titanium ones, it is desirable to use it preferably within the range of 0.01 to 1,000, whether the magnesium compounds or titanium ones have halogens or not, particularly preferably within the range of 0.1 to 100 in molar ratio with respect to the magnesium compounds used (moles of the compound of halogen source/moles of the magnesium compounds).

When the electron donor is used as an optional component in the preparation of the solid component (A1), it is desirable to use it preferably within the range of 0.001 to 10, particularly preferably within the range of 0.01 to 5, in molar ratio with respect to the amount of the magnesium compounds used (moles of the electron donor/moles of the magnesium compounds).

The solid component (A1) in the present invention is obtained by contacting each components described above in the above quantity ratio. Contact conditions of each component may be arbitrary, within the range not to impair the effects of the present invention, although absence of oxygen is necessary. In general, the following conditions are preferable.

Contact temperature is in the range of about −50 to 200° C., and preferably in the range of 0 to 100° C. As a contact method, we can exemplify a mechanical method by a rotation ball mill or a vibration mill or the like; a method for contacting by agitation in the presence of an inert diluent; or the like.

In the preparation of the solid component (A1), washing with an inert solvent may be conducted in the middle and/or at the end. Preferable solvent species include aliphatic hydrocarbon compounds such as heptane; aromatic hydrocarbon compounds such as toluene; halogen-containing hydrocarbon compounds such as 1,2-dichloroethylene or chlorobenzene; and the like.

As a preparation method for the solid component (A1) in the present invention, an arbitrary method may be used. Specifically, methods disclosed below may be exemplified. It should be noted that the present invention should not be limited to the following exemplifications.

(i) A method for contacting halogen-containing magnesium compounds represented by magnesium chloride with titanium-containing compounds. An optional component such as an electron donor or a halogen-containing silicon compound may be contacted, if necessary. In this case, the optional component may be contacted with the titanium-containing compounds simultaneously, or may be contacted separately.

(ii) A method for dissolving halogen-containing magnesium compounds represented by magnesium chloride with alcohol compounds, epoxy compounds or phosphate ester compounds or the like, and contacting with halogen-containing titanium compounds represented by titanium tetrachloride. Before contacting with the halogen-containing titanium compounds, it can be formed into the particles by a method such as a spray drying or dropping into a poor solvent such as a cooled hydrocarbon solvent. In addition, an optional component such as an electron donor or a silicon halide compound may be contacted, if necessary. In this case, the optional component may be contacted with the halogen-containing titanium compounds simultaneously, or may be contacted separately.

(iii) A method for contacting a solid component, which is obtained by contacting halogen-containing magnesium compounds represented by magnesium chloride with titanium compounds having an alkoxy group represented by tetrabutoxytitanium and a specific polymer silicon compound, with halogen-containing titanium compounds represented by titanium tetrachloride and/or halogen-containing silicon compounds represented by silicon tetrachloride. As the polymer silicon compound, one represented by the following general formula (1) is suitable:

$$[-Si(H)(R)-O-]_q \qquad (1)$$

(wherein R is an about $C_1$ to $C_{10}$ hydrocarbon group; and q represents a polymerization degree so that the viscosity of the polymer silicon compound is in the range of about 1 to 100 centistokes.)

A specific example of the compound includes methyl hydrogen polysiloxane, phenyl hydrogen polysiloxane, 1,3,5,7-tetramethylcyclotetrasiloxane; and the like. In addition, an optional component such as an electron donor may be contacted, if necessary. In this case, the optional component may be contacted with the halogen-containing titanium compounds and/or the halogen-containing silicon compounds simultaneously, or may be contacted separately.

(iv) A method for contacting magnesium compounds having an alkoxy group represented by diethoxymagnesium with titanium compounds having an alkoxy group represented by tetrabutoxytitanium, and then contacting with a halogenating agent or halogen-containing titanium compounds represented by titanium tetrachloride. An optional component such as an electron donor may be contacted, if necessary. In this case, the optional component may be contacted with the halogenating agent or the halogen-containing titanium compounds simultaneously, or may be contacted separately.

(v) A method for contacting magnesium compounds having an alkoxy group represented by diethoxymagnesium with halogen-containing titanium compounds represented by titanium tetrachloride. An optional component such as an electron donor or a silicon halide compound may be contacted, if necessary. In this case, the optional component may be contacted with the halogen-containing titanium compounds simultaneously, or may be contacted separately.

(vi) A method for contacting metal magnesium with an alcohol and, if necessary, an iodine-containing compounds represented by iodine, and then contacting with halogen-containing titanium compounds represented by titanium tetrachloride. An optional component such as an electron donor or a silicon halide compound may be contacted, if necessary. In this case, the optional component may be contacted with the halogen-containing titanium compounds simultaneously, or may be contacted separately.

(vii) A method for contacting organomagnesium compounds such as a Grignard reagent represented by butylmagnesium chloride with titanium-containing compounds. As the titanium-containing compounds, titanium compounds having an alkoxy group represented by tetrabutoxytitanium, or halogen-containing titanium compounds represented by titanium tetrachloride or the like may be used. An optional component such as an electron donor, a silicon compound having an alkoxy group represented by tetraethoxysilane, and silicon halide compounds may be contacted, if necessary. In this case, the optional component may be contacted with the titanium-containing compounds simultaneously, or may be contacted separately.

(2) A Vinylsilane Compound (A2)

As the vinylsilane compound (A2) used in the present invention, compounds disclosed in JP-A-2-34707 and JP-A-2003-292522 may be used. These vinylsilane compounds are compounds, having a structure where at least one of hydrogen atoms of monosilane, (SiH$_4$), is substituted with a vinyl group, and a part of or all of the remaining hydrogen atoms are substituted with other substituents, which can be represented by the following general formula (2):

$$[CH_2=CH-]_m SiX_n R^1_j (OR^2)_k \quad (2)$$

(in the general formula (2), X represents a halogen; $R^1$ represents hydrogen or a hydrocarbon group; $R^2$ represents hydrogen or a hydrocarbon group or an organosilicon group; provided that $m \geq 1$, $0 \leq n \leq 3$, $0 \leq j \leq 3$, $0 \leq k \leq 2$, and $m+n+j+k=4$.)

In the general formula (2), m represents the number of a vinyl group, and is in the range of 1 to 4; more preferably m is desirably 1 or 2, and particularly preferably 2.

In the general formula (2), X represents a halogen and may be exemplified by fluorine, chlorine, bromine, iodine or the like. If there are some Xs, each of them may be the same or different. Among them, chlorine is particularly preferable. "n" represents the number of a halogen and is in the range of 0 to 3; more preferably n is desirably in the range of 0 to 2, and particularly preferably 0.

In the general formula (2), $R^1$ represents hydrogen or a hydrocarbon group, preferably hydrogen or a $C_1$ to $C_{20}$ hydrocarbon group, and more preferably an arbitrary substituent selected from hydrogen or a $C_1$ to $C_{12}$ hydrocarbon group. A preferable example of $R^1$ includes hydrogen; an alkyl group represented by a methyl group or a butyl group; a cycloalkyl group represented by a cyclohexyl group; an aryl group represented by a phenyl group; and the like. A particularly preferable example of $R^1$ includes hydrogen, a methyl group, an ethyl group, a phenyl group and the like. "j" represents the number of $R^1$, and is in the range of 0 to 3; more preferably "j" is desirably in the range of 1 to 3, still more preferably in the range of 2 to 3, and particularly preferably 2. If j is no less than 2, each of $R^1$s present may be the same or different.

In the general formula (2), $R^2$ represents hydrogen or a hydrocarbon group or an organosilicon group. When $R^2$ is a hydrocarbon group, it may be selected from the same compound group as $R^1$. When $R^2$ is an organosilicon group, it is preferable to be an organosilicon group having a $C_1$ to $C_{20}$ hydrocarbon group. A specific example of the organosilicon group that may be used as $R^2$ includes a silicon group such as a silyl group having an alkyl group as represented by a trimethylsilyl group; a silyl group having an aryl group as represented by a dimethylphenylsilyl group; a silyl group having a vinyl group as represented by a dimethylvinylsilyl group; and a compound having a formula of the combination thereof represented by propylphenylvinylsilyl group. "k" represents the number of $R^2$, and is in the range of 0 to 2. In the case of a compound corresponding to a k value of 3, such as vinyltriethoxysilane, it does not work as the vinylsilane compound (A2) in the present invention, but works as an organosilicon compound having an alkoxy group (A3c) in the present invention, therefore it is not preferable. It may be because it behaves in the same manner as t-butyltriethoxysilane having a similar structure (as will be described later, this t-butyltriethoxysilane is effective as the organosilicon compound having an alkoxy group (A3c) in the present invention). More preferably, it is desirable that the k value is in the range of 0 to 1, and particularly preferably 0. If the k value is 2, each of two $R^2$s may be the same or different. In addition, regardless of the k value, $R^1$ and $R^2$ may be the same or different.

These vinylsilane compounds may be used not only singly but also in combination of them. A example of a preferable compound includes $CH_2=CH-SiMe_3$, $[CH_2=CH-]_2 SiMe_2$, $CH_2=CH-Si(Cl)Me_2$, $CH_2=CH-Si(Cl)_2Me$, $CH_2=CH-SiCl_3$, $[CH_2=CH-]_2Si(Cl)Me$, $[CH_2=CH-]_2SiCl_2$, $CH_2=CH-Si(Ph)Me_2$, $CH_2=CH-Si(Ph)_2Me$, $CH_2=CH-SiPh_3$, $[CH_2=CH-]_2Si(Ph)Me$, $[CH_2=CH-]_2SiPh_2$, $CH_2=CH-Si(H)Me_2$, $CH_2=CH-Si(H)_2Me$, $CH_2=CH-SiH_3$, $[CH_2=CH-]_2Si(H)Me$, $[CH_2=CH-]_2SiH_2$, $CH_2=CH-SiEt_3$, $CH_2=CH-SiBu_3$, $CH_2=CH-Si(Ph)(H)Me$, $CH_2=CH-Si(Cl)(H)Me$, $CH_2=CH-Si(Me)_2(OMe)$, $CH_2=CH-Si(Me)_2(OSiMe_3)$, $CH_2=CH-Si(Me)_2-O-Si(Me)_2-CH=CH_2$ and the like. Among them, $CH_2=CH-SiMe_3$ and $[CH_2=CH-]_2SiMe_2$ are more preferable, and $[CH_2=CH-]_2SiMe_2$ is most preferable.

(3) An Organosilicon Compound having an Alkoxy Group (A3a) and/or a Compound having at Least 2 Ether Bonds (A3b)

(A3a) The Organosilicon Compound having an Alkoxy Group

As the organosilicon compound having an alkoxy group (A3a) used in the present invention, a compound disclosed in JP-A-2004-124090 may be used. In general, it is desirable to use a compound represented by the following general formula (3a):

$$R^3R^4{}_a Si(OR^5)_b \qquad (3a)$$

(in the general formula (3a), $R^3$ represents a hydrocarbon group or a hetero atom-containing hydrocarbon group; $R^4$ represents an arbitrary substituent selected from hydrogen, a halogen, a hydrocarbon group and a hetero atom-containing hydrocarbon group; $R^5$ represents a hydrocarbon group; provided that $0 \leq a \leq 2$, $1 \leq b \leq 3$ and $a+b=3$).

In the general formula (3a), $R^3$ represents a hydrocarbon group or a hetero atom-containing hydrocarbon group. The hydrocarbon group that may be used as $R^3$ generally has carbon atoms in the range of 1 to 20, and preferably in the range of 3 to 10. A specific example of the hydrocarbon group that may be used as $R^3$ includes a straight chained aliphatic hydrocarbon group as represented by an n-propyl group; a branched chained aliphatic hydrocarbon group as represented by an i-propyl group or a t-butyl group; an alicyclic hydrocarbon group as represented by a cyclopentyl group or a cyclohexyl group; an aromatic hydrocarbon group as represented by a phenyl group; and the like. More preferably, it is desirable to use the branched chained aliphatic hydrocarbon group or the alicyclic hydrocarbon group; among them, it is desirable to use an i-propyl group, an i-butyl group, a t-butyl group, a hexyl group, a cyclopentyl group, a cyclohexyl group, or the like, as the $R^3$.

When $R^3$ is the hetero atom-containing hydrocarbon group, it is desirable that the hetero atom is selected from nitrogen, oxygen, sulfur, phosphorous and silicon, and particularly, it is desirable to be nitrogen or oxygen. As a skeleton structure of the hetero atom-containing hydrocarbon group of $R^3$, it is desirable to select from the exemplifications for $R^3$ of hydrocarbon group. Among them, an N,N-diethylamino group, a quinolino group, an isoquinolino group or the like is preferable.

In the general formula (3a), $R^4$ represents hydrogen, a halogen, a hydrocarbon group or a hetero atom-containing hydrocarbon group.

As the halogen that may be used as $R^4$, fluorine, chlorine, bromine, iodine or the like may be exemplified. When $R^4$ is the hydrocarbon group, it generally has carbon atoms in the range of 1 to 20, and preferably in the range of 1 to 10. A specific example of the hydrocarbon group that may be used as $R^4$ includes a straight chained aliphatic hydrocarbon group as represented by a methyl group or an ethyl group; a branched chained aliphatic hydrocarbon group as represented by an i-propyl group or a t-butyl group; an alicyclic hydrocarbon group as represented by a cyclopentyl group or a cyclohexyl group; an aromatic hydrocarbon group as represented by a phenyl group; and the like. Among them, it is desirable to use a methyl group, an ethyl group, a propyl group, an i-propyl group, an i-butyl group, a s-butyl group, a t-butyl group, a cyclopentyl group, a cyclohexyl group, or the like.

When $R^4$ is the hetero atom-containing hydrocarbon group, it is desirable to select from the exemplifications for $R^3$ of the hetero atom-containing hydrocarbon group. Specifically, an N,N-diethylamino group, a quinolino group, an isoquinolino group or the like is preferable If the "a" value is 2, each of two $R^4$s may be the same or different. In addition, regardless of the "a" value, $R^4$ and $R^3$ may be the same or different.

In the general formula (3a), $R^5$ represents a hydrocarbon group. The hydrocarbon group that may be used as $R^5$ generally has carbon atoms in the range of 1 to 20, and preferably in the range of 1 to 10 and still more preferably in the range of 1 to 5. A specific example of the hydrocarbon group that may be used as $R^5$ includes a straight chained aliphatic hydrocarbon group as represented by a methyl group or an ethyl group; a branched chained aliphatic hydrocarbon group as represented by an i-propyl group or a t-butyl group; and the like. Among them, a methyl group and an ethyl group are most preferable. If the "b" value is 2 or more, each $R^5$s may be the same or different.

A preferable example of the organosilicon compound having an alkoxy group (A3a) used in the present invention includes t-Bu(Me)Si(OMe)$_2$, t-Bu(Me)Si(OEt)$_2$, t-Bu(Et)Si(OMe)$_2$, t-Bu(n-Pr)Si(OMe)$_2$, c-Hex(Me)Si(OMe)$_2$, c-Hex(Et)Si(OMe)$_2$, c-Pen$_2$Si(OMe)$_2$, i-Pr$_2$Si(OMe)$_2$, i-Bu$_2$Si(OMe)$_2$, i-Pr(i-Bu)Si(OMe)$_2$, n-Pr(Me)Si(OMe)$_2$, t-BuSi(OEt)$_3$, (Et$_2$N)$_2$Si (OMe)$_2$, Et$_2$N—Si(OEt)$_3$,

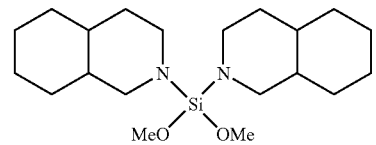

and the like.

These organosilicon compound having an alkoxy group (A3a) may be used singly or but also in combination of them.

(A3b) The Compound having at Least 2 Ether Bonds

As compound having at least 2 ether bonds (A3b) used in the present invention, compounds and the like disclosed in JP-A-3-294302 and JP-A-8-333413 may be used. In general, it is desirable to use a compound represented by the following general formula (3b):

$$R^8O{-}C(R^7)_2{-}C(R^6)_2{-}C(R^7)_2{-}OR^8 \qquad (3b)$$

(in the general formula (3b), $R^6$ and $R^7$ represent any substituent selected from hydrogen, a hydrocarbon group and a hetero atom-containing hydrocarbon group. $R^8$ represents a hydrocarbon group or a hetero atom-containing hydrocarbon group).

In the general formula (3b), $R^6$ represents any substituent selected from hydrogen, a hydrocarbon group and a hetero atom-containing hydrocarbon group.

The hydrocarbon group that may be used as $R^6$ generally has carbon atoms in the range of 1 to 20, and preferably in the range of 1 to 10. A specific example of the hydrocarbon group that may be used as $R^6$ includes a straight chained aliphatic hydrocarbon group as represented by an n-propyl group; a branched chained aliphatic hydrocarbon group as represented by an i-propyl group or a t-butyl group; an alicyclic hydrocarbon group as represented by a cyclopentyl group or a cyclohexyl group; an aromatic hydrocarbon group as represented by a phenyl group and the like. More preferably, it is desirable to use a branched chained aliphatic hydrocarbon group or an alicyclic hydrocarbon group, particularly, it is desirable to use an i-propyl group, an i-butyl group, an i-pentyl group, a cyclopentyl group or a cyclohexyl group or the like as the $R^6$.

Two $R^6$s may form one or more rings by binding each other. In this case, a cyclopolyene-type structure containing 2 or 3 unsaturated bonds in any ring structure is applicable. In addition, it may be fused with other ring structures. It may have one or more hydrocarbon groups, as substituents, on the ring, regardless of a ring type, that is, mono-ring-type, multi-ring-type, or ring fusion. The substituents on the ring are those, in general, having carbon atoms in the range of 1 to 20, preferably in the range of 1 to 10. A specific example includes a straight chained aliphatic hydrocarbon group as represented by an n-propyl group; a branched chained aliphatic hydrocarbon group as represented by an i-propyl group or a t-butyl group; an alicyclic hydrocarbon group as represented by a cyclopentyl group or a cyclohexyl group; an aromatic hydrocarbon group as represented by a phenyl group and the like.

In the general formula (3b), $R^7$ represents any substituent selected from hydrogen, a hydrocarbon group and a hetero atom-containing hydrocarbon group. Specifically, $R^7$ may be selected from the exemplifications of $R^6$, and preferably it is hydrogen.

In the general formula (3b), $R^8$ represents a hydrocarbon group or a hetero atom-containing hydrocarbon group. Specifically, $R^8$ may be selected from the exemplifications for $R^6$ of hydrocarbon group. Preferably, it is desirable to be a $C_1$ to $C_6$ hydrocarbon group, still more preferably, an alkyl group and most preferably, a methyl group.

When $R^6$ to $R^8$ are the hetero atom-containing hydrocarbon groups, it is desirable that the hetero atom is selected from nitrogen, oxygen, sulfur, phosphorous and silicon. In addition, whether $R^6$ to $R^8$ are the hydrocarbon groups or the hetero atom-containing hydrocarbon groups or not, they may contain a halogen arbitrarily. When $R^6$ to $R^8$ contain a hetero atom and/or a halogen, it is desirable that a skeleton structure thereof is selected from the exemplifications of the hydrocarbon groups. In addition, eight substituents of $R^6$ to $R^8$ may be the same or different each other.

A preferable example of the compound having at least 2 ether bonds (A3b) used in the present invention includes
2,2-diisopropyl-1,3-dimethoxypropane,
2,2-diisobutyl-1,3-dimethoxypropane,
2,2-diisobutyl-1,3-diethoxypropane,
2-isobutyl-2-isopropyl-1,3-dimethoxypropane,
2-isopropyl-2-isopentyl-1,3-dimethoxypropane,
2,2-dicyclopentyl-1,3-dimethoxypropane,
2,2-dicyclohexyl-1,3-dimethoxypropane,
2-isopropyl-1,3-dimethoxypropane,
2-tert-butyl-1,3-dimethoxypropane,
2,2-dipropyl-1,3-dimethoxypropane,
2-methyl-2-phenyl-1,3-dimethoxypropane,
9,9-bis(methoxymethyl)fluorene,
9,9-bis(methoxymethyl)-1,8-dichlorofluorene,
9,9-bis(methoxymethyl)-2,7-dicyclopentylfluorene,
9,9-bis(methoxymethyl)-1,2,3,4-tetrahydrofluorene,
1,1-bis(1'-butoxyethyl)cyclopentadiene,
1,1-bis(α-methoxybenzyl)indene,
1,1-bis(phenoxymethyl)-3,6-dicyclohexylindene,
1,1-bis(methoxymethyl)benzonaphthene
7,7-bis(methoxymethyl)-2,5-norbornadiene; and the like.

Among them,
2,2-diisopropyl-1,3-dimethoxypropane,
2,2-diisobutyl-1,3-dimethoxypropane,
2-isobutyl-2-isopropyl-1,3-dimethoxypropane,
2-isopropyl-2-isopentyl-1,3-dimethoxypropane,
2,2-dicyclopentyl-1,3-dimethoxypropane,
9,9-bis(methoxymethyl)fluorene are particularly preferable.

These compounds having at least 2 ether bonds (A3b) may be used not only singly but also in combination of them. In addition, they may be the same as or different from a polyvalent ether compound as an optional component (A1d) in the solid component (A1).

(4) An Organoaluminum Compound (A4)

The solid catalyst component (A) in the present invention is prepared by contacting the solid component (A1), the vinylsilane compound (A2), and, (A3) the organosilicon compound having an alkoxy group, and/or, the compound having at least 2 ether bonds, however, other optional compounds may be contacted by an arbitrary method, within the range not to impair the effects of the present invention. As an example of such optional components, the organoaluminum compound (A4) may be included.

For the organoaluminum compound (A4) as an optional component in the preparation of the solid catalyst component (A) in the present invention, compounds and the like disclosed in JP-A-2004-124090 may be used. In general, it is desirable to use a compound represented by the following general formula (4):

(in the general formula (4), $R^9$ represents a hydrocarbon group;
X represents a halogen or hydrogen; $R^{10}$ represents a hydrocarbon group or a cross-linking group bridged by Al; provided that $c \geq 1$, $0 \leq d \leq 2$, $0 \leq e \leq 2$ and $c+d+e=3$).

In the general formula (4), $R^9$ is a hydrocarbon group, preferably, it is desirable to use one having carbon atoms in the range of 1 to 10, still more preferably in the range of 1 to 8, and particularly preferably in the range of 1 to 6. A specific example of $R^9$ includes a methyl group, an ethyl group, a propyl group, a butyl group, an isobutyl group, a hexyl group, an octyl group and the like. Among them, a methyl group, an ethyl group and an isobutyl group are most preferable.

In the general formula (4), X is a halogen or hydrogen. As the halogen that may be used as X, fluorine, chlorine, bromine, iodine or the like may be exemplified. Among them, chlorine is particularly preferable.

In the general formula (4), $R^{10}$ is a hydrocarbon group or a cross-linking group bridged by Al. When $R^{10}$ is the hydrocarbon group, $R^{10}$ may be selected from the same exemplification of the hydrocarbon group of $R^9$. In addition, as an organoaluminum compound (E'), it is possible to use alumoxane compounds represented by methylalumoxane, and in this case, $R^{10}$ represents a cross-linking group bridged by Al.

An example of a compound which may be used as the organoaluminum compound (A4) includes trimethylaluminum, triethylaluminum, triisobutylaluminum, trioctylaluminum, diethylaluminum chloride, ethylaluminum chloride, diethylaluminum ethoxide, methylalumoxane; among them, triethylaluminum and triisobutylaluminum are preferable.

The organoaluminum compound (A4) may be used not only singly but also in combination of them.

(5) A Halogen-containing Silicon Compound (A5)

As the other optional component of the solid catalyst component (A), the halogen-containing silicon compound may be included.

The halogen-containing silicon compound (A5) in the present invention can be represented by the following general formula (5):

(wherein $R^{11}$ is a hydrogen atom, a saturated aliphatic hydrocarbon group or an aromatic hydrocarbon group; X is a halogen atom; and "a" is an integer of 0, 1, 2 or 3.)

In the general formula (5), $R^{11}$ represents a hydrogen atom, a saturated aliphatic hydrocarbon group or an aromatic hydrocarbon group; preferably, a $C_1$ to $C_{10}$ hydrocarbon group, and may be chain-like or cyclic.

In the general formula (5), X is a halogen, and preferably includes chlorine, bromine, iodine or the like.

A specific example includes $SiCl_4$, $CH_3SiCl_3$, $HSiCl_3$, $(CH_3)_2SiCl_2$, $CH_3CHClSiCl_3$, $(C_2H_5)SiCl_3$, $HSi(CH_3)_2Cl$, $C_3H_7SiCl_3$, $CH_3(C_2H_5)SiCl_2$, $SiBr_4$, $(CH_3)_3SiCl$, $CH_3(CH_2)_3SiCl_3$, $(C_2H_6)_2SiCl_2$, $CH_3(CH_2)_4SiCl_3$, $CH_3(CH_2)_3(CH_3)SiCl_2$, $(C_6H_5)_3SiCl_3$, $(C_6H_5)HSiCl_2$, $(cyc-C_6H_{11})SiCl_3$, $CH_3(CH_2)_5SiCl_3$, $C_6H_5CH_2SiCl_3$, $(C_6H_5)(CH_3)SiCl_2$,

$CH_3(CH_2)_6SiCl_3$, $CH_3(CH_2)_6(CH_3)SiCl_2$, $(CH_3)(CH_2)_7SiCl_3$, $CH_3(CH_2)_6(CH_3)SiCl_2$, $(CH_3CH_2CH_2)_3SiCl$, $CH_3(CH_2)_9(CH_3)SiCl_2$, $(C_6H_5)_2SiCl_2$ and the like. Among them, as preferable ones, $SiCl_4$, $CH_3SiCl_3$, $(C_2H_5)SiCl_3$ and the like are included.

In addition, the halogen-containing silicon compound (A5) may be used not only singly but also in combination of a them.

If the halogen (A1c) used in the preparation of the solid catalyst (A1) is originated from a silicon halide compound, it is differentiated from the halogen-containing silicon compound (A5) shown here, as follows.

(i) If the silicon halide compound is contacted with the solid component which does not contain any compound selected from the carboxylic acid derivatives (A1d) or the compounds having at least two ether bonds (A1e), this silicon halide compound is defined as (A1c) instead of (A5).

(ii) If the electron donor (A1d) and the silicon halide compound are simultaneously contacted with the solid component which does not contain any compound selected from the carboxylic acid derivatives (A1d) or the compounds having at least two ether bonds (A1e), this silicon halide compound is defined as (A1c) instead of (A5).

(iii) If the silicon halide compound is contacted with the solid component (A1) containing at least one compound selected from the carboxylic acid derivatives (A1d) or the compounds having at least two ether bonds (A1e), this silicon halide compound is defined as (A5).

Furthermore, the halogen-containing silicon compound (A5) may be the same as or different from the silicon halide compounds as the halogen (A1c) that is an optional component in the solid component (A1).

When the silicon halide compound is used as the halogen (A1c) source of the solid catalyst (A1), the role of this silicon halide compound is to supply a halogen to the solid catalyst (A1) to form $MgCl_2$ as a catalyst support. On the other hand, the role of the halogen-containing silicon compound (A5) is to modify the surface of the solid catalyst (A1) prepared in advance for the enhanced interaction with the organoaluminum compound (A4), and also to remove unfavorable Ti species by extraction. Therefore, roles of both compounds are essentially different, and even if the same compound is used, the roles can be differentiated strictly. In addition, because the role of the carboxylic acid derivatives (A1d) and the compounds having at least two ether bonds (A1e) is to modify a crystal structure and an electron state of $MgCl_2$ for a solid catalyst support, they must be supported on the solid catalyst (A1) before the reaction with the halogen-containing silicon compound (A5).

Therefore, it is not defined as the silicon halide compound (A5), if it is used in the preparation of the solid catalyst (A1) before supporting at least one compound selected from the carboxylic acid derivatives (A1d) and the compounds having at least two ether bonds (A1e) on it, or simultaneously in the supporting processing.

2. A Preparation Method for the Solid Catalyst Component (A)

The solid catalyst component (A) in the present invention is prepared by contacting (A1) the solid component, (A2) the vinylsilane compound, and, (A3) the organosilicon compound having an alkoxy group, and/or, the compound having at least two ether bonds. In this case, other optional compounds such as (A4) the organoaluminum compound, (A5) the halogen-containing silicon compound and the like may be contacted by an arbitrary method, within the range not to impair the effects of the present invention. Contact conditions of each component of the solid catalyst component (A) may be arbitrary, within the range not to impair the effects of the present invention, although the absence of oxygen is necessary. In general, the following conditions are preferable.

Contact temperature is in the range of about $-50$ to $200°C.$, preferably in the range of $-10$ to $100°C.$, still more preferably in the range of $0$ to $70°C.$, and particularly preferably in the range of $10$ to $60°C.$ As a contact method, we can exemplify a mechanical method by a rotation ball mill or a vibration mill; a method for contacting by agitation in the presence of an inert diluent; or the like. Preferably, it is desirable to use a method for contacting by agitation in the presence of the inert diluents.

Ratio of the amounts of each components used, which composes the solid catalyst component (A) in the present invention, may be arbitrary within the range not to impair the effects of the present invention, however, in general, the following range is preferable.

It is desirable to use the vinylsilane compound (A2) preferably within the range of 0.001 to 1,000, and particularly preferably within the range of 0.01 to 100, in molar ratio (moles of the vinylsilane compound (A2)/moles of titanium atoms) with respect to a titanium component composing the solid component (A1).

When the organosilicon compound having an alkoxy group (A3a) is used, it is desirable to use it preferably within the range of 0.01 to 1,000, and particularly preferably within the range of 0.1 to 100, in molar ratio with respect to a titanium component composing the solid component (A1) (moles of the organosilicon compound having an alkoxy group (A3a)/moles of titanium atoms).

When the compound having at least two ether bonds (A3b) is used, it is desirable to use it preferably within the range of 0.01 to 1,000, and particularly preferably within the range of 0.1 to 100, in molar ratio with respect to a titanium component composing the solid component (A1) (moles of the compound having at least two ether bonds (A3b)/moles of titanium atoms).

When the organoaluminum compound (A4) is used as an optional component, it is desirable to use it preferably within the range of 0.1 to 100, and particularly preferably within the range of 1 to 50, in atomic ratio of aluminum with respect to a titanium component composing the solid component (A1) (moles of an aluminum atom/moles of titanium atoms).

When the halogen-containing silicon compound (A5) is used as an optional component, it is preferable to use it within the range of 0.1 to 10, and preferably within the range of 5.0 to 10, in molar ratio with respect to a titanium component composing the solid component (A1) (moles of the halogen-containing silicon compound (A5)/moles of titanium atoms).

If amount of the halogen-containing silicon compound (A5) used exceed 10 in molar ratio, particles are broken, and fines increase, by the halogen-containing silicon compound (A5), and still more significantly the activity decreases due to the excessive removal of Ti by extraction. On the other hand, if the amount is less than 1.0, the surface of the magnesium halide support can not be modified, and catalytic performance such as stereoregularity or comonomer incorporation is hardly improved sufficiently.

As a contacting procedure of (A1) the solid component, (A2) the vinylsilane compound, and (A3) the organosilicon compound having an alkoxy group (A3a), and/or, the compound having at least two ether bonds (A3b), an arbitrary procedure may be used. As a specific example, the following procedures (i) to (iii) are included.

Procedure (i): A method for contacting (A1) the solid component with (A2) the vinylsilane compound, and then contacting with (A3) the organosilicon compound having an alkoxy group (A3a) and/or the compound having at least two ether bonds (A3b);

Procedure (ii): A method for contacting (A1) the solid component with (A3) the organosilicon compound having an alkoxy group (A3a) and/or the compound having at least two ether bonds (A3b), and then contacting with (A2) the vinylsilane compound;

Procedure (iii): A method for contacting all of the compounds at the same time, and the like may be exemplified.

Among them, the procedure (ii) and the procedure (iii) are preferable.

In addition, (A1) the solid component may be contacted with any of (A2) the vinylsilane compound, and (A3) the organosilicon compound having an alkoxy group (A3a) and/or the compound having at least two ether bonds (A3b), in any arbitrary times. In this case, any of (A2) the vinylsilane compound, and (A3) the organosilicon compound having an alkoxy group (A3a) and/or the compound having at least two ether bonds (A3b) in each contact may be the same or different. Also when the organoaluminum compound (A4) is used as an optional component, it may be contacted in an arbitrary procedure as above. Among them, the following procedures (iv) to (vi) are included.

Procedure (iv): A method for contacting (A1) the solid component with (A2) the vinylsilane compound, then contacting with (A3) the organosilicon compound having an alkoxy group (A3a) and/or the compound having at least two ether bonds (A3b), and after that, contacting with (A4) the organoaluminum compound;

Procedure (v): A method for contacting (A1) the solid component with (A2) the vinylsilane compound, (A3) the organosilicon compound having an alkoxy group (A3a) and/or the compound having at least two ether bonds (A3b), and then contacting with (A4) the organoaluminum compound;

Procedure (vi): A method for contacting all of the compounds at the same time; and the like are preferable. Similarly, (A4) the organoaluminum compound may also be contacted some times in the same manner as above. In this case, (A4) the organoaluminum compounds in each use may be the same or different.

In addition, when (A5) the halogen-containing silicon compound is used as an optional component, preferably, (A1) the solid component and (A5) the halogen-containing silicon compound are contacted first, and then other components are contacted. Specifically, the following procedures (vii) and (viii) are included.

Procedure (vii): A method for contacting (A1) the solid component with (A5) the halogen-containing silicon compound, then contacting with (A2) the vinylsilane compound and (A3) the organosilicon compound having an alkoxy group (A3a) and/or the compound having at least two ether bonds (A3b), and after that, contacting with (A4) the organoaluminum compound.

Procedure (viii): A method for contacting (A1) the solid component with (A5) the halogen-containing silicon compound, (A2) the vinylsilane compound, and (A3) the organosilicon compound having an alkoxy group (A3a) and/or the compound having at least two ether bonds (A3b), and then contacting with (A4) the organoaluminum compound.

In the preparation of the solid catalyst component (A), washing with an inert solvent may be conducted in the middle and/or at the end. Preferable solvent species include aliphatic hydrocarbon compounds such as heptane; aromatic hydrocarbon compounds such as toluene; and halogen-containing hydrocarbon compounds such as 1,2-dichloroethylene or chlorobenzene; and the like.

3. Other Optional Components in the Catalyst

In the present invention, the use of the solid catalyst component (A) as a catalyst is an essential requirement, however, an optional component explained below, such as an organoaluminum compound (B), an organosilicon compound (C) as an external donor or a compound having at least two ether bonds (D) may be used, within the range not to impair the effects of the present invention.

(B) An Organoaluminum Compound

For the organoaluminum compound (B) as an optional component in the catalyst of the present invention, a compound or the like disclosed in JP-A-2004-124090 may be used. Preferably it may be selected from the same exemplification for the organoaluminum compound (A4), which is an optional component in the preparation of the solid catalyst component (A). In this case, the organoaluminum compound (B) and the organoaluminum compound (A4) may be the same or different.

The organoaluminum compound (B) may be used singly or in combination of some compounds.

(C) An Organosilicon Compound

For the organosilicon compound (C) as an optional component in the catalyst of the present invention, a compound or the like disclosed in JP-A-2004-124090 may be used. Preferably it may be selected from the same exemplification for the organosilicon compound having an alkoxy group (A3a) used in the solid catalyst component (A). In this case, the organosilicon compound having an alkoxy group (A3a) and the organosilicon compound (C) used as an optional component may be the same or different.

The organosilicon compound (C) may be used singly or in combination of some compounds.

(D) An Compound having at Least Two Ether Bonds

For the compound having at least two ether bonds (D) as an optional component in the catalyst of the present invention, compounds and the like disclosed in JP-A-3-294302 and JP-A-8-333413 may be used. Preferably it can be selected from the same exemplification for the compound having at least two ether bonds (A3b) used in the preparation of the solid catalyst component (A). In this case, the compound having at least two ether bonds (A3b) used in the preparation of the solid catalyst component (A) and the compound having at least two ether bonds (D) as an optional component of the catalyst, may be the same or different.

The compound having at least two ether bonds (D) may be used singly or in combination of some compounds.

(E) Other Compounds

Components other than the above organoaluminum compound (B), the organosilicon compound (C) and the compound having at least two ether bonds (D) may be used as optional components of the catalyst within the range not to impair the effects of the present invention. For example, by using a compound (E) having a C(=O)N bond in the molecule, as disclosed in JP-A-2004-124090, production of an amorphous component such as CXS (a cold xylene soluble component) can be suppressed. In this case, a preferable example includes tetramethylurea, 1,3-dimethyl-2-imidazolidinone, 1-ethyl-2-pyrrolidinone and the like. In addition, an organometal compound having a metal atom other than Al such as diethyl zinc may be also used.

4. The Amount of the Optional Components Used

The amount of the optional components used in the catalyst of the present invention may be arbitrary within the range not to impair the effects of the present invention. In general, the following range is preferable.

When the organoaluminum compound (B) is used, it is desirable to use it preferably within the range of 1 to 1,000, and particularly preferably within the range of 10 to 500, in molar ratio with respect to a titanium component composing the solid catalyst component (A) (moles of the organoaluminum compound (B)/moles of titanium atoms).

When the organosilicon compound (C) is used, it is desirable to use it preferably within the range of 0.01 to 10,000, and particularly preferably within the range of 0.5 to 500, in molar ratio with respect to a titanium component composing the solid catalyst component (A) (moles of the organosilicon compound (C)/moles of titanium atoms).

When the compound having at least two ether bonds (D) is used, it is desirable to use it preferably within the range of 0.01 to 10,000, and particularly preferably within the range of 0.5 to 500, in molar ratio with to a titanium component composing the solid catalyst component (A) (moles of the two ether bonds-containing compound (D)/moles of titanium atoms).

When the compound (E) having a C(=O)N bond in a molecule is used, it is desirable to use it preferably within the range of 0.001 to 1,000, and particularly preferably within the range of 0.05 to 500, in molar ratio with to a titanium component composing the solid catalyst component (A) (moles of the compound (E) having a C(=O)N bond in a molecule/moles of titanium atoms).

5. Pre-polymerization

The solid catalyst component (A) in the present invention may be pre-polymerized before polymerization. By producing a small amount of polymer around the catalyst before polymerization, the catalyst becomes more uniform, and the amount of fines produced can be suppressed.

As a monomer in the pre-polymerization, a compound or the like disclosed in JP-A-2004-124090 may be used. A specific example of the compound includes olefins as represented by ethylene, propylene, 1-butene, 3-methylbutene-1, 4-methylpentene-1 or the like; styrene analogues as represented by styrene, α-methylstyrene, allylbenzene, chlorostyrene or the like; diene compounds as represented by 1,3-butadiene, isoprene, 1,3-pentadiene, 1,5-hexadiene, 2,6-octadiene, dicyclopentadiene, 1,3-cyclohexadiene, 1,9-decadiene, divinylbenzenes or the like; and the like. Among them, ethylene, propylene, 3-methylbutene-1,4-methylpentene-1, styrene, divinylbenzenes, and the like are particularly preferable.

When pre-polymerized one is used as the solid catalyst component (A), pre-polymerization may be conducted in an arbitrary procedure in the preparation procedure of the solid catalyst component (A). For example, after pre-polymerization of (A1) the solid component, (A2) the vinylsilane compound together with (A3) the organosilicon compound having an alkoxy group and/or the compound having at least two ether bonds may be contacted. In addition, after contacting (A1) the solid component, the vinylsilane compound together with (A3) the organosilicon compound having an alkoxy group and/or the compound having at least two ether bonds, pre-polymerization may be conducted. Furthermore, when (A1) the solid component is contacted with (A2) the vinylsilane compound together with (A3) the organosilicon compound having an alkoxy group and/or the compound having at least two ether bonds, pre-polymerization may be conducted simultaneously.

Reaction conditions between the solid catalyst component (A) or the solid component (A1) and the above monomers may be selected arbitrarily in the range not to impair the effects of the present invention. In general, the following range is preferable.

The amount of pre-polymer is desirably within the range of 0.001 to 100 g, preferably within the range of 0.1 to 50 g, still more preferably within the range of 0.5 to 10 g, based on 1 g of the solid catalyst component (A) or the solid component (A1). Reaction temperature of pre-polymerization is within the range of −150 to 150° C., and preferably within the range of 0 to 100° C. And, it is desirable to conduct pre-polymerization at lower temperature than polymerization temperature. In general, the reaction is preferably conducted under agitation, and in this case an inert solvent such as hexane, heptane may be present.

Pre-polymerization may be conducted some times, and in this case, monomers in each use may be the same or different. In addition, after pre-polymerization, the catalyst may be washed with an inert solvent such as hexane, heptane or the like. After pre-polymerization, the catalyst may be used without further treatment corresponding to the style how to use the catalyst, however, it may be dried, if necessary.

Furthermore, during contacting or after contacting of each of the above components, a polymer such as polyethylene, polypropylene, polystyrene, or a solid of inorganic oxide such as silica, titania may be present together.

The catalyst (A) after pre-polymerization is covered with a polymer shell, however, the average particle diameter (the size including the polymer shell) of the catalyst used in the following polymerization is preferably no less than 30 μm, still more preferably no less 40 μm, in addition, it is preferably no more than 250 μm, and still more preferably no more than 200 μm.

[II] Production Process and Polymerization Conditions

As a production process of polypropylene, an arbitrary process may be used as long as it is a gas-phase process which mainly utilizes the heat of vaporization of liquefied propylene for the heat removal.

In the present invention, a gas-phase process does not mean complete absence of liquid. It is sufficient to use a substantially gas phase for polymerization, and liquid may be present within the range not to impair the effects of the present invention. As this liquid, not only liquefied propylene for the heat removal but also an inert hydrocarbon component such as hexane may be exemplified.

As a mixing type, both of a method using a fluidized bed and a method using an agitator may be used. When an agitator is used, a fluid bed equipped with an agitator may be also used. An agitating shaft of the agitator may be in the vertical direction or in the horizontal direction. As the shape of an agitating wing, an arbitrary one such as a paddle, a helical-type may be used. Among them, a method using the agitating shaft in the horizontal direction with paddles is most preferable.

A reactor is not limited in the shape, size, material or the like, as long as it is suitable for the reaction, depending on the raw materials used, reaction conditions, reaction types, products and the like, and may be used by selecting arbitrarily from conventional ones. A preferable shape is a horizontal reactor having a cylindrical part. Any size can be used depending on the reaction type, however, it is preferable to be equal to or larger than 20 $m^3$ in view of productivity and economical efficiency.

In general, in the case of carrying out polymerization of propylene in a gas-phase process using a horizontal reactor having an agitator inside, which rotates around a horizontal axis thereof, the amount of fines generally increases by physical contact of polymer particles with the agitator, however, the method for producing polypropylene of the present invention is characterized by the suppressed amount of fines which can be achieved by the above-described catalyst prepared by the preceding contact with the specific component.

As an alignment of polymerization reactors, an arbitrary method may be used as long as it does not impair the effects of the present invention. The polymerization reactor alignment may be single or multiple. As a method for further narrowing the residence time distribution without increasing the number of reactors, baffles for restricting powder flow may be installed in the polymerization reactors. As the type of the baffles, fixed baffles, which are fixed onto the polymerization reactors, may be used, or rotating baffles, which are fixed on the rotating shaft, may be used. When there are some polymerization reactors, they may be connected in series or in parallel. In particular, in the case of producing a block copolymer of propylene and other monomers, it is desirable to adopt an alignment containing at least two polymerization reactors in series.

As a polymerization method, both of a batch method and a continuous method may be used, however, it is desirable to use the continuous method in view of productivity. As a particularly preferable example, a continuous polymerization method, where 2 to 4 polymerization reactors are connected in series, may be exemplified.

In the present invention, in a continuous polymerization, it is preferable to achieve complete plug flow in the reactors, however, while the raw materials are fed into the reactors, reacted during the residence time, and discharged as the reaction product from the reactor, local back-mixing may be achieved to enhance the tank number effect by installing baffles and the like inside the reactor, and in the present invention, these modifications are also included in the expression of the plug flow.

Therefore, in the present invention, it is preferable to conduct a continuous polymerization by a gas-phase process utilizing the heat of vaporization of liquefied propylene having a horizontal reactor equipped with an agitator inside, which rotates around a horizontal axis thereof, in the manner of plug flow or the like, and by the combination of such a method and a catalyst of the present invention, a propylene-based polymer having uniform and almost spherical shape, being hardly broken down, having less fines and also high MFR value, can be produced in high productivity.

As a method of the heat removal by utilizing the heat of vaporization of liquefied propylene, an arbitrary method may be used. In order to remove the heat by utilizing the heat of vaporization of liquefied propylene, propylene substantially in the liquid state should be supplied into the polymerization reactors. Fresh liquefied propylene may be supplied into the polymerization reactors, however, it is generally desirable to use recycled propylene. A general procedure to use recycled propylene will be exemplified below. Propylene-containing gas is discharged from a polymerization reactor, and cooled until at least partly condensed, and at least a part of the liquefied component is supplied into the polymerization reactor. In this case, the liquefied component needs to contain propylene, however, a comonomer component represented by butene or an inert hydrocarbon component represented by isobutane may be included.

As a method for supplying liquefied propylene, an arbitrary method may be uses as long as supplying propylene substantially in the liquid state to the polymerization reactors. It may be supplied to a bed of polypropylene particles, or it may be supplied to a gas-phase. In the case of supplying to the gas-phase, it may be supplied to the gas-phase inside the polymerization reactors, or it may be supplied to a recycled gas line. In particular, in the case of a stirred tank reactor having the agitating shaft in the horizontal direction, it is desirable to supply the liquefied propylene to the gas-phase inside the polymerization reactors.

In the present invention, "to remove the heat by using mainly the heat of vaporization of liquefied propylene" does not mean "to remove the heat by using only the heat of vaporization of liquefied propylene". Other heat removal methods may be used together as long as it does not impair the effects of the present invention. Specifically, we can exemplify a method for the heat removal by using a jacket installed at the polymerization reactor; a method for discharging a part of the gas from the polymerization reactor which is cooled in a heat exchanger and returned to the polymerization reactor; or the like. However, in the present invention, it is necessary that the heat removal by using the heat of vaporization of liquefied propylene should be major. Specifically, at least half of the heat should be removed by using the heat of vaporization of liquefied propylene in at least one polymerization reactor.

Polymerization conditions such as temperature or pressure may be set arbitrarily as long as it does not impair the effects of the present invention. Specifically, polymerization temperature is preferably equal to or higher than 0° C., still more preferably equal to or higher than 30° C., and particularly preferably equal to or higher than 40° C.; preferably equal to or lower than 100° C., still more preferably equal to or lower than 90° C., and particularly preferably equal to or lower than 80° C. Polymerization pressure is preferably equal to or higher than 1200 kPa, still more preferably equal to or higher than 1400 kPa, and particularly preferably equal to or higher than 1600 kPa; preferably equal to or lower than 4200 kPa, still more preferably equal to or lower than 3500 kPa, and particularly preferably equal to or lower than 3000 kPa. However, polymerization pressure should not be set lower than the vapor pressure of propylene at the polymerization temperature.

Residence time may be adjusted arbitrarily depending on the constitution of the polymerization reactors or the product indices. In general, it is set within the range of 30 minutes to 5 hours.

The polymerization catalyst or other optional components of the present invention may be supplied into the polymerization reactor by any known method. The polymerization catalyst may be supplied into the polymerization reactor as a powder without further modification, however, it may be supplied in the diluted form with an inert solvent such as hexane or mineral oil.

Because the catalyst of the present invention has very high activity, it is preferable to be supplied into the polymerization reactor in the diluted form. In particular, when an ethylene-propylene random copolymer or the like is produced, the activity becomes extremely high, and therefore insufficient dilution could cause a trouble of fouling or the like. In such a case, it is effective to use at least one compound selected from the group of the optional components consisting of the organosilicon compound (C), the compound having at least two ether bonds (D) and the compound (E) having a C($=$O)N bond in the molecule. It is preferable that the solid catalyst component is contacted with these optional components before supplied into the polymerization reactor, because of the further higher effect of fouling prevention. In this case, a contact method of both components is arbitrary, however, it is preferable that the optional components are supplied into the supply line of the solid catalyst component into the polymerization reactor, or the optional components are added to the solid catalyst in the tank after diluted with the inert solvent.

In a gas-phase process with the heat removal system by utilizing the heat of vaporization, fluidization by gas happens in any of the process. Vaporized gas is recovered, and passes through a gas exhaust line located at the upper part tank wall of the reactor, then condensed by a condenser and used again as a liquid coolant for heat removal. Because around a catalyst feed point in the reactor in continuous polymerization, there are polymer particles in the early stage of their growth, whose diameter is equal to or smaller than 50 μm, and because a large quantity of vaporized gas generate, fines such as polymer particles and catalyst particles tend to be accompanied with the vaporized gas. Therefore, it is necessary to select a catalyst having high activity and less fines.

In addition, deterioration of the powder morphology tends to accelerate powder breaking, which is caused by agitation and fluidization by gas, and in particular, increase of fines originated from powder breaking by the agitation increases the entrainment amount. In addition, also in a transfer system, fines are increased by fracture caused by contacting, resulting in the worse productivity in the finishing system.

"The entrainment amount" in the present invention means the amount of particles passing through a gas exhaust line located at the upper part tank wall or the like (or at the side part or the bottom part) of a reactor and discharged from the reactor accompanied with gas. As a method for specifically measuring the entrainment amount, an example includes a method for installing an apparatus for fine removal, such as a cyclone or a bag filter, before the condenser, and weighing the amount of fines [g/kg] (<100 μm) removed by the apparatus.

By the catalyst of the present invention, because of its large average particle size, polypropylene having a large average particle size is produced. Therefore, polymer particles corresponding to the particle size distribution of the solid catalyst component are formed, and less fines of a polymer is produced, and also fracture caused by the agitation or the gas flow is reduced.

In this way, the catalyst of the present invention is useful from the viewpoint of the specific capability of producing polypropylene with the reduced amount of fines produced by fracture caused by the agitation and the gas flow, and from the viewpoint of less fines produced and less particles accompanied with the vaporized gas into an off-gas line.

In addition, when a homopolymer and a copolymer of polypropylene is produced, it is preferable that the amount of fines produced, with a particle size equal to or smaller than 100 μm, is equal to or less than 0.10 g/kg respect to the unit production amount.

The higher this value is, because of the increased entrainment amount, the higher the load to the gas exhaust line system is, and the more the adhesion onto it or the like is, and the lower gas condensation capability is, because more fines are blown into the condenser. In addition, frequent occurrence of fines extremely increases sticking onto the polymerization reactor in the downstream system, and makes the operation unstable.

In the present invention, in particular for the production of a block copolymer, (F) the electron donating compound may be added as a killing agent in the polymerization reaction.

When a gas-phase polymerization process has two stages of polymerization composed of the first stage where propylene is homo-polymerization or co-polymerized with one or more kinds of comonomers selected from the group consisting of ethylene and $C_4$ to $C_8$ α-olefins; and the second stage where propylene is co-polymerized with one or more kinds of comonomers selected from the group consisting of ethylene and $C_4$ to $C_8$ α-olefins in the higher ratio of the said comonomer than that at the first stage, it is preferable that the electron donating compound (F) is added at the first stage and/or the second stage.

The purpose of the electron donating compound added in the polymerization reaction is to deactivate the short-passed particles, different from that of the electron donating compound (an internal donor or an external donor) used in the catalyst component. Deactivation of the particles passing through the first stage shortly can reduce the particles excessively active for the copolymerization at the second stage, resulting in suppressing gels or fish-eyes.

In view of effective deactivation of the short-passed particles, as the addition timing of the component (F), it is preferable to add it between the position of ⅓ length upstream from the downstream end of the reactor for the first stage and the position of ⅓ length downstream from the upstream end of the reactor for the second stage.

The component (F), which is the electron donating compound, is usually an organic compound containing oxygen, nitrogen, phosphorous or sulfur, and is capable of donating an electron.

A specific example includes alcohols, phenols, ketones, aldehydes, acetals, organic acids, acid anhydrides, acid halides, esters, ethers, amines, amides, nitriles, phosphines, phosphylamides, thioethers, thioesters, the organosilicon compounds having Si—O—C bond and the like.

More specifically, the following substances may be included.

(1) Alcohols: $C_1$ to $C_{20}$ alcohols such as methanol, ethanol, n-propyl alcohol, isopropyl alcohol, n-butyl alcohol, sec-butyl alcohol, isobutyl alcohol, t-butyl alcohol, pentyl alcohol, hexyl alcohol, cyclohexyl alcohol, octyl alcohol, 2-ethylhexyl alcohol, dodecanol, octadecyl alcohol, benzyl alcohol, phenylethyl alcohol, cumyl alcohol, isopropylbenzylalcohol, ethylene glycol, diethylene glycol, 2,2-dimethyl-1,3-propanediol, 2,2-diisopropyl-1,3-propanediol, 2,2-diisobutyl-1,3-propanediol, 2-isopropyl-2-isobutyl-1,3-propanediol, 2-isopropyl-2-s-butyl-1,3-propanediol, 2-t-butyl-2-methyl-1,3-propanediol, 2-t-butyl-2-isopropyl-1,3-propanediol, 2,2-dicyclopentyl-1,3-propanediol, 2,2-dicyclohexyl-1,3-propanediol, 2,2-diphenyl-1,3-propanediol, 2,2-dimethyl-1,3-propanediol, 2,2-diisopropyl-1,3-propanediol.

(2) Phenols: a $C_6$ to $C_{25}$ phenol, which may have an alkyl group, such as phenol, cresol, xylenol, ethylphenol, propylphenol, cumylphenol, nonylphenol, naphthol.
(3) Ketones: a $C_1$ to $C_{20}$ ketone such as acetone, methyl ethyl ketone, methyl isobutyl ketone, acetophenone, benzophenone, benzoquinone.
(4) Aldehydes: a $C_2$ to $C_{15}$ aldehyde such as acetaldehyde, propionaldehyde, octylaldehyde, benzaldehyde, tolualdehyde, naphthoaldehyde.
(5) Acetals: a $C_3$ to $C_{24}$ acetal such as dimethyldimethoxymethane, 1,1-dimethoxycyclopentane, 1,1-dimethoxycyclohexane.
(6) Organic acids: a $C_1$ to $C_{20}$ carboxylic acid, which may have two carboxyl groups or more, such as formic acid, acetic acid, propionic acid, valeric acid, caprylic acid, pivalic acid, acrylic acid, methacrylic acid, monochloroacetic acid, benzoic acid, maleic acid, phthalic acid.
(7) Acid anhydrides: acid anhydrides derived from the above organic acids including intramolecular condensates, condensates between different molecules.
(8) Acid halides: acid halides derived from the above organic acids by substituting a hydroxyl group with a chlorine atom, a bromine atom, or an iodine atom.
(9) Esters: esters derived from the above alcohols and acids, such as methyl formate, ethyl formate, methyl acetate, ethyl acetate, vinyl acetate, propyl acetate, octyl acetate, cyclohexyl acetate, ethyl propionate, methyl butyrate, ethyl butyrate, ethyl valerate, methyl chloroacetate, methyl methacrylate, dimethyl maleate, methyl benzoate, dimethyl phthalate, diethyl phthalate, dipropyl phthalate, dibutyl phthalate, diisobutyl phthalate, dihexyl phthalate, dioctyl phthalate, methyl carbonate, ethyl carbonate.
(10) Ethers: ethers derived from the above alcohols or phenols, such as dimethyl ether, diethyl ether, dipropyl ether, dibutyl ether, methyl t-butyl ether, anisol, vinyl methyl ether, vinyl ethyl ether, vinyl n-butyl ether, 1,1-dimethoxyethane, o-dimethoxybenzene, 2,2-dimethyl-1,3-dimethoxypropane, 2,2-diisopropyl-1,3-dimethoxypropane, 2,2-diisobutyl-1,3-dimethoxypropane, 2-isopropyl-2-isobutyl-1,3-dimethoxypropane, 2-isopropyl-2-s-butyl-1,3-dimethoxypropane, 2-t-butyl-2-methyl-1,3-dimethoxypropane, 2-t-butyl-2-isopropyl-1,3-dimethoxypropane, 2,2-dicyclopentyl-1,3-dimethoxypropane, 2,2-dicyclohexyl-1,3-dimethoxypropane, 2,2-diphenyl-1,3-dimethoxypropane, 2,2-dimethyl-1,3-diethoxypropane, 2,2-diisopropyl-1,3-diethoxypropane.
(11) Amines: $C_1$ to $C_{21}$ amines such as methylamine, dimethylamine, trimethylamine, ethylamine, diethylamine, triethylamine, tributylamine, piperidine, tribenzylamine, aniline, pyridine, picoline, tetramethyl ethylenediamine.
(12) Amides: amides derived from the above organic acids and the above amines, such as acetamide, benzamide, tolylamide.
(13) Nitriles: $C_2$ to $C_{10}$ nitriles such as acetonitrile, benzonitrile, tolunitrilee.
(14) Phosphines: phosphines such as trimethylphosphine, triethylphosphine, triphenylphosphine.
(15) Phosphilamides: phosphylamides such as hexamethylphosphyltriamide.
(16) Thioethers: thioether derived from the above ethers by substituting an oxygen atom with a sulfur atom.
(17) Thioesters: thioesters derived from the above esters by substituting an oxygen atom with a sulfur atom.
(18) The organosilicon compounds having a Si—C bond: organosilicon compounds such as tetramethoxysilane, tetraethoxysilane, tetrabutoxysilane, methyltrimethoxysilane, dimethyldimethoxysilane, trimethylmethoxysilane, trimethylethoxysilane, dimethyldiethoxysilane, diphenyldimethoxysilane, phenylmethyldimethoxysilane, diphenyldiethoxysilane, phenyltrimethoxysilane, γ-chloropropyltrimethoxysilane, methyltriethoxysilane, ethyltriethoxysilane, vinyltriethoxysilane, propyltriethoxysilane, butyltriethoxysilane, phenyltriethoxysilane, γ-aminopropyltriethoxysilane, chlorotriethoxysilane, ethyltriisopropoxysilane, vinyltributoxysilane, trimethylphenoxysilane, methyltriallyloxysilane, vinyltris(β-methoxyethoxy)silane, vinyltriacetoxysilane, dimethyltetraethoxydisiloxane.

Among them, preferable one is alcohols, ketones, or esters, particularly preferable one is methanol, ethanol, isopropyl alcohol, acetone or methyl acetate.

These electron donating compounds may be used in combination of two or more kinds, if necessary. In addition, different compounds may be added at two addition positions. They may be used in combination with an oxygen or the like.

The component (F) in the present invention is preferably a compound that is liquid in the standard state and has a molecular weight of 30 to 80. If the molecular weight is over 80, the amount of the component (F) used increases, and furthermore, it becomes difficult to remove the said compound after producing a polymer due to the higher boiling point of the compound. It is still more preferable that the component (F) is one selected from methanol, ethanol, isopropyl alcohol, acetone or methyl acetate, because of easy availability and economical efficiency.

When a specific catalyst component described in the present application is used, catalyst activity is high, and a propylene-base block copolymer can be produced in high productivity, however, catalyst activity at the second stage is also high, which increases the frequency of gel or fish-eye troubles to happen. Therefore, by the addition of a killing agent, good appearance of a molded body can be achieved without impairing high catalytic activity, which is one of the characteristics of the present invention.

Here, an explanation will be given in detail on a process using a horizontal reactor as a preferable embodiment of the gas-phase processes where the reaction heat is removed mainly by the heat of vaporization of liquefied propylene used in the present invention, with reference to FIG. 1.

A horizontal reactor 10 is slender, having the upstream end 12 and the downstream end 14, which is installed generally at a horizontal position, as shown in FIG. 1. A reaction in the reactor is conducted almost in the plug flow. A shaft 19 extends into the downstream end 14 of the reactor 10, and wings for the agitation are fixed onto it inside the reactor 10. The agitating wings mixes polymer particles, inside the reactor 10, and other substances introduced therein. The catalyst components introduced from the pipelines 1 and 2 in the upstream area of the reactor 10, initiate polymerization while mixed with the polymer particles by the agitating wings. In polymerization, the heat of polymerization generated is removed by the heat of vaporization of liquefied propylene as the raw material supplied from the top part pipeline 17. Unreacted propylene gas is discharged from the reaction system by a pipeline 13, and a part thereof is condensed by a condenser 15, and separated into a liquid part and a gas part in a vapor-liquid separation tank 11. The liquid part is introduced into the pipeline 17 for removing the heat of polymerization, and the gas part is mixed with hydrogen or the like for controlling the molecular weight, and supplied via a pipeline 18 installed at the bottom part of the reactor 10.

Figure 2:
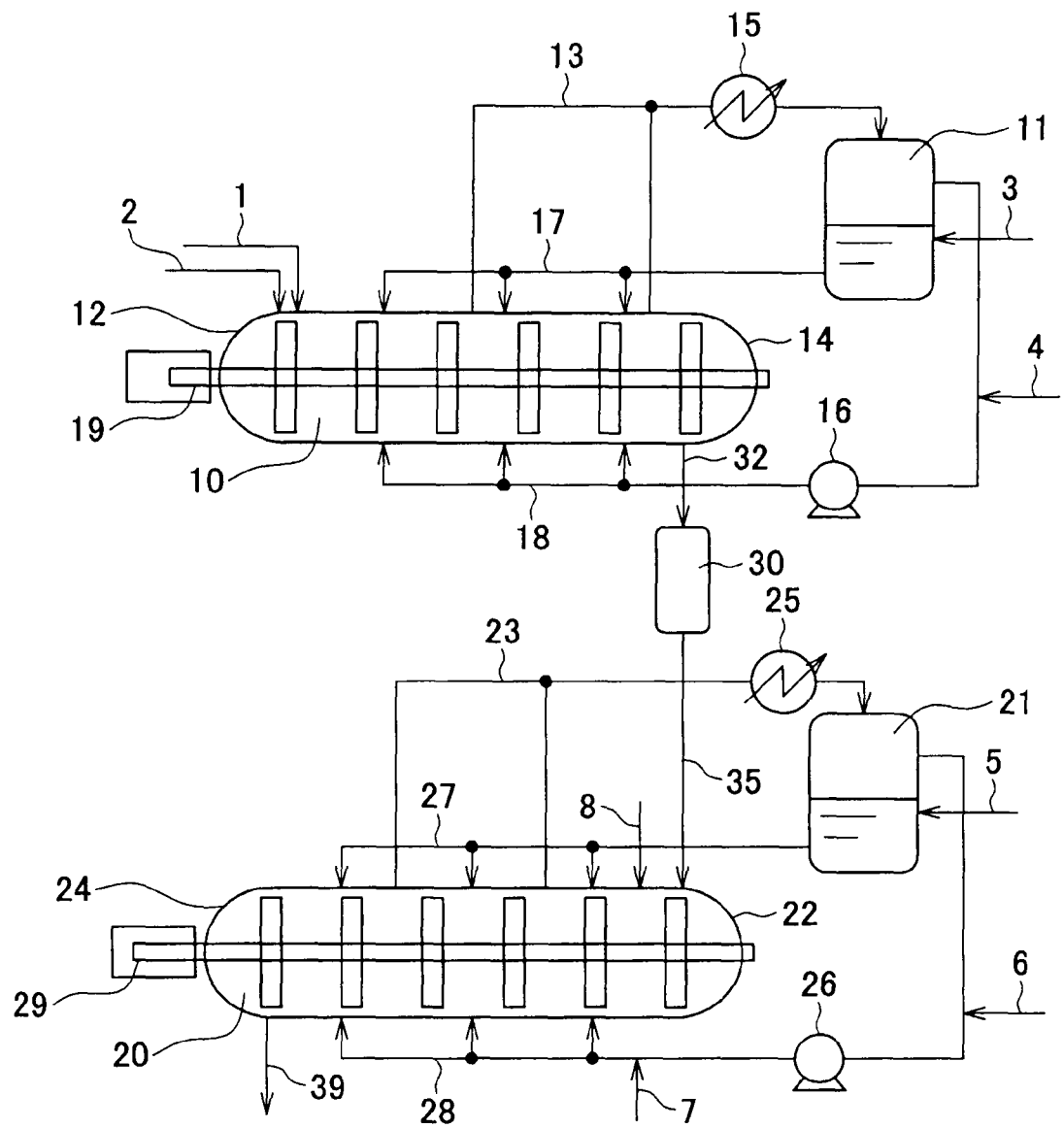
FIG. 2 is a schematic drawing of a process using a horizontal reactor, as another preferable embodiment of a gas-phase process of the present invention.

FIG. 2 is the other preferable embodiment used in the present invention, and a schematic drawing of a process with two horizontal reactors used in a gas-phase process for two stages of polymerization composed of the first stage where propylene is homo-polymerization or co-polymerized with one or more kinds of comonomers selected from the group consisting of ethylene and $C_4$ to $C_8$ α-olefins to copolymerization; and the second stage where propylene and one or more kinds of comonomers selected from the group consisting of ethylene and $C_4$ to $C_8$ α-olefins in the higher ratio of the said comonomer than that at the first stage.

Figure 3:
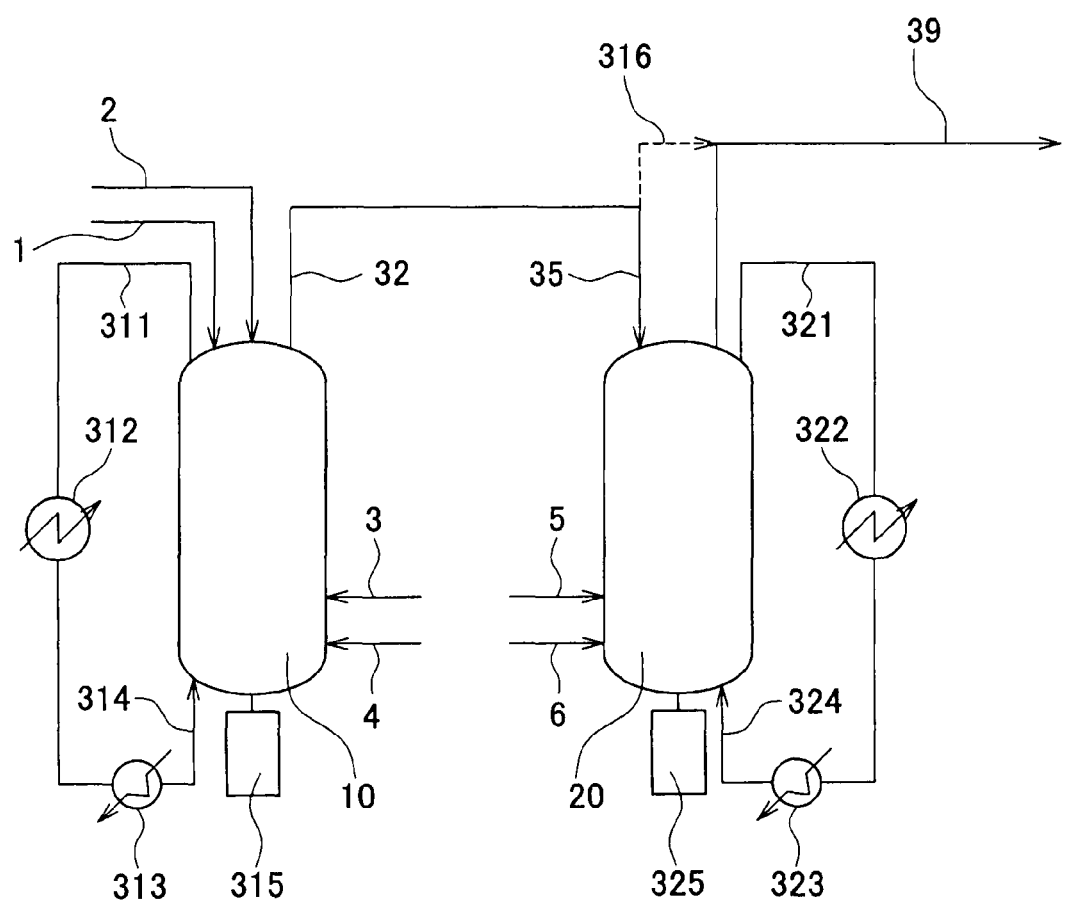
FIG. 3 is a schematic drawing of a process using a vertical reactor used in the process for two stages of polymerization, as another preferable embodiment of a gas-phase process of the present invention.

FIG. 3 is the other preferable embodiment used in the present invention, and a schematic drawing of a process with vertical reactors used in a gas-phase process for two stages of polymerization. In addition, in the case of using in a gas-phase process for single stage, it is possible to operate a variable-type pipeline 316.

As shown in FIG. 3, in general, each of the reactors is installed at a horizontal position. Shafts 315 and 325 extend to an upper part of each of the reactors 10 and 20, and a wing for the agitation is attached each inside the reactors 10 and 20. The agitating wings mixes, inside the reactors 10 and 20, the polymer particles with other substances introduced thereto. In the vertical reactor similarly, the heat of polymerization generated in polymerization is removed by the heat of liquefied propylene as the raw material supplied from bottom part pipelines 314 and 324. Unreacted propylene gas is discharged into the circulation system by pipelines 311 and 321, condensed by condensers 312 and 322, and then cooled by compressors 313 and 323 to be supplied as raw material of liquefied propylene. Hydrogen for controlling the molecular weight, and one or more kinds of comonomers selected from the group consisting of ethylene and $C_4$ to $C_8$ α-olefins are supplied via pipelines 4 and 6.

[III] Polypropylene (a Propylene-based Polymer)

Polypropylene obtained by using the present invention is one produced in the low production cost and is excellent in processability and quality. In particular, a production method for polypropylene having high MFR value, in high quality and in the low cost, is disclosed in the present invention.

In addition, because polypropylene obtained by using the present invention contains less of an amorphous component, which is represented by an index such as cold-xylene soluble (CXS), it has characteristics of less frequency of molding troubles to happen such as smoking, gum, mold contamination, resin burning. It also has high crystallinity and excellent rigidity of a molded product due to the low content of the amorphous component. Furthermore, it also shows high melting point and excellent heat resistance.

Furthermore, polypropylene obtained by using the present invention is a propylene homopolymer (i) and a copolymer of propylene and other comonomers. The copolymer may be a random copolymer (ii) or a block copolymer (iii). Explanation will be given in detail on each polymer.

(i) A Propylene Homopolymer

When polypropylene in the present invention is a propylene homopolymer, a MFR value thereof is preferably equal to or higher than 50 g/10 minutes, more preferably within the range of 50 g/10 minutes to 1,000 g/10 minutes, still more preferably within the range of 60 g/10 minutes to 800 g/10 minutes, and most preferably within the range of 100 g/10 minutes to 500 g/10 minutes. A CXS value is preferably equal to or lower than 3% by weight, more preferably within the range of 0.1% by weight to 2% by weight, and still more preferably within the range of 0.2% by weight to 1.5% by weight.

Here, a CXS value is defined as a value measured by the following method.

A sample (about 5 g) is once dissolved completely in p-xylene (300 ml) at 140° C. Then, the solution is cooled to 23° C. to precipitate a polymer at 23° C. for 12 hours. The precipitated polymer is filtrated and then p-Xylene is evaporated from the filtrate. The residual polymer after evaporation of p-xylene was dried under the reduced pressure at 100° C. for 2 hours. The polymer after drying is weighed to obtain the value of CXS as % by weight with respect to the sample.

In order to adjust a MFR value, concentration of hydrogen, which is a chain transfer agent, in the polymerization reactor may be adjusted. At the higher hydrogen concentration, the higher MFR value of a polypropylene homopolymer is achieved, and vice versa. If the catalyst of the present invention is employed, the higher MFR value can be achieved at the relatively low concentration of hydrogen, and furthermore, polypropylene having high stereoregularity and the low CXS value can be produced, even at the high MFR value. In order to reduce CXS further within the range designated in the present invention, it is effective to use at least one group consisting of compounds selected from the organosilicon compound (C), the compound having at least two ether bonds (D), and the compound (E) having a C(=O)N bond in the molecule, as the optional components. The higher amount of these optional components is used, the lower CXS value of a polypropylene homopolymer can be achieved.

(ii) A Random Copolymer

When polypropylene in the present invention is a random copolymer of propylene and other monomers, it is desirable that the other monomers are ethylene and/or a $C_4$ to $C_{10}$ α-olefin; more preferably ethylene and/or 1-butene, and most preferably ethylene. It is desirable that a content of a monomer unit other than propylene in the random copolymer is equal to or lower than 10% by weight; more preferably within the range of 0.01% by weight to 8% by weight, still more preferably within the range of 0.05% by weight to 6% by weight, and particularly preferably within the range of 0.1% by weight to 5% by weight.

Here, the content of these other monomers can be determined by an arbitrary analysis method. As a specific example, infrared spectrophotometry (IR), nuclear magnetic resonance spectrometry (NMR) or the like may be included.

Here, as the monomer other than propylene, which is used in the random copolymer of the present invention, it is not especially limited, however, a $C_2$ to $C_{12}$ olefin, in particular, a $C_2$ to $C_{12}$ α-olefin is preferably used. Specifically, ethylene, 1-butene, 1-pentene, 1-hexene, 1-octene, 1-decene, 4-methyl-1-pentene, 3-methyl-1-pentene and the like is included: among them, it is more preferable to use ethylene, 1-butene, 4-methyl-1-pentene, and these olefins may be used not only as singly but also in combination of them.

In order to adjust MFR, in the same manner as in the case of the polypropylene homopolymer, concentration of hydrogen, which is a chain transfer agent, in the polymerization reactor may be adjusted. If the catalyst of the present invention is is employed, the higher MFR value can be achieved at the relatively low concentration of hydrogen, and furthermore, polypropylene having less of sticky components can be produced even at a high MFR value and high comonomer contents. In addition, by using a similar method to those for reducing the CXS value of the polypropylene homopolymer, the amount of the sticky components can be reduced further.

In order to adjust a comonomer content, a concentration of the comonomer in the polymerization reactor may be adjusted.

(iii) A Block Copolymer

When polypropylene in the present invention is a block copolymer of propylene and other monomers, it is desirable that other monomers is ethylene and/or a $C_4$ to $C_{10}$ α-olefin, more preferably ethylene and/or 1-butene, and most preferably ethylene.

Here, the block copolymer means a blend of a polymer component mainly composed of propylene, and a random copolymer component composed of propylene and other monomers, and in general, it is produced by the sequential polymerization under the conditions corresponding to each of the components to blend them in a reactor. The polymer component mainly composed of propylene may be the propylene homopolymer or the random copolymer of propylene and other monomers. When the polymer component mainly composed of propylene is the random copolymer of propylene and other monomers, it is desirable that a content of a monomer unit other than propylene in the random copolymer is equal to or lower than 10% by weight. Still more preferably, it is desirable that the content of the monomer unit other than propylene is equal to or lower than 5% by weight, and particularly preferably equal to or lower than 3% by weight. Most preferably, it is desirable that the polymer component mainly composed of propylene is the propylene homopolymer.

It is desirable that a content of a propylene unit in the random copolymer is within the range of 10% by weight to 90% by weight, in the random copolymer component of propylene and other monomers. More preferably, it is desirable that the content of the propylene unit is within the range of 15% by weight to 85% by weight, and particularly preferably within the range of 20% by weight to 80% by weight. Most preferably, the content of the propylene unit is within the range of 30% by weight to 70% by weight.

For the weight ratio of the polymer component mainly composed of propylene to the random copolymer component of propylene and other monomers in the block copolymer, an arbitrary value is applicable. Preferably, it is desirable that a content of the random copolymer component of propylene and other monomers in the block copolymer is within the range of 2% by weight to 95% by weight. More preferably, it is desirable that the content of the random copolymer component of propylene and other monomers in the block copolymer is within the range of 2% by weight to 85% by weight, and particularly preferably, within the range of 5% by weight to 75% by weight. Most preferably, it is desirable that the content of the random copolymer component of propylene and other monomers in the block copolymer is within the range of 10% by weight to 65% by weight.

It is desirable that an MFR value of the block copolymer of propylene and other monomers is equal to or higher than 30 g/10 minutes. More preferably, it is desirable that the MFR is within the range of 40 g/10 minutes to 1,000 g/10 minutes, and still more preferably, within the range of 50 g/10 minutes to 500 g/10 minutes. Too much low MFR values impair the processability of injection molding or the like, while too much high MFR values impair the properties such as impact resistance or the like. It is desirable that the MFR value of the polymer component mainly composed of propylene is equal to or higher than 50 g/10 minutes. More preferably, it is desirable that the MFR value is within the range of 50 g/10 minutes to 1,000 g/10 minutes, still more preferably, within the range of 60 g/10 minutes to 800 g/10 minutes, and most preferably within the range of 100 g/10 minutes to 500 g/10 minutes. The CSX value is equal to or lower than 3% by weight, preferably within the range of 0.1% by weight to 2% by weight, and still more preferably within the range of 0.2% by weight to 1.5% by weight.

The random copolymer component of propylene and other monomers may have an arbitrary MFR value. Specifically, the MFR value of the random copolymer component is uniquely determined from the relationship of the MFR value of the block copolymer, the MFR value of the polymer component mainly composed of propylene, and the weight ratio of the polymer component mainly composed of propylene to the random copolymer component composed of propylene and other monomers. Therefore, it is a usual method that the MFR of the random copolymer is controlled to the desirable value for the purpose of controlling the above three values to the desired ones.

A method for adjusting the MFR value is similar to those for the propylene homopolymer and the random copolymer of propylene and other monomers. For the CXS value of the polymer component composed of mainly propylene, it may be adjusted in the same manner as in the case of the propylene homopolymer. For the comonomer content in the random copolymer component of propylene and other monomers, it may be adjusted in the same manner as in the case of the random copolymer of propylene and other monomers. For the content of the random copolymer component of propylene and other monomers in the block copolymer, it may be adjusted by using a known arbitrary method. Specifically, in order to increase the content of the random copolymer component of propylene and other monomers, the activity may be enhanced by increasing the pressure or prolonging the residence time in the polymerization reactor for producing the component, and vice versa.

Because polypropylene having high MFR values can be produced in high productivity by using the present invention, it is superior in view of achieving without CR treatment as compared with a conventional method. In a conventional production method, because it is difficult to produce polypropylene having high MFR values in high productivity, such a method is generally used that polypropylene having low MFR values is produced (in high productivity), and then this polypropylene having low MFR values is treated with a radical initiator such as a peroxide in the pelletization or the like to increase MFR values. Usually this treatment with a peroxide or the like is called CR treatment. This CR treatment is capable of increasing MFR values of polypropylene, however, because of a byproduct of a decomposed compound such as a peroxide, it has a problem that the quality of polypropylene is deteriorated in view of odor, hue, taste or the like. In addition, when CR treatment is conducted on the block copolymer of propylene and other monomers, it also has a problem of the enhanced frequency of gel generation caused by cross-linking of the random copolymer component. Therefore, the present invention that is capable of producing polypropylene having high MFR values in high productivity without CR treatment, is highly superior to a conventional technology.

[IV] Applications of Polypropylene

Polypropylene produced by using the present invention may be used in arbitrary applications. In particular, it is used suitably in the field where polypropylene having high MFR values are desirable. As particularly preferable examples, molding fields such as injection molding, injection compression molding, and fiber can be included.

As more specific applications, it may be used preferably as a material for a general injection molding represented by sundry articles; for an automotive use represented by a bumper or an instrumental panel or the like; for a home appliance represented by a housing etc. of a refrigerator or a cleaner; for a transparent food packaging represented by a container etc. for jelly; for an impact resistant food packaging represented by a container etc. for yogurt; for a heat resistant food packaging represented by a container etc. for pot-noodle; for a fiber represented by non-woven fabric etc. for sanitary goods; for a stretchable fiber represented by a supporter etc.; and the like.

EXAMPLES

Explanation will be given below on the present invention in more detail with reference to Examples, however, the present invention should not be limited to these Examples. Measurement methods for each of physical properties in the present invention will be shown below.

(1) MFR:

MFR was evaluated by the melt indexer, manufactured by Takara Co., Ltd., based on JIS-K6921 under condition of 230° C. and 21.18N.

(2) Bulk Density of a Polymer (BD):

Bulk density of a powder sample was measured by the apparatus according to ASTM D1895-69.

(3) CXS (Cold-xylene Soluble Content):

A sample (about 5 g) is once dissolved completely in p-xylene (300 ml) at 140° C. Then, the solution is cooled to 23° C. to precipitate a polymer at 23° C. for 12 hours. The precipitated polymer is filtrated and then p-xylene is evaporated from the filtrate. The residual polymer after evaporation of p-xylene was dried under the reduced pressure at 100° C. for 2 hours. The polymer after drying is weighed to obtain a CXS value as % by weight with respect to the sample.

(4) Quantitative Determination of Ethylene Content:

Average ethylene content in a copolymer was measured by the infrared spectrometer in the following procedures (i) to (iii).

(i) Sample Preparation

A sample was pressed to a sheet having a thickness of 500 μm with a hot compression press. Press conditions were as follows: 190° C., a preheating time of 2 minutes, a compression pressure of 50 MPa, and a compression time of 2 minutes.

(ii) Measurement of Absorbance with an Infrared Spectrometer

Absorption was measured by using the above-obtained sheet under the following conditions.
Apparatus: Shimadzu FTIR-8300
Resolution: 4.0 $cm^{-1}$
Measurement range: from 4,000 to 400 $cm^{-1}$
Calculation range of absorbance peak area: from 700 to 760 $cm^{-1}$ (iii) Calculation of Ethylene Content A calibration curve was prepared by using samples whose ethylene contents had been quantitatively determined with NMR in advance, and the ethylene content was calculated based on this calibration curve.

(5) Particle Size:

Size analysis was carried out by sieving a polymer product, and the size where 50% of the polymer product passes through was determined as the average particle size.

Particle size distribution of a powder sample was measured by sieving according to "Standard Test sieves" of JIS Z8801. In the obtained particle size distribution, the particle size corresponding to 50% by integrated weight was used as the average particle size (Examples 18 to 28 and Comparative Example 11)

(6) Average Particle Size and Uniformity of the Solid Catalyst Component:

The size where 50% of the solid catalyst passes through, calculated from the particle size distribution measured by the particle size analyzer (LS230-type, manufactured by BECKMAN COULTER CO., LTD.) was used as the average particle size, and the ratio between the size where 90% of the solid catalyst passes through, and that where 10% of the solid catalyst passes through, was used as the uniformity.

(7) Entrainment Amount:

The amount of fines removed by a bag filter installed before the condenser, in the ratio with respect to production amount, was evaluated as the entrainment amount (<100 μm) [g/kg].

(8) Amount of Powders Below 210 μm:

A polymer product was put through a sieve of 210 μm to determine the weight of powders (% by weight) passing through it.

(9) Density:

Density was determined by a density gradient tube method according to JIS K7112 D method with an extruded strand obtained in the MFR measurement.

(10) Ti Content:

A sample was accurately weighed and measured by using a colorimetry method after hydrolysis. For a sample after pre-polymerization, the content was calculated by the weight without pre-polymer.

(11) Content of the Silicon Compound:

A sample was accurately weighed and decomposed with methanol. By comparing with the standard samples, using gas chromatography, a concentration of the silicon compound in the obtained methanol solution was determined. The content of the silicon compound contained in the sample was calculated from the concentration of the silicon compound in methanol and the weight of the sample. For a sample after pre-polymerization, the content was calculated by the weight without pre-polymer.

(12) Transparency (Haze Value):

Haze value of the obtained random copolymer was determined under the following conditions.
Standard Numbers According to JIS K-7136 (ISO 14782), JIS K-7361-1
Measurement apparatus: Haze Turbidmeter NDH2000 (manufactured by Nippon Denshoku Ind, Co., Ltd.)
Thickness of a test piece: 2 mm
Preparation method for the test piece: An injection molded flat plate
Conditioning: After molding, the sample was held for 24 hours in the thermostatic room adjusted at a room temperature of 23° C., and a humidity of 50%.
Number of the test piece: n=3

(13) Calculation of Content of a Propylene-ethylene Random Copolymer Component in a Propylene-ethylene Block Copolymer:

It was calculated, in % by weight, from the values of production amounts at the first polymerization stage for the propylene homopolymer and those in the second polymerization stage for the propylene-ethylene random copolymer.

(14) Calculation of Ethylene Content of a Propylene-ethylene Random Copolymer in a Propylene-ethylene Block Copolymer:

The value was calculated from values of ethylene content in the propylene-ethylene block copolymer and the content of the propylene-ethylene random copolymer component in the propylene-ethylene block copolymer.

(15) Calculation of MFR of a Propylene-ethylene Random Copolymer Component in a Propylene-ethylene Block Copolymer:

It was calculated based on the mixing rule of the viscosity shown below, by using the values of MFR of the propylene homopolymer and the propylene-ethylene block copolymer, and the content of the propylene-ethylene random copolymer component in the propylene-ethylene block copolymer.

$100 \times LN(MFR$ of the block copolymer$)=$(the content of the propylene homopolymer$)\times LN(MFR$ of the propylene homopolymer$)+$(the content of the random copolymer$)\times LN(MFR$ of the random copolymer)

(16) IZOD Impact Resistance at Low Temperature:

It was measured at −20° C. according to "Plastics—A test method for IZOD impact strength" of JIS K7110-1984.

(17) Flexural Modulus:

It was measured at 23° C. according to "Plastics—A test method for flexural characteristics" of JIS K7171 (ISO178).

(18) Lump in Product Powder (% by Weight):

About 200 g of powders of the propylene-based block copolymer was sampled, and the lumps were separated by a sieve having a mesh opening of 3350 μm to determine the ratio thereof.

(19) Fluidity of Powder:

By a powder tester, manufactured by Hosokawa Mikron Corp., bulk density in the static mode and that in the tapping mode of the powder were individually measured to determine a compression degree by the following equation 1 to for an index of the fluidity of the powder. The higher value of the compression degree shows the worse fluidity of the powder.

Compression degree=[(bulk density in the tapping mode−bulk density in the static mode)/bulk density in the tapping mode]×100   (Equation 1)

(20) Measurement of Gel (Counts/g):

Into 2 kg of powders of the propylene-based block copolymer, 0.002 kg of 2,6-di-t-butyl-p-cresol and 0.002 kg of calcium stearate were added, and they were mixed at room temperature for 2 minutes by a high speed agitation-type mixer (Henschel Mixer: trade name), and the mixture was pelletized by an extruder with a screw diameter of 40 mm. By a compact-type kneader (LME, manufactured by ATLAS Co., Ltd.), the pellets were formed into a sheet having a width of 10 mm, a thickness of 0.5 mm and a length of 1000 mm, and the number of gels on the sheet was counted by visual check. The result was shown as a number of gels in 1 g of the sheet.

Example 1

(1) Preparation of a Solid Component

The atmosphere of the autoclave with an inner volume of 10 L, equipped with the agitator, was sufficiently replaced with nitrogen, and 2 L of purified toluene was introduced therein. Into the autoclave, 200 g of Mg(OEt)$_2$, and 1 L of TiCl$_4$ were introduced at room temperature. After it was heated up to 90° C., 50 mL of di-n-butyl phthalate was introduced. Then, the reaction was conducted for 3 hours at 110° C. The reaction product was sufficiently washed with purified toluene. Then, purified toluene was introduced to adjust the total liquid amount to 2 L. One liter of TiCl$_4$ was added at room temperature, and it was heated up to 110° C. to react for 2 hours. The reaction product was sufficiently washed with purified toluene. Then, purified toluene was introduced to adjust the total liquid amount to 2 L. One liter of TiCl$_4$ was added at room temperature, and it was heated up to 110° C. to react for 2 hours. The reaction product was sufficiently washed with purified toluene. Furthermore, by purified n-heptane, toluene was replaced with n-heptane to obtain the slurry of the solid component (A1). A part of the slurry was sampled and dried. As a result of analysis, Ti content of the solid component (A1) was 2.7% by weight.

Then, the atmosphere of the autoclave with an inner volume of 20 L, equipped with the agitator, was sufficiently replaced with nitrogen, and the slurry of the above solid component (A1) was measured and introduced therein corresponding to 100 g of the solid component (A1). By introducing purified n-heptane, the concentration of the solid component (A1) was adjusted to 25 g/L. Then, 50 mL of SiCl$_4$ was added and reacted at 90° C. for 1 hour. The reaction product was sufficiently washed with purified n-heptane.

After that, purified n-heptane was introduced to adjust the liquid level to 4 L. Into the slurry, 30 mL of dimethyldivinylsilane, 30 mL of (i-Pr)$_2$Si(OMe)$_2$ and a solution of Et$_3$Al (TEA) in n-heptane corresponding to 80 g of Et$_3$Al, were added to react at 40° C. for 2 hours. The reaction product was sufficiently washed with purified n-heptane, and a part of the obtained slurry was sampled and dried. As a result of analysis, the solid component was found to contain 1.2% by weight of Ti, and 8.8% by weight of (i-Pr)$_2$Si(OMe)$_2$.

(2) Pre-polymerization

With the solid component obtained in the above, pre-polymerization was conducted by the following procedure. Purified n-heptane was introduced into the above slurry to adjust the concentration of the solid component to 20 g/L. After the slurry was cooled to 10° C., a solution of Et$_3$Al in n-heptane corresponding to 10 g of Et$_3$Al was added, and 280 g of propylene was supplied in 4 hours. After the propylene supply, the reaction was continued for further 30 minutes. Then, a gas part was sufficiently replaced with nitrogen and the reaction product was sufficiently washed with purified n-heptane. The obtained slurry was discharged from the autoclave and dried under vacuum to obtain the solid catalyst component (A). The solid catalyst component (A) was found to contain 2.5 g of polypropylene per 1 g of the solid component. As a result of analysis, the solid catalyst component (A) was found to contain 1.0% by weight of Ti and 8.2% by weight of (i-Pr)$_2$Si(OMe)$_2$ in the solid component without pre-polymer.

(3) Polymerization of Propylene

Explanation will be given with reference to the flow sheet shown in attached FIG. 4. A gas-phase polymerization reactor with two polymerization reactors was used. The two polymerization reactors 10 and 20 are continuous horizontal gas-phase polymerization reactors (length/diameter=3.7) equipped with the agitator having an inner diameter D of 340 mm, a length L of 1260 mm, a diameter of the rotating shaft of 90 mm and an inner volume of 110 dm$^3$.

After replacing the atmosphere of the polymerization reactor 10 with nitrogen, 25 kg of polypropylene powder (the average particle size of 1500 μm) previously removed the polymer particles whose sizes are equal to or smaller than 500 μm was introduced, and the solid catalyst component (A)

obtained in the above was continuously supplied into the polymerization reactor 10 in the form of n-hexane slurry. The feed rate of the solid catalyst component (A) was adjusted so that the production rate of polypropylene became constant. In addition, the n-hexane solution of 15% by weight of triethylaluminum was continuously supplied in the molar ratio of 100 with respect to a Ti atom in the catalyst component (A). In addition, hydrogen was supplied into the polymerization reactor 10 so that the ratio of hydrogen concentration to propylene concentration in the polymerization reactor 10 became 0.08, and a propylene monomer was supplied into the polymerization reactor 10 so that the pressure and temperature in the polymerization reactor 10 were maintained to 2.2 MPa and 65° C., respectively. Unreacted gas exhausted from the polymerization reactor 10 was discharged from the reactor system through a pipeline 404 for exhausting unreacted gas, and cooled, condensed, and separated into liquefied propylene and mixed gases. The mixed gases were returned to the polymerization reactor 10 through a pipeline 402 for recycling gas. In addition, hydrogen gas for adjusting the molecular weight of the propylene-based polymer was also supplied from the pipeline 402. Liquefied propylene condensed outside the reactor system was supplied from a pipeline 403 for supplying raw material mixed gases, together with fresh raw material propylene. The heat of polymerization was removed by the heat of vaporization of liquefied propylene supplied from the pipeline 403.

Polypropylene produced in the polymerization reactor 10 was continuously discharged from the polymerization reactor 10 through a pipeline 411 for discharging a polymer to keep the level of a polymer at 50% of the reaction volume, and supplied to the polymerization reactor 20 for the second polymerization stage.

A polymer and propylene gas from the first polymerization stage were continuously supplied into the polymerization reactor 20 to conduct propylene polymerization. Reaction conditions were the set of the temperature of 65° C. and the pressure of 2.0 MPa. Unreacted gas exhausted from the polymerization reactor 20 was discharged from the reactor system through a pipeline 407 for exhausting unreacted gas, and cooled, condensed, and separated into liquefied propylene and mixed gases. The mixed gases were returned to the polymerization reactor 20 through a pipeline 405 for recycling gas. In addition, hydrogen gas, for adjusting the molecular weight of a propylene-based polymer, was also supplied from the pipeline 405. In this case, the ratio of hydrogen concentration to propylene concentration was adjusted to the same value as that of the polymerization reactor 10. Liquefied propylene condensed outside the reactor system was supplied from a pipeline 406 for raw material mixed gases, together with fresh raw material propylene. The heat of polymerization was removed by the heat of vaporization of liquefied propylene supplied from the pipeline 406.

Polypropylene produced in the second polymerization stage was continuously discharged from the polymerization reactor 20 through a pipeline 413 for discharging a polymer to keep the level of a polymer at 60% of the reaction volume. Discharged powders and gases were separated at a degassing tank 40, and a powder part was transferred to a recovery system. Production rate of propylene was 15 kg/hr, average residence time in the polymerization reactor 10 was 1.6 hr, and average residence time in the polymerization reactor 20 was 1.0 hr. Activity was calculated by dividing the production rate with the feed rate of the solid catalyst component (A) (without pre-polymer), and found to be 50,000 g-PP/g-catalyst.

As a result of analysis of the obtained polypropylene, the MFR value was 120 g/10 minutes, and the CXS value was 1.6% by weight. BD of the polypropylene particles was measured and found to be 0.45 g/ml.

Examples 2 to 5

Polymerization was conducted in the same manner as in Example 1 with the solid catalyst component (A) of Example 1 except for employing the polymerization conditions shown in Table 1. In Example 4 and Example 5, a silicon compound described in the Table was continuously supplied into the polymerization reactor 1. Results are shown in Table 1.

Example 6

According to Example 1, a propylene-ethylene block copolymer was produced, instead of a propylene homopolymer. In this case, in the polymerization reactor 10, homopolymerization of propylene was conducted in the same manner as in Example 1, and in the polymerization reactor 20, copolymerization of propylene and ethylene was conducted by using mixture gas of propylene and ethylene, instead of a propylene monomer. Production amount of the copolymer in the polymerization reactor 20 was adjusted by the amount of oxygen supplied from a pipeline 408 for adding an activity inhibitor. Content of the propylene-ethylene copolymer in the final product was determined by the total production rate and the production rate in the polymerization reactor 10. In addition, ethylene content in the propylene-ethylene copolymer produced in the polymerization reactor 20 was calculated from ethylene content of the final product and the content of the propylene-ethylene copolymer in the final product. Polymerization conditions and results are shown in Table 2.

Example 7

(1) Preparation of a Solid Component

The atmosphere of the autoclave with an inner volume of 10 L, equipped with the agitator, was sufficiently replaced with nitrogen, and 2 L of purified n-heptane was introduced therein. Then, 250 g of $MgCl_2$ and 1.8 L of $Ti(O-n-Bu)_4$ were introduced and reacted at 95° C. for 2 hours. The reaction product was cooled to 40° C. and 500 mL of methyl hydrogen polysiloxane (having a viscosity of 20 centistokes) was added. After the reaction at 40° C. for 5 hours, a solid product precipitated was sufficiently washed with purified n-heptane.

Then, purified n-heptane was introduced to adjust the concentration of the above solid product to 200 g/L. Into the slurry, 300 mL of $SiCl_4$ was added and reacted at 90° C. for 3 hours. The reaction product was sufficiently washed with purified n-heptane, and purified n-heptane was introduced to adjust the concentration of the reaction product to 100 g/L. Into the slurry, a solution of 30 mL of phthalic dichloride in 270 mL of purified n-heptane was added and reacted at 90° C. for 1 hour. The reaction product was sufficiently washed with purified n-heptane, and purified n-heptane was introduced to adjust the concentration of the reaction product to 200 g/L. Into the slurry, 1 L of $TiCl_4$ was added and reacted at 95° C. for 3 hours. The reaction product was sufficiently washed with purified n-heptane to obtain the slurry of the solid component (A1). A part of the slurry was sampled and dried. As a result of analysis, Ti content of the solid component (A1) was 2.5% by weight.

Then, the atmosphere of the autoclave with an inner volume of 20 L, equipped with the agitator, was sufficiently replaced with nitrogen, and the slurry of the above solid component (A1) was measured and introduced therein corresponding to 100 g of the solid component (A1). By introducing purified n-heptane, the concentration of the solid component (A1) was adjusted to 20 g/L. Into the slurry, 20 mL of trimethylvinylsilane, 20 mL of (t-Bu) (Me)Si(OMe)$_2$, and a solution of Et$_3$Al in n-heptane corresponding to 50 g of Et$_3$Al, were added to react at 30° C. for 2 hours. The reaction product was sufficiently washed with purified n-heptane, and a part of the obtained slurry was sampled and dried. As a result of analysis, the solid component was found to contain 2.1% by weight of Ti, and 7.4% by weight of (t-Bu)(Me)Si(OMe)$_2$.

(2) Pre-polymerization

With the solid component obtained in the above, pre-polymerization was conducted by the following procedure. Purified n-heptane was introduced into the above slurry to adjust the concentration of the solid component to 10 g/L. After the slurry was cooled to 10° C., a solution of Et$_3$Al in n-heptane corresponding to 10 g of Et$_3$Al was added, and 150 g of propylene was supplied in 2 hours. After the propylene supply, the reaction was continued for further 30 minutes. Then, a gas part was sufficiently replaced with nitrogen and the reaction product was sufficiently washed with purified n-heptane. The obtained slurry was discharged from the autoclave and dried under vacuum to obtain the solid catalyst component (A). The solid catalyst component (A) was found to contain 1.2 g of polypropylene per 1 g of the solid component. As a result of analysis, the solid catalyst component (A) was found to contain 1.7% by weight of Ti and 6.8% by weight of (t-Bu) (Me)Si(OMe)$_2$ in the solid component without pre-polymer.

(3) Polymerization of Propylene

Polymerization was conducted in the same manner as in Example 1 except that the above solid catalyst component (A) and the polymerization conditions shown in Table 1 were used. Results are shown in Table 1.

Example 8

A propylene-ethylene block copolymer was produced in the same manner as in Example 6 by using the solid catalyst component (A) of Example 7. Polymerization conditions and results are shown in Table 2.

Comparative Example 1

(1) Preparation of a Solid Catalyst Component

Pre-polymerization was conducted by the following procedure with the solid component (A1) of Example 1. The atmosphere of an autoclave with an inner volume of 20 L, equipped with an agitator, was sufficiently replaced with nitrogen, and the slurry of the solid component (A1) of Example 1 was measured and introduced therein corresponding to 100 g of the solid component (A1). By introducing purified n-heptane, the concentration of the solid component (A1) was adjusted to 20 g/L. After the slurry was cooled to 10° C., a solution of Et$_3$Al in n-heptane corresponding to 10 g of Et$_3$Al was added, and 280 g of propylene was supplied in 4 hours. After the propylene supply, the reaction was continued for further 30 minutes. Then, a gas part was sufficiently replaced with nitrogen, and the reaction product was sufficiently washed with purified n-heptane. The obtained slurry was discharged from the autoclave and dried under vacuum to obtain the solid catalyst component (A). the solid catalyst component (A) was found to contain 2.4 g of polypropylene per 1 g of the solid component. As a result of analysis, the solid catalyst component (A) was found to contain 2.2% by weight of Ti in the solid component without pre-polymer.

(2) Polymerization of Propylene

Polymerization was conducted in the same manner as in Example 1 except that the above solid catalyst component (A) and the polymerization conditions shown in Table 1 were used. Results are shown in Table 1.

Comparative Example 2

A propylene-ethylene block copolymer was produced in the same manner as in Example 6 with the solid catalyst component (A) of Comparative Example 1. Polymerization conditions and results are shown in Table 2.

TABLE 1

| | | | | Example 1 | Example 2 | Example 3 | Example 4 |
|---|---|---|---|---|---|---|---|
| Polymerization conditions | 1st poly. Stage | TEA supply amount | mol-Al/mol-Ti | 100 | 100 | 100 | 100 |
| | | Si compound (A3) | Kind | Non | Non | Non | (i-Pr)$_2$Si(OMe)$_2$ |
| | | Si comp. supply amount | mol/mol-Al | Non | Non | Non | 0.05 |
| | | Temperaure | ° C. | 65 | 65 | 65 | 65 |
| | | Pressure | MPa | 2.2 | 2.2 | 2.2 | 2.2 |
| | | H$_2$/propylene | mol/mol | 0.05 | 0.055 | 0.15 | 0.085 |
| | | Residence time | hr | 1.6 | 1.6 | 1.6 | 1.6 |
| | 2nd poly. Stage | Temperaure | ° C. | 65 | 65 | 65 | 65 |
| | | Pressure | MPa | 2 | 2 | 2 | 2 |
| | | Production rate | kg/hr | 15 | 15 | 15 | 15 |
| | | Residence time | hr | 1 | 1 | 1 | 1 |
| Poly. results | 2nd poly. Stage | MFR | g/10 min | 120 | 70 | 400 | 120 |
| | | CXS | wt % | 1.6 | 1.4 | 1.8 | 1.4 |
| | | Activity | g-PP/g-cat. | 50,000 | 53,000 | 44,000 | 45,000 |
| | | BD | g/ml | 0.45 | 0.46 | 0.43 | 0.45 |

| | | | | Example 5 | Example 7 | Comp. Example 1 |
|---|---|---|---|---|---|---|
| Polymerization conditions | 1st poly. Stage | TEA supply amount | mol-Al/mol-Ti | 100 | 100 | 50 |
| | | Si compound (A3) | Kind | (cyc-Pen)$_2$Si(OMe)$_2$ | Non | (i-Pr)$_2$Si(OMe)$_2$ |
| | | Si comp. supply amount | mol/mol-Al | 0.05 | Non | 0.1 |

TABLE 1-continued

|  |  |  |  |  |  |  |
|---|---|---|---|---|---|---|
|  |  | Temperaure | °C. | 65 | 65 | 65 |
|  |  | Pressure | MPa | 2.2 | 2.2 | 2.2 |
|  |  | H$_2$/propylene | mol/mol | 0.1 | 0.065 | 0.14 |
|  |  | Residence time | hr | 1.6 | 1.6 | 1.6 |
|  | 2nd poly. Stage | Temperaure | °C. | 65 | 65 | 65 |
|  |  | Pressure | MPa | 2 | 2 | 2 |
|  |  | Production rate | kg/hr | 15 | 15 | 15 |
|  |  | Residence time | hr | 1 | 1 | 1 |
| Poly. results | 2nd poly. Stage | MFR | g/10 min | 120 | 100 | 120 |
|  |  | CXS | wt % | 1.2 | 1.5 | 2 |
|  |  | Activity | g-PP/g-cat. | 44,000 | 42,000 | 24,000 |
|  |  | BD | g/ml | 0.45 | 0.46 | 0.41 |

(Note);
poly. = polymerization
comp. = compound
cat. = catalyst

TABLE 2

|  |  |  |  | Example 6 | Example 8 | Comp. Exmp. 2 |
|---|---|---|---|---|---|---|
| Polymerization conditions | 1st poly. Stage | TEA supply amount | mol-Al/mol-Ti | 100 | 100 | 50 |
|  |  | Si compound (A3) | — | Non | Non | (i-Pr)$_2$Si(OMe)$_2$ |
|  |  | Si comp. supply amount | mol/mol-Al | Non | Non | 0.1 |
|  |  | Temperaure | °C. | 65 | 65 | 65 |
|  |  | Pressure | MPa | 2.2 | 2.2 | 2.2 |
|  |  | H$_2$/propylene | mol/mol | 0.1 | 0.083 | 0.21 |
|  |  | Residence time | hr | 1.6 | 1.6 | 1.6 |
|  | 2nd poly. Stage | Temperaure | °C. | 60 | 60 | 60 |
|  |  | Pressure | MPa | 2 | 2 | 2 |
|  |  | H$_2$/ethylene | mol/mol | 0.04 | 0.04 | 0.07 |
|  |  | Ethylene/propylene | mol/mol | 0.32 | 0.40 | 0.28 |
|  |  | Production rate | kg/hr | 13 | 12 | 13 |
|  |  | Residence time | hr | 1.1 | 1.2 | 1.1 |
| Poly. Results | 1st poly. Stage | MFR | g/10 min | 200 | 140 | 200 |
|  | 2nd poly. Stage | MFR | g/10 min | 71 | 89 | 71 |
|  |  | Content of P-E copolymer | wt % | 15 | 7 | 15 |
|  |  | Ethylene content in P-E copolymer | wt % | 40 | 50 | 40 |
|  |  | Activity | g-PP/g-cat. | 42,400 | 32,300 | 17,600 |
|  |  | BD | g/ml | 0.45 | 0.45 | 0.43 |

(Note);
P-E polymer; propylene-ethylene copolymer

Example 9

(1) Preparation of a Solid Component

The atmosphere of the autoclave with an inner volume of 10 L, equipped with the agitator, was sufficiently replaced with nitrogen, and 2 L of purified toluene was introduced therein. Into the autoclave, 200 g of Mg(OEt)$_2$, and 1 L of TiCl$_4$ were introduced at room temperature. After it was heated up to 90° C., 50 mL of di-n-butyl phthalate was introduced. Then, the reaction was conducted for 3 hours at 110° C. The reaction product was sufficiently washed with purified toluene. Then, purified toluene was introduced to adjust the total liquid amount to 2 L. One liter of TiCl$_4$ was added at room temperature, and it was heated up to 110° C. to react for 2 hours. The reaction product was sufficiently washed with purified toluene. Furthermore, by purified n-heptane, toluene was replaced with n-heptane to obtain the slurry of the solid component (A1). A part of the slurry was sampled and dried. As a result of analysis, Ti content of the solid component (A1) was 2.7% by weight. In addition, the average particle size of the solid component was 33 μm.

(2) Contact Treatment

Then, the atmosphere of the autoclave with an inner volume of 20 L, equipped with the agitator, was sufficiently replaced with nitrogen, and the slurry of the above solid component (A1) was measured and introduced therein corresponding to 100 g of the solid component (A1). By introducing purified n-heptane, the concentration of the solid component (A1) was adjusted to 25 g/L. Into the slurry, 30 mL of (A2) dimethyldivinylsilane, 30 mL of (A3) (i-Pr)$_2$Si(OMe)$_2$ and (A4) a solution of Et$_3$Al (TEA) in n-heptane corresponding to 80 g of Et$_3$Al, were added and reacted at 40° C. for 2 hours to obtain the solid catalyst component (A'). The reaction product was sufficiently washed with purified n-heptane, and a part of the obtained slurry was sampled and dried. As a result of analysis, the solid catalyst component (A') was found to contain 2.3% by weight of Ti, and 7.8% by weight of (i-Pr)$_2$Si(OMe)$_2$. In addition, the average particle size of (A') was 33 μm.

(3) Pre-polymerization

With the solid catalyst component (A') obtained in the above, pre-polymerization was conducted by the following procedure. Purified n-heptane was introduced into the above slurry to adjust the concentration of the solid catalyst component (A') to 20 g/L. After the slurry was cooled to 10° C., a solution of Et$_3$Al in n-heptane corresponding to 10 g of Et$_3$Al was added, and 280 g of propylene was supplied in 4 hours. After the propylene supply, the reaction was continued for further 30 minutes. Then, a gas part was sufficiently replaced with nitrogen and the reaction product was sufficiently washed with purified n-heptane. The obtained slurry was discharged from the autoclave and dried under vacuum to obtain the solid catalyst component (A). The solid catalyst component (A) was found to contain 2.5 g of polypropylene per 1 g of the solid catalyst component (A). As a result of analysis, the solid catalyst component (A) was found to contain 1.9% by weight of Ti and 7.2% by weight of $(i-Pr)_2Si(OMe)_2$ in the solid component without pre-polymer. In addition, the average particle size of the solid catalyst component (A) after pre-polymerization was 62 μm.

(4) Polymerization of Propylene

Figure 4:
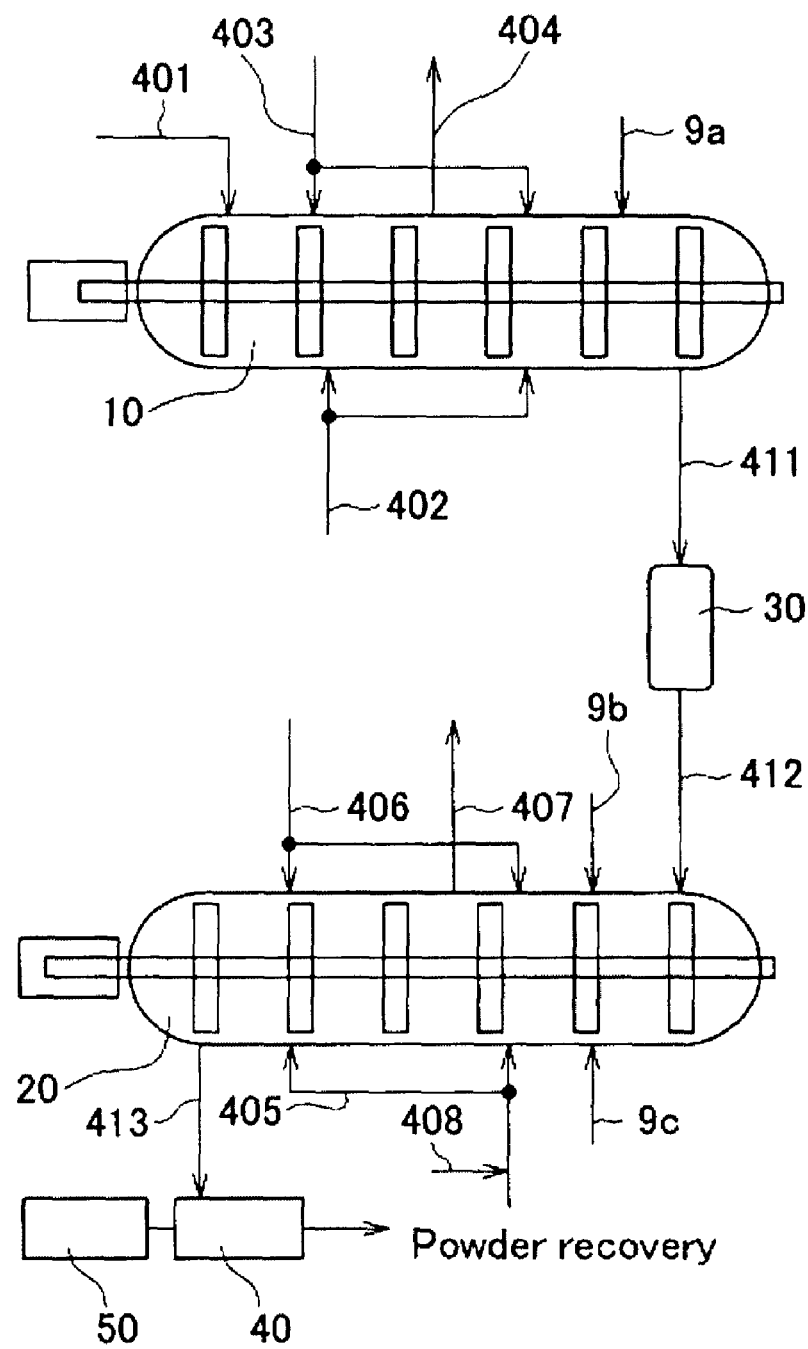
FIG. 4 is a schematic drawing showing a production process of polypropylene used in Examples and Comparative Examples.

For a polymerization reactor, a gas-phase polymerization reactor with two polymerization reactors was used, in the same manner as in Example 1 (refer to FIG. 4). The two polymerization reactors 10 and 20 are continuous horizontal gas-phase polymerization reactors (length/diameter=3.7) equipped with the agitator, having an inner diameter D of 340 mm, a length L of 1260 mm, a diameter of the rotating shaft of 90 mm and an inner volume of 110 dm$^3$.

After replacing the atmosphere of the polymerization reactor 10 with nitrogen gas, 25 kg of polypropylene powder (the average particle size of 1500 μm) previously removed the polymer particles whose sizes are equal to or smaller than 500 μm was introduced, and then, the solid catalyst component (A) obtained in the above was continuously supplied in the rate of 0.26 g/hr as the solid catalyst component, and also the n-hexane solution of 15% by weight of triethylaluminum was continuously supplied in the molar ratio of 90 with respect to a Ti atom in the solid catalyst component (A). In addition, hydrogen was supplied into the polymerization reactor 10 so that the ratio of hydrogen concentration to propylene concentration in the polymerization reactor 1 becomes 0.03, and a propylene monomer was supplied into the polymerization reactor 10 so that the pressure in the polymerization reactor 10 was maintained to 2.15 MPa and the temperature was maintained at 65° C. The heat of the reaction was removed by the heat of vaporization of raw material propylene supplied from a pipeline 403 for supplying raw material mixed gases. Unreacted gas exhausted from the polymerization reactor 10 was discharged from the reactor system through a pipeline 404 for exhausting unreacted gas, and cooled, condensed, and returned to the polymerization reactor 10 through a pipeline 402 for recycling gas.

Propylene polymer produced in the polymerization reactor 10 was continuously discharged from the polymerization reactor 10 through a pipeline 411 for discharging a polymer to keep the level of a polymer at 50% of the reaction volume, and supplied to the polymerization reactor 20 for the second polymerization stage.

A polymer and propylene gas from the first polymerization stage were continuously supplied into the polymerization reactor 20 to conduct propylene polymerization. Reaction conditions were the set of the agitation frequency of 25 rpm, the temperature of 65° C., and the pressure of 2.0 MPa. In addition, hydrogen gas, for adjusting the molecular weight of a propylene polymer, was supplied from a pipeline 405. The heat of reaction was removed by the heat of vaporization of raw material liquefied propylene supplied from a pipeline 406 for raw material mixed gases. Unreacted gas exhausted from the polymerization reactor 20 was discharged from the reactor system through a pipeline 407 for exhausting unreacted gas, and cooled and condensed to be refluxed to the polymerization reactor 20 through a pipeline 405 for recycling gas. A propylene polymer composition produced at the second polymerization stage was continuously discharged from the polymerization reactor 20 through a pipeline 413 for discharging a polymer to keep the level of a polymer at 60% of the reaction volume. Discharged powders and gases were separated at a gas recovery apparatus 40, and a powder part was transferred to a recovery system. Fines were recovered from the gases by using a bag filter to measure the amount of entrainment.

Production rate of the propylene polymer composition was 15 kg/hr. In addition, the production amount of fines (the amount of entrainment) whose particle sizes are equal to or smaller than 100 μm with respect to the production amount was measured 5 times, and found to be 0.071 g/kg, in average.

On the other hand, a polymer discharged was treated with the nitrogen gas containing 5% by volume of steam, at 100° C. for 30 minutes to obtain polypropylene particles. The obtained polypropylene particles were spherical and found to have a BD of 460 kg/m$^3$, an average particle size of 1350 μm, and the content of fines whose sizes are equal to or smaller than 210 μm, of 0.05% by weight. Results are shown in Table 3.

Comparative Example 3

(1) Pre-polymerization

With the solid component (A1) obtained in Example 9, pre-polymerization was conducted by the following procedure. By introducing purified n-heptane to the above slurry, the concentration of the solid component (A1) was adjusted to 20 g/L. Into the slurry at room temperature, the solution of $Et_3Al$ in n-hexane corresponding to 10 g of $Et_3Al$ and the solution of $iPr_2Si(Me)_2$ in n-hexane corresponding to 2.3 g of $iPr_2Si(Me)_2$ were added, and 200 g of propylene was supplied in 4 hours. After the propylene supply, the reaction was continued for further 30 minutes. Then, a gas part was sufficiently replaced with nitrogen to obtain the solid catalyst component (A). The solid catalyst component was found to contain 2.2 g of polypropylene per 1 g of the catalyst. In addition, the average particle size of the catalyst (A) after pre-polymerization was 60 μm.

(2) Polymerization of Olefin

The following polymerization conditions are employed. The solid catalyst component (A) was continuously supplied in the rate of 0.54 g/h as the solid component, and in addition, the n-hexane solution of 15% by weight of triethylaluminum and the solution of 0.5 mmol/L of diisopropyldimethoxysilane were also continuously supplied in the molar ratios of 90 and 10, respectively, with respect to a Ti atom in the solid catalyst component (A). In addition, the polymerization reactors were operated under the same condition as in Example 9, except that hydrogen was supplied to keep the ratio of hydrogen concentration to propylene concentration in the polymerization reactor at 0.06. Production rate of propylene-base polymer composition was 15 kg/hr, average residence time in the polymerization reactor 10 was 1.6 hr, and average residence time in the polymerization reactor 20 was 1.0 hr.

The obtained polypropylene particles were spherical and found to have a BD of 450 kg/m$^3$, an average particle size of 1050 μm, and the content of fines whose sizes are equal to or smaller than 210 μm, of 0.46% by weight. In addition, the production amount of fines whose particle sizes are equal to or smaller than 100 μm with respect to the production amount was measured 5 times, and found to be 0.481 g/kg, in average. In addition, results are shown in Table 3.

Comparative Example 4

(1) Preparation of a Solid Component

The atmosphere of the autoclave with an inner volume of 10 L, equipped with the agitator, was sufficiently replaced with nitrogen, and 2 L of decane, 360 g of anhydrous magnesium chloride, and 1.8 L of 2-ethyl-1-hexanol were introduced and mixed, and heated and reacted under agitation at 140° C. for 4 hours to obtain a homogeneous solution. Into the homogeneous solution, 85 g of phthalic anhydride was added and dissolved under agitation at 130° C. in the additional 1 hour.

After the obtained homogeneous solution was cooled down to room temperature (23° C.), all of the homogeneous solution was dropped into 10 L of titanium tetrachloride maintained at −20° C. in 3 hours. After that, it was gradually heated up to 110° C. in 4 hours, and then, 250 mL of di-1-butyl phthalate was added at 110° C. to conduct a reaction maintaining at 110° C. for 2 hours under agitation. After the reaction of 2 hours, the solid part was obtained by hot filtration, and the solid part was suspended again in 14 L of $TiCl_4$, and heated again up to 110° C. and reacted for 2 hours.

After the reaction, the solid part was obtained by hot filtration again, and sufficiently washed with n-hexane until no soluble titanium was detected in the washing solution. Subsequently, the solvent was separated by filtration to obtain the slurry of the solid component (A1). A part of the slurry was sampled and dried. As a result of analysis, Ti content of the solid component (A1) was 2.4% by weight. In addition, the average particle size of the solid component was 14 μm.

(2) Contact Treatment

A solid catalyst component (A') was obtained by the contact treatment in the same manner as in Example 9 with the solid catalyst component (A1) obtained in the above.

A part of the obtained slurry was sampled and dried. As a result of analysis, the solid catalyst component (A') was found to contain 1.9% by weight of Ti and 7.6% by weight of $(i\text{-}Pr)_2Si(OMe)_2$. In addition, the average particle size of the catalyst was 14 μm.

(3) Pre-polymerization

With the solid catalyst component (A') in the above, pre-polymerization was conducted in the same manner as in Example 9. The obtained slurry was discharged from the autoclave and dried under vacuum to obtain the solid catalyst component (A). The solid catalyst component (A) was found to contain 2.1 g of polypropylene per 1 g of the catalyst. As a result of analysis, the solid catalyst component (A) was found to contain 1.3% by weight of Ti and 7.1% by weight of $(i\text{-}Pr)_2Si(OMe)_2$ in the solid component without pre-polymer. In addition, average particle diameter of the solid catalyst was 28 μm.

(4) Polymerization of Olefin

The following polymerization conditions are employed. The solid catalyst component (A) obtained in the above was continuously supplied in the rate of 0.98 g/h as the solid component, and in addition, the n-hexane solution of 15% by weight of triethylaluminum and the solution of 0.5 mmol/L of diisopropyldimethoxysilane were also continuously supplied in the molar ratios of 90 and 9, respectively, with respect to a Ti atom in the solid catalyst component (A). In addition, the polymerization reactors were operated under the same condition as in Example 9, except that hydrogen was supplied to keep the ratio of hydrogen concentration to propylene concentration in the polymerization reactor at 0.05.

Production rate of the propylene polymer composition was 14.2 kg/hr.

The obtained polypropylene particles were spherical and found to have a BD of 470 kg/m³, an average particle size of 620 μm, and the content of fines whose sizes are equal to or smaller than 210 μm, of 1.23% by weight. In addition, the production amount of fines whose particle sizes are equal to or smaller than 100 μm with respect to the production amount was measured 5 times, and found to be 0.275 g/kg, in average. Results are shown in Table 3.

TABLE 3

| | | | Example 9 | Comp. Examp. 3 | Comp. Examp. 4 |
|---|---|---|---|---|---|
| Catalyst (A) | Average particle size | μm | 33 | 33 | 14 |
| | Uniformity | — | 1.72 | 1.72 | 1.84 |
| | Contact treatment | — | Yes | Non | Yes |
| | Average Particle size after pre-polymerization | μm | 62 | 60 | 28 |
| 1st poly. Stage | Polymerization temperature | ° C. | 65 | 65 | 65 |
| | Polymerization pressure | MPa | 2.2 | 2.2 | 2.2 |
| | Catalyst feed amount | g/h | 0.26 | 0.54 | 0.98 |
| 2nd. poly. Stage | Polymerization temperature | ° C. | 65 | 65 | 65 |
| | Polymerization pressure | MPa | 2.0 | 2.0 | 2.0 |
| Polymer characteristics | MFR | g/10 min | 32 | 33 | 32 |
| | BD | kg/m³ | 460 | 450 | 470 |
| | Average particle size | μm | 1350 | 1050 | 620 |
| | Production rate | kg/hr | 15.0 | 15.0 | 14.2 |
| | Activity | g-pp/g-Cat. | 58000 | 27800 | 14500 |
| | Activity (per hr) | g-pp/g-Cat. · h | 22300 | 10700 | 5300 |
| | Entrainment amount | g/kg | 0.071 | 0.481 | 0.275 |
| | Amount of powder <210 μm | wt % | 0.05 | 0.46 | 1.23 |

Example 10

(1) Preparation of a Solid Component

The atmosphere of the autoclave with an inner volume of 10 L, equipped with the agitator, was sufficiently replaced with nitrogen, and 2 L of purified toluene was introduced therein. Into the autoclave, 200 g of Mg(OEt)$_2$, and 1 L of TiCl$_4$ were introduced at room temperature. After it was heated up to 90° C., 50 mL of di-n-butyl phthalate was introduced. Then, the reaction was conducted for 3 hours at 110° C. The reaction product was sufficiently washed with purified toluene. Then, purified toluene was introduced to adjust the total liquid amount to 2 L. One liter of TiCl$_4$ was added at room temperature, and it was heated up to 110° C. to react for 2 hours. Furthermore, by purified n-heptane, toluene was replaced with n-heptane to obtain the slurry of the solid component (A1). A part of the slurry was sampled and dried. As a result of analysis, Ti content of the solid component (A1) was 2.7% by weight.

Then, the atmosphere of the autoclave with an inner volume of 20 L, equipped with the agitator, was sufficiently replaced with nitrogen, and the slurry of the above solid component (A1) was measured and introduced therein corresponding to 100 g of the solid component (A1). By introducing purified n-heptane, the concentration of the solid component (A1) was adjusted to 25 g/L. Then, 50 mL of SiCl$_4$ was added and reacted at 90° C. for 1 hour. The reaction product was sufficiently washed with purified n-heptane.

After that, purified n-heptane was introduced to adjust the liquid level to 4 L. Into the slurry, 30 mL of dimethyldivinylsilane, 30 mL of (i-Pr)$_2$Si(OMe)$_2$ and a solution of Et$_3$Al (TEA) in n-heptane corresponding to 80 g of Et$_3$Al, were added to react at 40° C. for 2 hours. The reaction product was sufficiently washed with purified n-heptane, and a part of the obtained slurry was sampled and dried. As a result of analysis, the solid component was found to contain 1.2% by weight of Ti, and 8.8% by weight of (i-Pr)$_2$Si(OMe)$_2$.

(2) Pre-polymerization

With the solid component obtained in the above, pre-polymerization was conducted by the following procedure. Purified n-heptane was introduced into the above slurry to adjust the concentration of the solid component to 20 g/L. After the slurry was cooled to 10° C., a solution of Et$_3$Al in n-heptane corresponding to 10 g of Et$_3$Al was added, and 280 g of propylene was supplied in 4 hours. After the propylene supply, the reaction was continued for further 30 minutes. Then, a gas part was sufficiently replaced with nitrogen and the reaction product was sufficiently washed with purified n-heptane. The obtained slurry was discharged from the autoclave and dried under vacuum to obtain the solid catalyst component (A). The solid catalyst component (A) was found to contain 2.5 g of polypropylene per 1 g of the solid component. As a result of analysis, the solid catalyst component (A) was found to contain 1.0% by weight of Ti and 8.2% by weight of (i-Pr)$_2$Si(OMe)$_2$ in the solid component without pre-polymer.

(3) Polymerization of Propylene

For a polymerization reactor, a gas-phase polymerization reactor with two polymerization reactors was used in the same manner as in Example 1 (refer to FIG. 4). The two polymerization reactors 10 and 20 are continuous horizontal gas-phase polymerization reactors (length/diameter=3.7) equipped with the agitator, having an inner diameter D of 340 mm, a length L of 1260 mm, a diameter of the rotating shaft of 90 mm and an inner volume of 110 dm$^3$.

After replacing the atmosphere of the polymerization reactor 10 with nitrogen gas, 25 kg of polypropylene powder (the average particle size of 1500 μm) previously removed the polymer particles whose sizes are equal to or smaller than 500 μm was introduced, and the solid catalyst component (A) obtained in the above was continuously supplied into the polymerization reactor 10 in the form of n-hexane slurry. The feed rate of the solid catalyst component (A) was adjusted so that the production rate of polypropylene became constant. In addition, the n-hexane solution of 15% by weight of triethylaluminum was continuously supplied in the molar ratio of 100 with respect to a Ti atom in the catalyst component (A). In addition, hydrogen was supplied into the polymerization reactor 10 so that the ratio of hydrogen concentration to propylene concentration in the polymerization reactor 10 became 0.08, and a propylene monomer was supplied into the polymerization reactor 10 so that the pressure and temperature in the polymerization reactor 10 were maintained to 2.2 MPa and 65° C., respectively. Unreacted gas exhausted from the polymerization reactor 10 was discharged from the reactor system through a pipeline 404 for exhausting unreacted gas, and cooled, condensed, and separated into liquefied propylene and mixed gases. The mixed gases were returned to the polymerization reactor 10 through a pipeline 402 for recycling gas. In addition, hydrogen gas for adjusting the molecular weight of the propylene polymer was also supplied from the pipeline 402. Liquefied propylene, condensed outside the reactor system was supplied from a pipeline 403 for supplying raw material mixed gases, together with fresh raw material propylene. The heat of polymerization was removed by the heat of vaporization of liquefied propylene supplied from the pipeline 403.

Polypropylene produced in the polymerization reactor 10 was continuously discharged from the polymerization reactor 10 through a pipeline 411 for discharging a polymer to keep the level of a polymer at 50% of the reaction volume, and supplied to the polymerization reactor 20 for the second polymerization stage.

A polymer and propylene from the first polymerization stage were continuously supplied into the polymerization reactor 20 to conduct copolymerization of propylene and ethylene. Reaction conditions were the set of the temperature of 60° C. and the pressure of 2.0 MPa. Unreacted gas exhausted from the polymerization reactor 20 was discharged from the reactor system from a pipeline 407 for exhausting unreacted gas, and cooled, condensed, and separated into liquefied propylene and mixed gases. The mixed gases were returned to the polymerization reactor 20 through a pipeline 405 for recycling gas. In addition, ethylene gas and hydrogen gas were also supplied from the pipeline 405 to keep the ratio of ethylene concentration to propylene concentration and the ratio of hydrogen concentration to ethylene concentration at 0.32 and 0.1, respectively, in the polymerization reactor 20. Liquefied propylene condensed outside the reactor system was supplied from a pipeline 406 for supplying raw material mixed gases, together with fresh raw material propylene. The heat of polymerization was removed by the heat of vaporization of liquefied propylene supplied from this pipeline 406. Furthermore, oxygen was supplied as an activity inhibitor from a pipeline 408 for adding the activity inhibitor, connected to the pipeline 405, in the molar ratio of 30 with respect to a Ti atom contained in the solid catalyst component (A) supplied to the polymerization reactor 10.

A propylene-based block copolymer produced in the second polymerization stage was continuously discharged from the polymerization reactor 20 through a pipeline 413 for discharging a polymer to keep the level of a polymer at 60% of the reaction volume. Discharged powders and gases were separated at a gas recovery apparatus 40, and a powder part was transferred to a recovery system.

Production rate of the polypropylene-based block copolymer was 15 kg/hr, average residence time in the polymerization reactor 10 was 1.6 hr, and average residence time in the polymerization reactor 20 was 1.0 hr. Activity was calculated by dividing the production rate with the feed rate of the solid catalyst component (A) (without pre-polymer), and found to be 50,000 g-PP/g-catalyst.

As a result of analysis of the sample partly discharged from the polymerization reactor 10, the MFR value was 120 g/10 minutes, and the CXS value was 1.6% by weight. As a result of analysis of the finally obtained polypropylene-based block copolymer, the MFR value was 32 g/10 minutes. In addition, the content of the propylene-ethylene random copolymer component in the polypropylene-based block copolymer was 25% by weight, ethylene content in the propylene-ethylene random copolymer component was 40% by weight, and the MFR value of the propylene-ethylene random copolymer component was 0.6 g/10 minutes. Polypropylene particles showed good fluid ability and were found to have a polymer bulk density (BD) of 0.45 g/ml and the average particle size of 1,220 μm.

Examples 11 to 14

Polymerization was conducted in the same manner as in Example 10 with the solid catalyst component (A) of Example 10 except for employing the polymerization conditions shown in Table 4. In Example 14, a silicon compound described in the Table was continuously supplied into the polymerization reactor 10. Results are shown in Table 4.

Comparative Example 5

(1) Preparation of a Solid Component

Pre-polymerization was conducted by the following procedure with the solid component (A1) of Example 10. The atmosphere of the autoclave with an inner volume of 20 L, equipped with the agitator, was sufficiently replaced with nitrogen, and the slurry of the solid component (A1) of Example 10 was measured and introduced therein corresponding to 100 g of the solid component (A1). By introducing purified n-heptane, the concentration of the solid component (A1) was adjusted to 20 g/L. After the slurry was cooled to 10° C., a solution of $Et_3Al$ in n-heptane corresponding to 10 g of $Et_3Al$ was added, and 280 g of propylene was supplied in 4 hours. After the propylene supply, the reaction was continued for further 30 minutes. Then, a gas part was sufficiently replaced with nitrogen, and the reaction product was sufficiently washed with purified n-heptane. The obtained slurry was discharged from the autoclave and dried under vacuum to obtain the solid catalyst component (A). The solid catalyst component (A) was found to contain 2.4 g of polypropylene per 1 g of the solid component. As a result of analysis, the solid catalyst component (A) was found to contain 2.2% by weight of Ti in the solid component without pre-polymer.

(2) Polymerization of Propylene

Polymerization was conducted in the same manner as in Example 10 except that the above solid catalyst component (A) and the polymerization conditions shown in Table 2 were used. The obtained polypropylene particles were extremely sticky. Results are shown in Table 4.

Comparative Examples 6 to 7

Polymerization was conducted in the same manner as in Comparative Example 5 except that the polymerization conditions shown in Table 5 were used. Results are shown in Table 4.

Comparative Example 8

Polymerization was conducted in the same manner as in Comparative Example 5 except that the amount of oxygen supplied as an activity inhibitor was adjusted to 1 in the molar ratio with respect to a Ti atom contained in the solid catalyst component (A). Because of the serious fouling in the polymerization reactor 20, it could not be stably operated.

TABLE 4

| | | | | Example 10 | Example 11 | Example 12 | Example 13 | Example 14 |
|---|---|---|---|---|---|---|---|---|
| Polymerization conditions | Poly. reactor 1 | TEA supply amount | mol-Al/mol-Ti | 100 | 100 | 100 | 100 | 100 |
| | | Si compound (A3) | — | Non | Non | Non | Non | (i-Pr)$_2$Si(OMe)$_2$ |
| | | Si comp. supply amount | mol/mol-Al | Non | Non | Non | Non | 0.05 |
| | | Temperature | ° C. | 65 | 65 | 65 | 65 | 65 |
| | | Pressure | MPa | 2.2 | 2.2 | 2.2 | 2.2 | 2.2 |
| | | H$_2$/propylene | mol/mol | 0.08 | 0.1 | 0.055 | 0.15 | 0.085 |
| | | Residence time | hr | 1.6 | 1.6 | 1.6 | 1.6 | 1.6 |
| | Poly. reactor 2 | Temperature | ° C. | 60 | 60 | 60 | 60 | 60 |
| | | Pressure | MPa | 2 | 2 | 2 | 2 | 2 |
| | | H$_2$/ethylene | mol/mol | 0.1 | 0.14 | 0.2 | 0.1 | 0.1 |
| | | Ethylene/propylene | mol/mol | 0.32 | 0.48 | 0.65 | 0.32 | 0.32 |
| | | O$_2$/Ti | mol/mol | 30 | 20 | 50 | 40 | 30 |
| | | Production rate | kg/hr | 15 | 17 | 14 | 14 | 15 |
| | | Residence time | hr | 1 | 0.9 | 1.1 | 1.1 | 1 |
| Poly. Results | Poly. reactor 1 | MFR | g/10 min | 120 | 200 | 70 | 400 | 120 |
| | | CXS | wt % | 1.6 | 1.6 | 1.4 | 1.8 | 1.4 |
| | Poly. reactor 2 | MFR of block copolymer | g/10 min | 32 | 35 | 35 | 109 | 32 |
| | | MFR of random copolymer component | g/10 min | 0.6 | 1 | 1.5 | 0.6 | 0.6 |
| | | Content of random copolymer component | wt % | 25 | 33 | 18 | 20 | 25 |
| | | Ethylene content of random copolymer component | wt % | 40 | 45 | 50 | 40 | 40 |
| | | Activity | g-PP/g-Cat. | 50,000 | 53,700 | 48,500 | 41,300 | 45,000 |

TABLE 4-continued

| | | | | | | | | | | |
|---|---|---|---|---|---|---|---|---|---|---|
| | Av. particle size | mm | 1,220 | | 1,250 | | 1,200 | | 1,140 | 1,170 |
| | BD | g/ml | 0.44 | | 0.43 | | 0.45 | | 0.42 | 0.44 |

| | | | | Comp. Exam. 5 | Comp. Exam. 6 | Comp. Exam. 7 |
|---|---|---|---|---|---|---|
| Polymerization conditions | Poly. reactor 1 | TEA supply amount | mol-Al/mol-Ti | 50 | 50 | 50 |
| | | Si compound (A3) | — | $(i\text{-Pr})_2Si(OMe)_2$ | $(i\text{-Pr})_2Si(OMe)_2$ | $(i\text{-Pr})_2Si(OMe)_2$ |
| | | Si comp. supply amount | mol/mol-Al | 0.1 | 0.1 | 0.1 |
| | | Temperature | °C. | 65 | 65 | 65 |
| | | Pressure | MPa | 2.2 | 2.2 | 2.2 |
| | | $H_2$/propylene | mol/mol | 0.144 | 0.08 | 0.144 |
| | | Residence time | hr | 1.6 | 1.6 | 1.6 |
| | Poly. reactor 2 | Temperature | °C. | 60 | 60 | 60 |
| | | Pressure | MPa | 2 | 2 | 2 |
| | | $H_2$/ethylene | mol/mol | 0.19 | 0.19 | 0.19 |
| | | Ethylene/propylene | mol/mol | 0.28 | 0.28 | 0.28 |
| | | $O_2$/Ti | mol/mol | 5 | 6 | 30 |
| | | Production rate | kg/hr | 15 | 15 | 12 |
| | | Residence time | hr | 1 | 1 | 1.3 |
| Poly. Results | Poly. reactor 1 | MFR | g/10 min | 120 | 50 | 120 |
| | | CXS | wt % | 2 | 1.8 | 2 |
| | Poly. reactor 2 | MFR of block copolymer | g/10 min | 32 | 17 | 102 |
| | | MFR of random copolymer component | g/10 min | 0.6 | 0.6 | 0.6 |
| | | Content of random copolymer component | wt % | 25 | 25 | 3 |
| | | Ethylene content of random copolymer component | wt % | 40 | 40 | 40 |
| | | Activity | g-PP/g-Cat. | 24,000 | 25,000 | 18,600 |
| | | Av. particle size | mm | 950 | 960 | 870 |
| | | BD | g/ml | 0.37 | 0.38 | 0.42 |

Example 15

(1) Preparation of a Solid Component

The atmosphere of the autoclave with an inner volume of 10 L, equipped with the agitator, was sufficiently replaced with nitrogen, and 2 L of purified toluene was introduced therein. Into the autoclave, 200 g of Mg(OEt)$_2$, and 1 L of TiCl$_4$ were introduced at room temperature. After it was heated up to 90° C., 50 mL of di-n-butyl phthalate was introduced. Then, the reaction was conducted for 3 hours at 110° C. The reaction product was sufficiently washed with purified toluene. Then, purified toluene was introduced to adjust the total liquid amount to 2 L. One liter of TiCl$_4$ was added at room temperature, and it was heated up to 110° C. to react for 2 hours. Furthermore, by purified n-heptane, toluene was replaced with n-heptane to obtain the slurry of the solid component (A1). A part of the slurry was sampled and dried. As a result of analysis, Ti content of the solid component (A1) was 2.7% by weight.

Then, the atmosphere of the autoclave with an inner volume of 20 L, equipped with the agitator, was sufficiently replaced with nitrogen, and the slurry of the above solid component (A1) was measured and introduced therein corresponding to 100 g of the solid component (A1). By introducing purified n-heptane, the concentration of the solid component (A1) was adjusted to 25 g/L. Then, 50 mL of SiCl$_4$ was added and reacted at 90° C. for 1 hour. The reaction product was sufficiently washed with purified n-heptane.

After that, purified n-heptane was introduced to adjust the liquid level to 4 L. Into the slurry, 30 mL of dimethyldivinylsilane, 30 mL of (i-Pr)$_2$Si(OMe)$_2$ and a solution of Et$_3$Al (TEA) in n-heptane corresponding to 80 g of Et$_3$Al, were added to react at 40° C. for 2 hours. The reaction product was sufficiently washed with purified n-heptane, and a part of the obtained slurry was sampled and dried. As a result of analysis, the solid component was found to contain 1.2% by weight of Ti, and 8.8% by weight of (i-Pr)$_2$Si(OMe)$_2$.

(2) Pre-polymerization

With the solid component obtained in the above, pre-polymerization was conducted by the following procedure. Purified n-heptane was introduced into the above slurry to adjust the concentration of the solid component to 20 g/L. After the slurry was cooled to 10° C., a solution of Et$_3$Al in n-heptane corresponding to 10 g of Et$_3$Al was added, and 280 g of propylene was supplied in 4 hours. After the propylene supply, the reaction was continued for further 30 minutes. Then, a gas part was sufficiently replaced with nitrogen and the reaction product was sufficiently washed with purified n-heptane. The obtained slurry was discharged from the autoclave and dried under vacuum to obtain the solid catalyst component (A). The solid catalyst (A) was found to contain 2.5 g of polypropylene per 1 g of the solid component. As a result of analysis, the solid catalyst (A) was found to contain 1.0% by weight of Ti and 8.2% by weight of (i-Pr)$_2$Si (OMe)$_2$ in the solid component without pre-polymer.

(3) Polymerization of Propylene

For a polymerization reactor, a gas-phase polymerization reactor with two polymerization reactors was used in the same manner as in Example 1 (refer to FIG. 4). The two polymerization reactors 10 and 20 are continuous horizontal gas-phase polymerization reactors (length/diameter=3.7) equipped with the agitator, having an inner diameter D of 340 mm, a length L of 1260 mm, a diameter of the rotating shaft of 90 mm and an inner volume of 110 dm$^3$.

After replacing the atmosphere of the polymerization reactor 10 with nitrogen gas, 25 kg of polypropylene powder (the average particle size of 1500 µm) previously removed the polymer particles whose sizes are equal to or smaller than 500 µm, was introduced, and the solid catalyst (A) obtained in the above was continuously supplied into the polymerization reactor 10 in the form of n-hexane slurry. The feed rate of the solid catalyst (A) was adjusted so that the production rate of a propylene-ethylene random copolymer became constant. In addition, the n-hexane solution of 15% by weight of triethylaluminum was continuously supplied in the molar ratio of 100 with respect to a Ti atom in the catalyst component (A). In addition, hydrogen and ethylene were supplied into the polymerization reactor 10 to keep the ratios of hydrogen and ethylene concentrations to propylene concentration in the polymerization reactor 10 at 0.026 and 0.017, respectively, and a propylene monomer was supplied into the polymerization reactor 10 so that the pressure and temperature in the polymerization reactor 10 were maintained to 2.2 MPa 65° C., respectively. Unreacted gas exhausted from the polymerization reactor 10 was discharged from the reactor system through a pipeline 404 for d exhausting unreacted gas, and cooled, condensed, and separated into liquefied propylene and mixed gases. The mixed gases were returned to the polymerization reactor 10 through a pipeline 402 for recycling gas. In addition, both of hydrogen gas and ethylene were supplied from the pipeline 402. Liquefied propylene condensed outside the reactor system was supplied from a pipeline 403 for raw material mixed gases, together with fresh raw material propylene. The heat of polymerization was removed by the heat of vaporization of liquefied propylene supplied from the pipeline 403.

Polypropylene produced in the polymerization reactor 10 was continuously discharged from the polymerization reactor 10 through a pipeline 411 for discharging a polymer to keep the level of a polymer at 50% of the reaction volume, and supplied to the polymerization reactor 20 for the second polymerization stage.

A polymer and mixed gases from the first polymerization stage were continuously supplied into the polymerization reactor 20 to conduct copolymerization of propylene and ethylene. Reaction conditions were the set of the temperature of 70° C. and the pressure of 2.0 MPa. Unreacted gas exhausted from the polymerization reactor 20 was discharged from the reactor system from a pipeline 407 for exhausting unreacted gas, and cooled, condensed, and separated into liquefied propylene and mixed gases. The mixed gases were returned to the polymerization reactor 20 through a pipeline 405 for recycling gas. In addition, hydrogen gas and ethylene gas were also supplied from the pipeline 405. In this case, the ratios of hydrogen and ethylene concentrations to propylene concentration were adjusted to the same values as those in the polymerization reactor 10. Liquefied propylene condensed outside the reactor system was supplied from a pipeline 406 for raw material mixed gases, together with fresh raw material propylene. The heat of polymerization was removed by the heat of vaporization of liquefied propylene supplied from the pipeline 406.

Polypropylene produced in the second polymerization stage was continuously discharged from the polymerization reactor 20 through a pipeline 413 for discharging a polymer to keep the level of a polymer at 60% of the reaction volume. Discharged powders and gases were separated at a gas recovery apparatus 40, and a powder part was transferred to a recovery system.

Production rate of polypropylene was 15 kg/hr, average residence time in the polymerization reactor 10 was 1.6 hr, and average residence time in the polymerization reactor 20 was 1.0 hr. Activity was calculated by dividing the production rate with the feed rate of the solid catalyst component (A) (without pre-polymer), and found to be 82,000 g-PP/g-catalyst.

As a result of analysis of the obtained propylene-ethylene random copolymer, the MFR value was 25 g/10 minutes, ethylene content was 2.2% by weight, and the CXS value was 4.0% by weight. BD of the propylene-ethylene random copolymer particles was 0.42 g/mL, and average particle size was 1,480 μm.

(4) Production of an Injection Molded Body

To the polypropylene powders obtained in the above, 500 ppm of tetrakis[methylene-3-(3',5'-di-t-butyl-4'-hydroxyphenyl)-propionate]methane and 500 ppm of tris(2,4-di-t-butylphenyl)phosphate as an antioxidant, as well as 500 ppm of calcium stearate as a neutralization agent and 1500 ppm of 1,3,2,4-di(p-methylbenzilidene)sorbitol as a nucleating additive, were added and sufficiently mixed under agitation.

Then, they were pelletized under the following conditions. Extruder: a KZW-15-45MG twin screw extruder, manufactured by Technovel Corp., screw: a diameter of 15 mm and L/D=45, extruder temperature set: (from the bottom of the hopper) 40, 80, 160, 200, 200, 200 (die, ° C.), rotation frequency of screws: 400 rpm, output rate: adjusted to about 1.5 kg/hr by a screw feeder, die: a diameter of 3 mm, strand die and hole number of 2.

Then, an injection molded body, as a flat plate test piece for property evaluation, was obtained by injection molding under the following conditions with the obtained pellets. Standard No.: JIS K-7152 (ISO 294-1), reference molding machine: EC20P injection molding machine, manufactured by Toshiba Machine Co., Ltd., molding machine temperature set: (from the bottom of the hopper) 80, 210, 210, 200, 200° C., mold temperature: 40° C., injection speed: 52 mm/s (screw speed), retention pressure: 30 MPa, retention time: 8 second, mold shape: a couple of flat plates (thickness 2 mm, width 10 mm, length 80 mm).

(5) Physical Property Evaluation

Haze of the obtained injection-molded body was 18%.

Example 16

Polymerization was conducted in the same manner as in Example 15 with the solid catalyst component (A) of Example 15 except for employing the polymerization conditions shown in Table 5. In addition, the injection molded body was produced in the same manner as in Example 15. Results are shown in Table 5.

Example 17

Polymerization was conducted in the same manner as in Example 15 with the solid catalyst component (A) of Example 15 except for employing the polymerization conditions shown in Table 5. In this case, the silicon compound described in the Table was continuously supplied into the polymerization reactor 10. In addition, the injection molded body was produced in the same manner as in Example 15 except for employing 2,2-methylene-bis(4,6-di-t-butylphenyl) sodium phosphate as a nucleating additive.

Comparative Example 9

(1) Preparation of a Solid Component

Pre-polymerization was conducted by the following procedure with the solid component (A1) of Example 15. The atmosphere of the autoclave with an inner volume of 20 L, equipped with the agitator, was sufficiently replaced with nitrogen, and the slurry of the solid component (A1) of Example 15 was measured and introduced therein corresponding to 100 g of the solid component (A1). By introducing purified n-heptane, the concentration of the solid component (A1) was adjusted to 20 g/L. After the slurry was cooled to 10° C., a solution of Et$_3$Al in n-heptane corresponding to 10 g of Et$_3$Al was added, and 280 g of propylene was supplied in 4 hours. After the propylene supply, the reaction was continued for further 30 minutes. Then, a gas part was sufficiently replaced with nitrogen, and the reaction product was sufficiently washed with purified n-heptane. The obtained slurry was discharged from the autoclave and dried under vacuum to obtain the solid catalyst (A). The solid catalyst (A) was found to contain 2.4 g of polypropylene per 1 g of the solid component. As a result of analysis, the solid catalyst (A) was found to contain 2.2% by weight of Ti in the solid component without pre-polymer.

(2) Polymerization of Propylene

Polymerization was conducted in the same manner as in Example 15 except that the above solid catalyst (A) and the polymerization conditions shown in Table 5 were used. In this case, the silicon compound described in the Table was continuously supplied into the polymerization reactor 10. In addition, the injection molded body was produced in the same manner as in Example 15. Results are shown in Table 5.

Comparative Example 10

Polymerization was conducted in the same manner as in Comparative Example 9 with the solid catalyst (A) of Comparative Example 9 except for employing the polymerization conditions shown in Table 5. In addition, the injection molded body was produced in the same manner as in Example 15. Polymerization conditions and the results are shown in Table 5.

heated up to 90° C., 50 mL of di-n-butyl phthalate was introduced. Then, the reaction was conducted for 3 hours at 110° C. The reaction product was sufficiently washed with purified toluene.

Then, purified toluene was introduced to adjust the total liquid amount to 2 L. One liter of TiCl$_4$ was added at room temperature, and it was heated up to 110° C. to react for 2 hours. The reaction product was sufficiently washed with purified toluene. Furthermore, by purified n-heptane, toluene was replaced with n-heptane to obtain the slurry of the solid component (A1). A part of the slurry was sampled and dried. As a result of analysis, Ti content of the solid component (A1) was 2.7% by weight.

Then, the atmosphere of the autoclave with an inner volume of 20 L, equipped with the agitator, was sufficiently replaced with nitrogen, and the slurry of the above solid component (A1) was measured and introduced therein corresponding to 100 g of the solid component (A1). By introducing purified n-heptane, the concentration of the solid component (A1) was adjusted to 25 g/L. Then, 50 mL of SiCl$_4$ was added, as a component (A5), and reacted at 90° C. for 1 hour. The reaction product was sufficiently washed with purified n-heptane.

After that, purified n-heptane was introduced to adjust the liquid level to 4 L. Into the slurry, 30 mL of dimethyldivinylsilane, as a component (A2), 30 mL of (i-Pr)$_2$Si(OMe)$_2$, as a component (A3), and a solution of Et$_3$Al (TEA) in n-heptane corresponding to 80 g of Et$_3$Al, as a component (A4), were added to react at 40° C. for 2 hours. The reaction product was sufficiently washed with purified n-heptane, and a part of the obtained slurry was sampled and dried. As a result of analysis, the solid component was found to contain 1.2% by weight of Ti, and 8.8% by weight of (i-Pr)$_2$Si(OMe)$_2$.

TABLE 5

| | | | | Example 15 | Example 16 | Example 17 | Comp. Exam. 9 | Comp. Exam. 10 |
|---|---|---|---|---|---|---|---|---|
| Polymerization conditions | Poly. reactor 1 | TEA supply amount | mol-Al/mol-Ti | 100 | 100 | 100 | 50 | 50 |
| | | Si compound (A3) | — | Non | Non | (i-Pr)$_2$Si(OMe)$_2$ | (i-Pr)$_2$Si(OMe)$_2$ | (i-Pr)$_2$Si(OMe)$_2$ |
| | | Si comp. supply amount | mol/mol-Al | Non | Non | 0.2 | 0.3 | 0.3 |
| | | Temperature | ° C. | 65 | 65 | 62 | 65 | 65 |
| | | Pressure | MPa | 2.2 | 2.2 | 2.2 | 2.2 | 2.2 |
| | | H$_2$/propylene | mol/mol | 0.026 | 0.045 | 0.032 | 0.05 | 0.026 |
| | | Ethylene/propylene | mol/mol | 0.017 | 0.017 | 0.021 | 0.017 | 0.017 |
| | | Residence time | hr | 1.6 | 1.6 | 2 | 1.6 | 1.6 |
| | Poly. reactor 2 | Temperature | ° C. | 70 | 70 | 65 | 70 | 70 |
| | | Pressure | MPa | 2 | 2 | 2 | 2 | 2 |
| | | Production rate | kg/hr | 15 | 15 | 12 | 15 | 15 |
| | | Residence time | hr | 1 | 1 | 1.3 | 1 | 1 |
| Poly. Results | Poly. reactor 2 | MFR | g/10 min. | 25 | 50 | 25 | 25 | 10 |
| | | Ethylene content | wt % | 2.2 | 2.2 | 2.7 | 2.2 | 2.2 |
| | | Activity | g-PP/g-Cat. | 82,000 | 85,000 | 75,000 | 27,000 | 23,000 |
| | | Av. particle size | m | 1,430 | 1,450 | 1,390 | 990 | 940 |
| | | BD | g/ml | 0.42 | 0.42 | 0.42 | 0.41 | 0.41 |
| | | CXS | wt % | 4.0 | 4.2 | 4.1 | 4.6 | 4.4 |
| | | Haze | % | 18 | 19 | 16 | 25 | 24 |

Example 18

(1) Preparation of a Solid Catalyst Component (A)

The atmosphere of the autoclave with an inner volume of 10 L, equipped with the agitator, was sufficiently replaced with nitrogen, and 2 L of purified toluene was introduced therein. Into the autoclave, 200 g of Mg(OEt)$_2$, and 1 L of TiCl$_4$ were introduced at room temperature. After it was (2) Pre-polymerization With the solid component obtained in the above, pre-polymerization was conducted by the following procedure. Purified n-heptane was introduced into the above slurry to adjust the concentration of the solid component to 20 g/L. After the slurry was cooled to 10° C., a solution of Et$_3$Al in n-heptane corresponding to 10 g of Et$_3$Al was added, and 210 g of propylene was supplied in 4 hours. After the propylene supply, the reaction was continued for further 30 minutes.

Then, a gas part was sufficiently replaced with nitrogen and the reaction product was sufficiently washed with purified n-heptane. The obtained slurry was discharged from the autoclave and dried under vacuum to obtain the solid catalyst component (A). The solid catalyst component (A) was found to contain 2.0 g of polypropylene per 1 g of the solid component. As a result of analysis, the solid catalyst component (A) was found to contain 1.0% by weight of Ti and 8.2% by weight of $(i-Pr)_2Si(OMe)_2$ in the solid component without pre-polymer.

(3) Polymerization of Propylene

Explanation will be given with reference to the flow sheet shown in attached FIG. 2.

A gas-phase polymerization reactor with two polymerization reactors was used. The two polymerization reactors 10 and 20 are continuous horizontal gas-phase polymerization reactors (length/diameter=3.7) equipped with the agitator, having an inner diameter D of 340 mm, a length L of 1260 mm, a diameter of the rotating shaft of 90 mm and an inner volume of 110 dm³.

After replacing the atmosphere of the polymerization reactor 10 with nitrogen gas, 25 kg of polypropylene powder (the average particle size of 1500 μm) previously removed the polymer particles whose sizes are equal to or smaller than 500 μm was introduced, and the solid catalyst component (A) obtained in the above was continuously supplied into the polymerization reactor 10 in the form of n-hexane slurry. The feed rate of the solid catalyst component (A) was adjusted so that the production rate of polypropylene became constant. In addition, the n-hexane solution of 15% by weight of triethylaluminum was continuously supplied in the molar ratio of 100 with respect to a Ti atom in the catalyst component (A). In addition, hydrogen was supplied into the polymerization reactor 10 so that the ratio of hydrogen concentration to propylene concentration in the polymerization reactor 10 became 0.08, and a propylene monomer was supplied into the polymerization reactor 10 so that the pressure and temperature in the polymerization reactor 10 were maintained to 2.2 MPa and 65° C. Unreacted gas exhausted from the polymerization reactor 10 was discharged from the reactor system through a pipeline 13 for exhausting unreacted gas, and cooled, and condensed by a condenser 15, and separated into liquefied propylene and mixed gases. The mixed gases were returned to the polymerization reactor 10 through a pipeline 18 for supplying raw material mixed gases. In addition, hydrogen gas for adjusting the molecular weight of a propylene polymer was also supplied from the pipeline 18. Liquefied propylene condensed outside the reactor system, was supplied from a pipeline 17 for replenishing raw material liquefied propylene, together with fresh raw material propylene. The heat of polymerization was removed by the heat of vaporization of liquefied propylene supplied from the pipeline 17.

Polypropylene produced in the polymerization reactor 10 was continuously discharged from the polymerization reactor 10 through a pipeline 32 for discharging a polymer to keep the level of a polymer at 50% of the reaction volume, and supplied to the polymerization reactor 20 for the second polymerization stage.

A polymer and propylene from the first polymerization stage were continuously supplied into the polymerization reactor 20 to conduct random copolymerization of propylene and ethylene. Reaction conditions were the set of the temperature of 60° C. and the pressure of 2.0 MPa. Unreacted gas exhausted from the polymerization reactor 20 was discharged from the reactor system from a pipeline 23 for exhausting unreacted gas, and cooled, and condensed by a condenser 25, and separated to liquefied propylene and mixed gases. The mixed gases were returned to the polymerization reactor 20 through a pipeline 28 for supplying raw material mixed gases. In addition, ethylene gas and hydrogen gas were also supplied from the pipeline 28 in the ratios of ethylene and hydrogen concentrations to propylene concentration were adjusted to 0.32 and 0.1 in the polymerization reactor 20. Liquefied propylene condensed outside the reactor system was supplied from a pipeline 27 for replenishing raw material liquefied propylene, together with fresh raw material propylene. The heat of polymerization was removed by the heat of vaporization of liquefied propylene supplied from the pipeline 27. Furthermore, oxygen was supplied as an activity inhibitor from a pipeline 7 in the molar ratio of 30 with respect to a Ti atom contained in the solid catalyst component (A) supplied to the polymerization reactor 10.

A propylene-based block copolymer produced in the second polymerization stage was continuously discharged from the polymerization reactor 20 through a pipeline 39 for discharging a polymer to keep the level of a polymer at 60% of the reaction volume. Discharged powders and gases were separated at a gas recovery apparatus (not shown), and the powder part was transferred to a recovery system.

Production rate of the polypropylene-based block copolymer was 15 kg/hr, average residence time in the polymerization reactor 10 was 1.6 hr, and average residence time in the polymerization reactor 20 was 1.0 hr. Activity was calculated by dividing the production rate with the feed rate of the solid catalyst component (A) (without pre-polymer), and found to be 50,000 g-PP/g-catalyst.

As a result of analysis of the sample partly discharged from the polymerization reactor 10, the MFR value was 120 g/10 minutes, and the CXS value was 1.6% by weight. An analysis result of the finally obtained polypropylene-based block copolymer showed the MFR value of 32 g/1 minutes. In addition, the content of the propylene-ethylene random copolymer component in the polypropylene-based block copolymer was 25% by weight, ethylene content in the propylene-ethylene random copolymer component was 40% by weight, and the MFR value of the propylene-ethylene random copolymer component was 0.6 g/10 minutes. Polypropylene particles showed good fluid ability and were found to have a polymer bulk density (BD) of 0.45 g/ml and the average particle size of 1,220 μm.

(4) Production of an Injection Molded Body

To the polypropylene powders obtained in the above, 500 ppm of tetrakis[methylene-3-(3',5'-di-t-butyl-4'-hydroxyphenyl)-propionate]methane and 500 ppm of tris(2,4-di-t-butylphenyl)phosphate as well as 500 ppm of calcium stearate as a neutralization agent, were added and sufficiently mixed under agitation.

Then, they were pelletized under the following conditions.

Extruder: a KZW-15-45MG twin screw extruder, manufactured by Technovel Corp., screw: a diameter of 15 mm and L/D=45, extruder temperature set: (from the bottom of the hopper) 40, 80, 160, 200, 200, 200 (die, ° C.), rotation frequency of screws: 400 rpm, output rate: adjusted to about 1.5 kg/hr by a screw feeder, die: a diameter of 3 mm, strand die, and a hole number of 2.

Then, a flat plate test piece for property evaluation was obtained by injection molding under the following conditions with the obtained pellets. Results are shown in Table 6.

Standard No.: JIS K-7152 (ISO 294-1) "Plastic-injection molded test piece of thermoplastic material", reference molding machine: an EC20P injection molding machine, manufactured by Toshiba Machine Co., Ltd., molding machine temperature set: (from the bottom of the hopper) 80, 210, 210, 200, 200° C., mold temperature: 40° C., injection speed: 52 mm/s (screw speed), retention pressure: 30 MPa, retention time: 8 second, mold shape: a couple of flat plates (thickness 4 mm, width 10 mm, length 80 mm.

Example 19

The solid catalyst component (A) was prepared in the same manner as in Example 18 except for employing t-Bu(Me)Si (OMe)$_2$ instead of (i-Pr)$_2$Si(OMe)$_2$ as the component (A3). The solid catalyst component (A) was found to contain 1.8% by weight of Ti and 9.0% by weight of t-Bu(Me)Si(OMe)$_2$ in the solid component without pre-polymer. In addition, polymerization was conducted by the similar method as in Example 18. Results are shown in Table 6.

Comparative Example 11

(1) Pre-polymerization

With the solid component (A1) obtained in Example 18, pre-polymerization was conducted by the following procedure.

The atmosphere of the autoclave with an inner volume of 10 L, equipped with the agitator, was sufficiently replaced with nitrogen. Into the autoclave, 100 g of the solid component (A1) was introduced at room temperature, and purified n-heptane was introduced to adjust the concentration of the solid component to 20 g/L. After the slurry was cooled to 10° C., a solution of Et$_3$Al in n-heptane corresponding to 10 g of Et$_3$Al was added, and 210 g of propylene was supplied in 4 hours. After the propylene supply, the reaction was continued for further 30 minutes.

Then, a gas part was sufficiently replaced with nitrogen and the reaction product was sufficiently washed with purified n-heptane. The obtained slurry was discharged from the autoclave and dried under vacuum to obtain the solid catalyst component (A). The solid catalyst component (A) was found to contain 2.0 g of polypropylene per 1 g of the solid component. As a result of analysis, The solid catalyst component (A) was found to contain 2.3% by weight of Ti in the solid component without pre-polymer.

(2) Polymerization of Propylene

A stainless steel autoclave with an inner volume of 3.0 L, having an agitator and a thermo-controlling apparatus, was heated and dried under vacuum, and cooled to room temperature, and its atmosphere was replaced with propylene, and then, 61.9 mg of (i-Pr)$_2$Si(OMe)$_2$ as a component (C), 400 mg of Et$_3$Al as a component (B), and 10000 ml of hydrogen were introduced therein, followed by the introduction of 750 g of liquefied propylene. After adjusting the inner temperature to 70° C., by injecting 10 mg of the above solid catalyst component (A) with the assist of high pressure gas, propylene polymerization began.

After 1 hour, by purging propylene and hydrogen sufficiently, the first stage polymerization was terminated. Polymer yield at the first stage was 220 (g), and 20 g thereof was discharged under the stream of purified nitrogen.

The sample discharged here was found to have the MFR value of 65 g/10 minutes, and the CXS value of 2.0% by weight.

Then, it was heated up to 75° C. under agitation, and after that, propylene gas and ethylene gas were charged to achieve the total polymerization pressure of 2.0 MPa, and polymerization at the second stage began. Polymerization was conducted at 75° C. for 30 minutes while supplying mixed gases of propylene gas and ethylene gas to keep the total polymerization pressure at 2.0 MPa. In this case, the ratio of ethylene concentration to propylene concentration was 0.55.

An analysis result of the finally obtained propylene-based block copolymer showed the MFR value of 17 g/10 minutes. In addition, the content of a propylene-ethylene random copolymer component in the propylene-based block copolymer was 29% by weight, ethylene content in the propylene-ethylene random copolymer component was 56% by weight. Results are shown in Table 6.

TABLE 6

| | | | Example 18 | Example 19 | Comp. Exam. 11 |
|---|---|---|---|---|---|
| Solid catalyst component (A) | Halogen-containing Si compound (A2) | Compound name | SiCl$_4$ | SiCl$_4$ | Non |
| | | Use amount (A2/Ti) | 8.3 | 8.3 | — |
| | Olganosilicon compound (A4) | Compound name | (i-Pr)$_2$Si(OMe)$_2$ | t-Bu(Me)Si(OMe)$_2$ | Non |
| Olganosilicon compound (C) | | Compound name | Non | Non | (i-Pr)$_2$Si(OMe)$_2$ |
| Polymerization conditions | 1st poly. Stage | Temperature (° C.) | 65 | 65 | 70 |
| | 2nd poly. Stage | Temperature (° C.) | 60 | 60 | 75 |
| | | C2/C3 (molar ratio) | 0.32 | 0.32 | 0.55 |
| Polymerization Results | Polymer discharged from 1st step | MFR(g/10 min) | 120 | 110 | 65.0 |
| | | Density (g/ml) | 0.9079 | 0.9082 | 0.9076 |
| | Plopylene-based block copolymer | Catalytic activity (g/g-Cat.) | 50 | 55 | 28.0 |
| | | MFR(g/10 min) | 32 | 30 | 17 |
| | | Polymer Bulk Density (g/ml) | 0.45 | 0.45 | 0.45 |
| | | Av. particle size (μm) | 1220 | 1300 | 1050 |
| | | P-E random copolymer component in P-based block copolymer (wt %) | 25 | 25 | 29 |

TABLE 6-continued

|  | Example 18 | Example 19 | Comp. Exam. 11 |
|---|---|---|---|
| Ethylene content in P-E random copolymer component (wt %) | 40 | 35 | 56 |
| IZOD impact resistance at low temp. (kj/m$^2$) | 5.4 | 4.8 | Not measured |
| Flexural modulus (MPa) | 1290 | 1280 | Not measured |

(Note);
P-based block copolymer = propylene-based block copolymer

Example 20

<Preparation of a Solid Component>

(1) Preparation of a Solid Component

The atmosphere of the autoclave with an inner volume of 10 L, equipped with the agitator, was sufficiently replaced with nitrogen, and 2 L of purified toluene was introduced therein. Into the autoclave, 200 g of Mg(OEt)$_2$, and 1 L of TiCl$_4$ were introduced at room temperature. After it was heated up to 90° C., 50 mL of di-n-butyl phthalate was introduced. Then, the reaction was conducted for 3 hours at 110° C. The reaction product was sufficiently washed with purified toluene. Then, purified toluene was introduced to adjust the total liquid amount to 2 L. One liter of TiCl$_4$ was added at room temperature, and it was heated up to 110° C. to react for 2 hours. Furthermore, by purified n-heptane, toluene was replaced with n-heptane to obtain the slurry of the solid component (A1). A part of the slurry was sampled and dried. As a result of analysis, Ti content of the solid component (A1) was 2.7% by weight.

Then, the atmosphere of the autoclave with an inner volume of 20 L, equipped with the agitator, was sufficiently replaced with nitrogen, and the slurry of the above solid component (A1) was measured and introduced therein corresponding to 100 g of the solid component (A1). By introducing purified n-heptane, the concentration of the solid component (A1) was adjusted to 25 g/L. Then, 50 mL of SiCl$_4$ was added to and reacted at 90° C. for 1 hour. The reaction product was sufficiently washed with purified n-heptane.

After that, purified n-heptane was introduced to adjust the liquid level to 4 L. Into the slurry, 30 mL of dimethyldivinylsilane, 30 mL of (i-Pr)$_2$Si(OMe)$_2$ and a solution of Et$_3$Al (TEA) in n-heptane corresponding to 80 g of Et$_3$Al, were added to react at 40° C. for 2 hours. The reaction product was sufficiently washed with purified n-heptane, and a part of the obtained slurry was sampled and dried. As a result of analysis, the solid component was found to contain 1.2% by weight of Ti, and 8.8% by weight of (i-Pr)$_2$Si(OMe)$_2$.

(2) Pre-polymerization

With the solid component obtained in the above, pre-polymerization was conducted by the following procedure. Purified n-heptane was introduced into the above slurry to adjust the concentration of the solid component to 20 g/L. After the slurry was cooled to 10° C., a solution of Et$_3$Al in n-heptane corresponding to 10 g of Et$_3$Al was added, and 280 g of propylene was supplied in 4 hours. After the propylene supply, the reaction was continued for further 30 minutes. Then, a gas part was sufficiently replaced with nitrogen and the reaction product was sufficiently washed with purified n-heptane. The obtained slurry was discharged from the autoclave to obtain the solid catalyst component (A). The solid catalyst component (A) was found to contain 2.5 g of polypropylene per 1 g of the solid component. As a result of analysis, the solid catalyst component (A) was found to contain 1.0% by weight of Ti and 8.2% by weight of (i-Pr)$_2$Si(OMe)$_2$ in the solid component without pre-polymer.

(3) The First Stage Polymerization Step

Explanation will be given with reference to the flow sheet shown in attached FIG. 4. Into the horizontal type polymerization reactor (L/D=3.7, inner volume 100 L), having the agitating blade, the solid catalyst component (A) preliminary activated as above was continuously supplied in the rate of 0.30 g/hr, and triethylaluminum as an organoaluminum compound was continuously supplied in the molar ratio of Al to Mg (Al/Mg) of 5 with respect to Mg in the solid catalyst component (A). Maintaining conditions of a reaction temperature of 65° C., a reaction pressure of 2.0 MPa and a agitation frequency of 35 rpm, hydrogen gas was continuously supplied from a pipeline 402 for recycling to keep hydrogen concentration in a gas-phase of the polymerization reactor at the value corresponding to the molar of hydrogen to propylene (hydrogen/propylene) ratio shown in Table 7, to adjust MFR of the polymer at the first stage.

The heat of the reaction was removed by the heat of vaporization of raw material liquefied propylene supplied from a pipeline 403. Unreacted gas exhausted from the polymerization reactor was cooled and condensed outside the reactor system through a pipeline 404, and refluxed to the polymerization reactor 10 through a pipeline 402.

A produced polymer of the first-stage polymerization was continuously discharged from the polymerization reactor 10 through a pipeline 411 to keep the level of a polymer at 50% of the reaction volume, and supplied to the polymerization reactor 20 for the second polymerization stage. In this case, a part of the polymer was intermittently sampled from the pipeline 411 for the analysis of MFR and polymer yield per catalyst unit weight. Polymer yield per unit catalyst weight was calculated from Mg content in the polymer measured by inductively coupled plasma emission spectroscopy (ICP method).

(4) The Second Stage Polymerization Stage

Into a horizontal polymerization reactor 20 (L/D=3.7, inner volume 100 L), having the agitating wing, a propylene polymer from the first stage polymerization reactor and ethylene-propylene mixed gas from a pipeline 405 were continuously supplied to conduct copolymerization of ethylene and propylene. Reaction conditions were the set of the agitation frequency of 25 rpm, the reaction temperature of 60° C., and the reaction pressure of 1.9 MPa, and furthermore, the gas composition in a gas-phase was adjusted to the values corresponding to the molar ratios of ethylene and hydrogen to propylene (ethylene/propylene, hydrogen/propylene) shown in Table 7. Oxygen as a polymerization activity inhibitor to adjust the production amount of a propylene-ethylene copolymer, and hydrogen to adjust the molecular weight of an ethylene-propylene copolymer were individually supplied from a pipeline 408.

The heat of the reaction was removed by the heat of vaporization of raw material liquefied propylene supplied from a pipeline 406. Unreacted gas exhausted from the polymerization reactor was cooled and condensed outside the reactor system through a pipeline 407, and refluxed to the polymerization reactor 20. Ethanol as a component (F) was continuously supplied in the molar ratio of 0.6 with respect to triethylaluminum supplied at the first-stage polymerization stage, from a pipeline 9b (located at the top part of the reactor at the position of 15% length downstream from the upstream end of the reactor, when the length from the upstream end to the downstream end of the second-stage polymerization reactor is represented to be 100%).

A propylene-based block copolymer composition produced at the second polymerization stage was continuously discharged from the polymerization reactor 20 through a pipeline 413 to keep the level of a polymer at 50% of the reaction volume.

Production rate of the propylene-based block copolymer composition was 15.1 kg/hr.

The propylene-based block copolymer composition discharged, after the removal of unreacted monomers, was partly sampled for the analysis of MFR, ethylene content by infrared absorption spectroscopy, Mg content in the polymer by an ICP method for calculating the production amount of the copolymer per unit catalyst weight, the amount of lumps in the powder, gel, and fluidity of the powder. Results are shown in Table 7.

Example 21

In Example 21, polymerization was conducted according to Example 20 except for the feed position of the component (F) at 9a (located at the top part of the reactor at the position of 79% length downstream from the upstream end of the first stage polymerization reactor). Results are shown in Table 7.

Example 22

In Example 22, polymerization was conducted according to Example 20 except for the followings. The component (F) was supplied at 9b which is located at the top part of the reactor at the position of 30% length downstream from the upstream end of the second-stage polymerization reactor, and the molar ratio of the component (F) to triethylaluminum was 1.5. Results are shown in Table 7.

Example 23

In Example 23, polymerization was conducted according to Example 20 except for the molar ratio of the component (F) to triethylaluminum was 3.0. Results are shown in Table 7.

Example 24

In Example 24, polymerization was conducted according to Example 20 except for keeping the molar ratio of the component (F) to triethylaluminum at 1.0 and the weight ratio of the second stage-stage polymer to the whole block copolymer at 35%. Results are shown in Table 7.

TABLE 7

|  |  | Example 20 | Example 21 | Example 22 | Example 23 | Example 24 |
| --- | --- | --- | --- | --- | --- | --- |
| Supply amount of solid cat. Comp. (A) | g/h | 0.30 | 0.38 | 0.29 | 0.31 | 0.27 |
| Treatment with components (A2) and (A3) |  | Yes | Yes | Yes | Yes | Yes |
| Supply amount of organoaluminum comp. (B) Triethyl Aliminium | mmol/h | 11 | 14 | 10 | 11 | 10 |
| Component (C) |  | Ethanol | Ethanol | Ethanol | Ethanol | Ethanol |
| Feed position (I/L)*[1] | % | from upstream end of 2nd poly. tank 15% (top) | from upstream end of 1st poly. tank 79% (top) | from upstream end of 2nd poly. tank 30% (top) | from upstream end of 2nd poly. tank 15% (top) | from upstream end of 2nd poly. tank 15% (top) |
| Feed amount (comp. C/comp. B) | Molar ratio | 0.6 | 0.6 | 1.5 | 3.0 | 1.0 |
| 1st-stage polymerization |  |  |  |  |  |  |
| Pressure | MPaG | 2.0 | 2.0 | 2.0 | 2.0 | 2.0 |
| Temperature | ° C. | 65 | 65 | 65 | 65 | 65 |
| Hydrogen/propylene | Molar ratio | 0.08 | 0.07 | 0.08 | 0.08 | 0.10 |
| MFR (1st-stage polymer) | g/10 minutes | 142 | 137 | 145 | 148 | 210 |
| Activity (1st-stage polymer) | gPP/ h · g-Cat. | 19100 | 16100 | 19500 | 19800 | 15500 |
| 2nd-stage polymerization |  |  |  |  |  |  |
| Pressure | MPaG | 1.9 | 1.9 | 1.9 | 1.9 | 1.9 |
| Temperature | ° C. | 60 | 60 | 60 | 60 | 60 |
| Hydrogen/ethylene | Molar ratio | 0.06 | 0.07 | 0.06 | 0.06 | 0.08 |
| Ethylene/propylene | Molar ratio | 0.45 | 0.45 | 0.46 | 0.45 | 0.46 |
| Poly. Activity inhibitor (O2/Ti) | Molar ratio | 10 | 11 | 1.2 | 0.4 | 1.7 |
| Prod. ratio of 2nd-stage polymer | wt % | 25.7 | 25.0 | 25.5 | 25.2 | 35.0 |
| Ethylene content in 2nd-stage polymer | wt % | 45 | 45 | 46 | 45 | 47 |
| Propylene-based block copolymer |  |  |  |  |  |  |
| Production rate | kg/h | 15.1 | 15.5 | 15.1 | 15.4 | 14.8 |
| MFR | g/10 min | 31 | 32 | 32 | 33 | 24 |

TABLE 7-continued

|  |  | Example 20 | Example 21 | Example 22 | Example 23 | Example 24 |
|---|---|---|---|---|---|---|
| Activity | gPP/ h · g-Cat. | 50300 | 40800 | 52100 | 49700 | 54800 |
| Gel | Count/g-PP | 26 | 58 | 51 | 11 | 52 |
| Powder compression degree | % | 0.3 | 0.4 | 0.4 | 0.2 | 0.8 |
| Lump in sample | wt % | 0.1 | 0.1 | 0.2 | 0.1 | 0.3 |

*[1]Feed position of component (C): l = Length from the upstream end to the feed position, L = Total length of the polymerization reactor As is clearly shown in Table 1 and Table 2, in comparative study between Examples 1 to 8 and Comparative Examples 1 and 2, in the present invention, a propylene-ethylene block copolymer having a high MFR value can be obtained. Furthermore, the property of the obtained polymer particles is good.

In addition, as is clearly shown in Table 3, Example 9 is found, as compared with Comparative Examples 3 and 4, to provide the lower entrainment amount and the lower amount of fines (<210 μm) in the product polymer. Furthermore, the catalytic activity is as high as twice of Comparative Examples 3 and 4 or higher. Therefore, by the present invention, it can be expected to produce polypropylene in the low cost without any trouble.

In addition, as is clearly shown in Table 4, in comparative study between Examples 10 to 14 and Comparative Examples 5 to 7, it is clear that, in the present invention, a propylene-ethylene block copolymer having a high MFR value can be obtained, even though hydrogen concentration is low. Catalytic activity is high, and the property of the obtained polymer particles is good. Furthermore, stereoregularity of the propylene homopolymer is high.

Specifically, in Example 10, as compared with Comparative Example 5, a propylene-ethylene block copolymer having the same MFR value can be produced under the lower hydrogen concentration. In addition, catalytic activity is higher, and the amount of an activity inhibitor, which can be added in producing the propylene-ethylene random copolymer component, is higher. It is found that property of the obtained polymer particles is very good by its effect. In addition, CXS of the propylene homopolymer is low, and stereoregularity thereof is high.

Comparative Example 6 is inferior in providing the propylene homopolymer having the low MFR value, resulting in the low MFR value of the obtained block copolymer, although the propylene homopolymer was produced under the same condition as in Example 10. Comparative Example 7 is not preferable because of the extremely low content of the propylene-ethylene random copolymer component, although an activity inhibitor is supplied in the same amount as in Example 10 to improve the property of the polymer particles. In Comparative Example 8, the supply amount of an activity inhibitor is reduced in order to increase the content of the propylene-ethylene random copolymer component, however, the reactors cannot be operated safely due to the extremely deteriorated property of the polymer particles and the serious fouling.

On the other hand, as shown in Examples 10 to 13, it is clear that the present invention can be applied to the various conditions and indices for the propylene-ethylene random copolymer components.

In addition, in Example 14, the similar performance to that in Example 10 is obtained, although the organosilicon compound (C) is used as an optional component.

Therefore, Examples 10 to 14 can obviously provide excellent results as compared with Comparative Examples 5 to 7 in the general aspects of catalyst performance covering productivity, catalytic activity, stereoregularity, and particle property, in view of the production of the propylene-ethylene block copolymer having a high MFR value.

In addition, as is clearly shown in Table 5, in comparative study between Examples 15 to 17 and Comparative Example 9 or 10, it is clear that in Examples 15 to 17, a propylene-ethylene random copolymer having a high MFR value can be obtained even though hydrogen concentration is low, and catalytic activity is higher, CXS is lower, and the property of the obtained polymer particles is good. Furthermore, haze of the obtained injection molded body is good.

Specifically, in Example 15, as compared with Comparative Example 9, the propylene-ethylene random copolymer having the same MFR value can be obtained at the lower hydrogen concentration, and catalytic activity is high and haze value is superior.

Comparative Example 10 provides the propylene-ethylene random copolymer under the same condition as in Example 15, however, it provides the propylene-ethylene random copolymer having the extremely low MFR value, and furthermore, it shows significantly inferior activity and haze.

In addition, in Example 17, although an organosilicon compound (C) is used as an optional component, the similar performance to that in Example 15 is obtained.

Therefore, Examples 15 to 17 are found to be excellent, as compared with Comparative Examples 9 and 10, in the general aspects of catalyst performance covering productivity, catalytic activity, and the like, in view of the production of a propylene-ethylene block copolymer having a high MFR value, and also in the properties of the obtained propylene-ethylene random copolymer as shown in the particle properties and haze values.

In addition, as is clearly shown in Tables 6 and 7, in comparative study between Examples 18 and 19 and Comparative Example 11, in the present invention, it is clear that a propylene-ethylene block copolymer having a high MFR value and high ethylene content can be obtained.

Therefore, Examples 18 and 19 can obviously provide excellent results, as compared with Comparative Example 11, in the general aspects of catalyst performance covering productivity, catalytic activity, stereoregularity, and particle property, in view of the production of a propylene-ethylene block copolymer having a high MFR value and high ethylene content.

In addition, as is clearly shown in Table 7, it is understood that a propylene-based block copolymer composition, according to the production methods of Examples 20 to 24, is a propylene-based block copolymer having the reduced amount of gels or lumps in the powder, as well as good fluidity of powder.

Because polypropylene produced by using the present invention is polypropylene having a high MFR value, it may be used in the molding fields such as injection molding, injection compression molding, fiber, in particular, it may be used preferably as a material for a general injection molding such as sundry articles; for an automotive use such as a bumper or an instrumental panel; for a home appliance such as a housing of a refrigerator or a cleaner; for a transparent food packaging such as a container for jelly; for an impact resistant food packaging such as a container for yogurt; for a heat resistant food packaging such as a container for a pot-noodle; for a fiber such as nonwoven fabric for sanitary goods; for a stretchable fiber such as a supporter; and the like.

What is claimed is:

1. A method for producing a propylene-based polymer by a gas-phase process where reaction heat is removed mainly by heat of vaporization of liquefied propylene, comprising:

(I) gas-phase polymerizing propylene by contacting propylene with a solid catalyst component (A);

wherein the solid catalyst component (A) is prepared by contacting the following components (A1), (A2) and (A3):

a component (A1): a solid component containing titanium, magnesium and a halogen as essential components;

a component (A2): a vinylsilane compound; and a component (A3): at least one of an organosilicon compound having an alkoxy group (A3a) and a compound having at least two ether bonds (A3b);

wherein the gas-phase polymerizing includes a first stage where propylene is homo-polymerized or co-polymerized with one or more kinds of comonomers selected from the group consisting of ethylene and a $C_4$ to $C_8$ α-olefin; and a second stage where propylene is co-polymerized with one or more kinds of comonomers selected from the group consisting of ethylene and a $C_4$ to $C_8$ α-olefin in the higher ratio of the said comonomer than that at the first stage;

(II) during at least one of the first stage and the second stage, adding, as a killing agen:

a component (F): an electron donating compound.

2. The method for producing a propylene-based polymer according to claim 1, wherein the solid catalyst component (A) is prepared by further contacting the following component (A5):

a component (A5): a halogen-containing silicon compound represented by the following formula (5):

$$R^{11}{}_a SiX_{4-a} \qquad (5)$$

wherein $R^{11}$ is a hydrogen atom, a saturated aliphatic hydrocarbon group or an aromatic hydrocarbon group, X is a halogen atom, and "a" is an integer of 0, 1, 2 or 3.

3. The method for producing a propylene-based polymer according to claim 1, wherein the solid catalyst component (A) is prepared by contacting the components (A1) to (A3), the components (A1) to (A4) or the components (A1) to (A5) under inert gas atmosphere at the temperature range of −50° C. to 200° C. for 30 minutes or longer.

4. The method for producing polypropylene according to claim 1, wherein the gas-phase polymerizing is carried out in a reactor equipped with an agitator.

5. The method for producing polypropylene according to claim 4, wherein the reactor equipped with an agitator is a horizontal reactor equipped with an agitator inside, which rotates around a horizontal axis thereof.

6. The method for producing a propylene-based polymer according to claim 1, wherein the solid catalyst component (A) is prepared by further contacting the following component (A4):

a component (A4): an organoaluminum compound.

7. A method for producing a propylene-based polymer by a gas-phase process where reaction heat is removed mainly by heat of vaporization of liquefied propylene, comprising:

gas-phase polymerizing propylene by contacting propylene with a solid catalyst component (A);

wherein the solid catalyst component (A) is prepared by contacting the following components (A1), (A2) and (A3):

a component (A1): a solid component containing titanium, magnesium and a halogen as essential components;

a component (A2): a vinylsilane compound; and a component (A3): at least one of an organosilicon compound having an alkoxy group (A3a) and a compound having at least two ether bonds (A3b);

wherein the gas-phase polymerizing includes a first stage where propylene is homo-polymerized or co-polymerized with one or more kinds of comonomers selected from the group consisting of ethylene and a $C_4$ to $C_8$ α-olefin; and a second stage where propylene is co-polymerized with one or more kinds of comonomers selected from the group consisting of ethylene and a $C_4$ to $C_8$ α-olefin in the higher ratio of the said comonomer than that at the first stage;

(II) during at least one of the first stage and the second stage, adding, as a killing agent, a component (F): an electron donating compound;

wherein the component (F) is added at any position from the downstream end to the ⅓ length upstream of the reactor for the first stage, or from the upstream end to the ⅓ length downstream of the reactor for the second stage, or at both thereof.

8. The method for producing a propylene-based polymer according to claim 1, wherein the vinylsilane compound (A2) is a compound represented by the following formula (2):

$$[CH_2{=}CH{-}]_m SiX_n R^1{}_j (OR^2)_k \qquad (2)$$

wherein X represents a halogen, $R^1$ represents hydrogen or a hydrocarbon group, $R^2$ represents hydrogen or a hydrocarbon group or an organosilicon group, provided that $m \geq 1$, $0 \leq n \leq 3$, $0 \leq j \leq 3$, $0 \leq k \leq 2$ and $m+n+j+k=4$).

9. The method for producing a propylene-based polymer according to claim 1, wherein the organosilicon compound having an alkoxy group (A3a) is a compound represented by the following formula (3a):

$$R^3 R^4{}_a Si(OR^5)_b \qquad (3a)$$

wherein $R^3$ represents a hydrocarbon group or a hetero atom-containing hydrocarbon group, $R^4$ represents an arbitrary substituent selected from hydrogen, a halogen, a hydrocarbon group and a hetero atom-containing hydrocarbon group, $R^5$ represents a hydrocarbon group, provided that $0 \leq a \leq 2$, $1 \leq b \leq 3$ and $a+b=3$.

10. A method for producing a propylene-based polymer by a gas-phase process where reaction heat is removed mainly by heat of vaporization of liquefied propylene, comprising:

gas-phase polymerizing propylene by contacting propylene with a solid catalyst component (A);

wherein the solid catalyst component (A) is prepared by contacting the following components (A1), (A2) and (A3):

a component (A1): a solid component containing titanium, magnesium and a halogen as essential components;

a component (A2): a vinylsilane compound; and a component (A3): an organosilicon compound at least two ether bonds (A3b);

wherein the organosilicon compound having at least two ether bonds (A3b) is a compound represented by the following formula (3b):

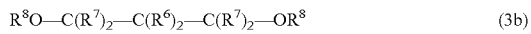

$$R^8O\!-\!C(R^7)_2\!-\!C(R^6)_2\!-\!C(R^7)_2\!-\!OR^8 \tag{3b}$$

wherein $R^6$ and $R^7$ represent any substituent selected from the group consisting of hydrogen, a hydrocarbon group and a hetero atom-containing hydrocarbon group, and $R^8$ represents a hydrocarbon group or a hetero atom-containing hydrocarbon group.

11. The method for producing a propylene-based polymer according to claim 6, wherein the organoaluminum compound (A4) is a compound represented by the following formula (4):

$$R^9{}_cAlX_d(OR^{10})_e \tag{4}$$

in the formula (4), $R^9$ represents a hydrocarbon group, X represents a halogen or hydrogen. $R^{10}$ represents a hydrocarbon group or a cross-linking group bridged by Al, provided that $c\geqq 1$, $0\leqq d\leqq 2$, $0\leqq e\leqq 2$ and $c+d+e=3$.

12. The method for producing a propylene-based polymer according to claim 1, wherein the solid catalyst component (A) is pre-polymerized.

13. The method for producing a propylene-based polymer according to claim 1, wherein the amount of the component (A2) is in the range of 1.0 to 10 in molar ratio relative to a titanium component of the component (A1).

14. A method for producing a propylene-based polymer by a gas-phase process where reaction heat is removed mainly by heat of vaporization of liquefied propylene, comprising:
   gas-phase polymerizing propylene by contacting propylene with a solid catalyst component (A);
   wherein the solid catalyst component (A) is prepared by contacting the following components (A1), (A2) and (A3):
      a component (A1): a solid component containing titanium, magnesium and a halogen as essential components;
      a component (A2): a vinylsilane compound; and
      a component (A3): at least one of an organosilicon compound having an alkoxy group (A3a) and a compound having at least two ether bonds (A3b);
   wherein the uniformity degree of particles of the solid catalyst component (A) is in the range of 1.1 to 2.0.

15. The method for producing a propylene-based polymer according to claim 1, wherein no peroxide is used.

16. A method for producing a propylene-based polymer by a gas-phase process where reaction heat is removed mainly by heat of vaporization of liquefied propylene, comprising:
   gas-phase polymerizing propylene by contacting propylene with a solid catalyst component (A);
   wherein the solid catalyst component (A) is prepared by contacting the following components (A1), (A2) and (A3):
      a component (A1): a solid component containing titanium, magnesium and a halogen as essential components;
      a component (A2): a vinylsilane compound; and
      a component (A3): at least one of an organosilicon compound having an alkoxy group (A3a) and a compound having at least two ether bonds (A3b);
   wherein the relative amount of fines formed during the method having a size equal to or smaller than 100 μm in diameter, is no more than 0.10 g/kg.

17. A propylene-based polymer produced by a method for producing a propylene-based polymer by a gas-phase process where reaction heat is removed mainly by heat of vaporization of liquefied propylene, comprising:
   gas-phase polymerizing propylene by contacting propylene with a solid catalyst component (A);
   wherein the solid catalyst component (A) is prepared by contacting the following components (A1), (A2) and (A3):
      a component (A1): a solid component containing titanium, magnesium and a halogen as essential components;
      a component (A2): a vinylsilane compound; and
      a component (A3): at least one of an organosilicon compound having an alkoxy group (A3a) and a compound having at least two ether bonds (A3b);
   wherein the propylene based polymer is a propylene-based block copolymer containing the following polymer components (a) (b) in the weight ratio of 10:90 to 84:16;
   a polymer component (a): a propylene homopolymer, or a random copolymer of propylene and one or more kinds of comonomers selected from the group consisting of ethylene and $C_4$ to $C_8$ α-olefins, having a comonomer content of no more than 5% by weight, and a MFR value equal to or higher than 50 g/10 minutes at 230° C. and 21.18N; and
   a polymer component (b): a random copolymer of propylene and one or more kinds of comonomers selected from the group consisting of ethylene and $C_4$ to $C_8$ α-olefins having a propylene content in the range of 20% by weight to 80% by weight.

18. A propylene-based polymer composition made by compounding a nucleating additive to a propylene-based polymer;
   wherein the propylene-based polymer is produced by a method for producing a propylene-based polymer by a gas-phase process where reaction heat is removed mainly by heat of vaporization of liquefied propylene, comprising:
   gas-phase polymerizing propylene by contacting propylene with a solid catalyst component (A);
   wherein the solid catalyst component (A) is prepared by contacting the following components (A1), (A2) and (A3):
      a component (A1): a solid component containing titanium, magnesium and a halogen as essential components;
      a component (A2): a vinylsilane compound; and
      a component (A3): at least one of an organosilicon compound having an alkoxy group (A3a) and a compound having at least two ether bonds (A3b).

19. An injection-molded body of a propylene-based polymer composition made by compounding a nucleating additive to a propylene-based polymer; produced by a method for producing a propylene-based polymer by a gas-phase process where reaction heat is removed mainly by heat of vaporization of liquefied propylene, comprising:
   gas-phase polymerizing propylene by contacting propylene with a solid catalyst component (A);
   wherein the solid catalyst component (A) is prepared by contacting the following components (A1), (A2) and (A3):
      a component (A1): a solid component containing titanium, magnesium and a halogen as essential components;
      a component (A2): a vinylsilane compound; and
      a component (A3): at least one of an organosilicon compound having an alkoxy group (A3a) and a compound having at least two ether bonds (A3b).

* * * * *